(12) United States Patent
Hsueh et al.

(10) Patent No.: US 11,385,440 B2
(45) Date of Patent: Jul. 12, 2022

(54) OPTICAL PHOTOGRAPHING LENS ASSEMBLY, FINGERPRINT IDENTIFICATION MODULE AND ELECTRONIC DEVICE

(71) Applicant: LARGAN PRECISION CO., LTD., Taichung (TW)

(72) Inventors: Chun-Che Hsueh, Taichung (TW); Kuan-Ting Yeh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 526 days.

(21) Appl. No.: 16/427,173

(22) Filed: May 30, 2019

(65) Prior Publication Data

US 2020/0326507 A1 Oct. 15, 2020

(30) Foreign Application Priority Data

Apr. 10, 2019 (TW) ................... 108112513

(51) Int. Cl.
*G02B 13/00* (2006.01)
*G02B 9/12* (2006.01)
*G06V 40/13* (2022.01)

(52) U.S. Cl.
CPC ........... *G02B 13/0035* (2013.01); *G02B 9/12* (2013.01); *G06V 40/1318* (2022.01)

(58) Field of Classification Search
CPC ...... G02B 13/0035; G02B 9/12; G02B 13/06; G06V 40/1318
See application file for complete search history.

(56) References Cited

U.S. PATENT DOCUMENTS 8,724,239 B2    5/2014  Tsai et al.
9,019,630 B2 *  4/2015  Tsai ................. G02B 13/18
                                                     359/716
(Continued)

FOREIGN PATENT DOCUMENTS

CN    105824108 A    8/2016
CN    205507200 U    8/2016
(Continued)

OTHER PUBLICATIONS

IN Office Action in Application No. 201934026326 dated Mar. 4, 2021.
(Continued)

*Primary Examiner* — Seung C Sohn
(74) *Attorney, Agent, or Firm* — Maschoff Brennan

(57) ABSTRACT

An optical photographing lens assembly includes three lens elements which are, in order from an object side to an image side: a first lens element, a second lens element and a third lens element. Each of the three lens elements of the optical photographing lens assembly has an object-side surface facing toward the object side and an image-side surface facing toward the image side. The object-side surface of the first lens element is concave in a paraxial region thereof, the object-side surface of the first lens element is aspheric and has at least one inflection point, and the object-side surface of the first lens element has at least one critical point in an off-axis region thereof. The optical photographing lens assembly has a total of three lens elements.

28 Claims, 45 Drawing Sheets

(56) References Cited

U.S. PATENT DOCUMENTS

| | | |
|---|---|---|
| 9,225,888 B2 | 12/2015 | Huang |
| 9,885,856 B2 | 2/2018 | Chen et al. |
| 10,031,317 B2 * | 7/2018 | Hsueh ................ G02B 13/0035 |
| 10,908,391 B2 * | 2/2021 | Tseng .................... G02B 13/004 |
| 11,163,134 B2 * | 11/2021 | Yeh .................... G02B 27/0955 |
| 2017/0038559 A1 | 2/2017 | Chen et al. |
| 2017/0090192 A1 | 3/2017 | Iwasaki et al. |
| 2017/0235101 A1 | 8/2017 | Huang et al. |
| 2018/0081151 A1 | 3/2018 | Bone |
| 2018/0143400 A1 | 5/2018 | Bone et al. |
| 2018/0225502 A1 | 8/2018 | Hung et al. |
| 2020/0049955 A1 | 2/2020 | Chiu et al. |
| 2020/0142162 A1 | 5/2020 | Huang |
| 2020/0301102 A1 | 9/2020 | Chang |

FOREIGN PATENT DOCUMENTS

| | | |
|---|---|---|
| CN | 108037577 A | 5/2018 |
| CN | 109196521 A | 1/2019 |
| CN | 208847926 U | 5/2019 |
| CN | 208888461 U | 5/2019 |
| CN | 209044155 U | 6/2019 |
| CN | 109975953 A | 7/2019 |
| CN | 110073265 A | 7/2019 |
| CN | 209388019 U | 9/2019 |
| CN | 209400783 U | 9/2019 |
| CN | 110320642 A | 10/2019 |
| CN | 209640582 U | 11/2019 |
| CN | 111123489 A | 5/2020 |
| JP | H11-006955 A | 1/1999 |
| JP | 2006-201674 A | 8/2006 |
| JP | 2007-279547 A | 10/2007 |
| JP | 2007-279548 A | 10/2007 |
| JP | 2008-164989 A | 7/2008 |
| JP | 2009-156950 A | 7/2009 |
| JP | 2016-170446 A | 9/2016 |
| JP | 2016-218471 A | 12/2016 |
| TW | I627463 B | 6/2018 |
| TW | M569426 U | 11/2018 |
| TW | I674448 B | 10/2019 |
| TW | I690724 B | 4/2020 |
| WO | 2019188018 A1 | 10/2019 |
| WO | 2020078014 A | 4/2020 |

OTHER PUBLICATIONS

Office Action cited in TW Application No. 108112513 dated Oct. 4, 2019.

* cited by examiner

OPTICAL PHOTOGRAPHING LENS ASSEMBLY, FINGERPRINT IDENTIFICATION MODULE AND ELECTRONIC DEVICE

RELATED APPLICATIONS

This application claims priority to Taiwan Application 108112513, filed on Apr. 10, 2019, which is incorporated by reference herein in its entirety.

BACKGROUND

Technical Field

The present disclosure relates to an optical photographing lens assembly, a fingerprint identification module and an electronic device, more particularly to an optical photographing lens assembly and a fingerprint identification module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical photographing lens assembly includes three lens elements. The three lens elements are, in order from an object side to an image side, a first lens element, a second lens element and a third lens element. Each of the three lens elements has an object-side surface facing toward the object side and an image-side surface facing toward the image side.

The object-side surface of the first lens element is concave in a paraxial region thereof, the object-side surface of the first lens element is aspheric and has at least one inflection point, and the object-side surface of the first lens element has at least one critical point in an off-axis region thereof. The optical photographing lens assembly has a total of three lens elements.

When a focal length of the optical photographing lens assembly is f, an entrance pupil diameter of the optical photographing lens assembly is EPD, an Abbe number of the first lens element is V1, an Abbe number of the second lens element is V2, and an Abbe number of the third lens element is V3, the following conditions are satisfied:

$0.50 < f/EPD < 1.9$; and $110.0 < V1 + V2 + V3 < 200.0$.

According to another aspect of the present disclosure, an optical photographing lens assembly includes three lens elements. The three lens elements are, in order from an object side to an image side, a first lens element, a second lens element and a third lens element. Each of the three lens elements has an object-side surface facing toward the object side and an image-side surface facing toward the image side.

The object-side surface of the first lens element is concave in a paraxial region thereof, the object-side surface of the first lens element is aspheric and has at least one inflection point, and the object-side surface of the first lens element has at least one critical point in an off-axis region thereof. The optical photographing lens assembly has a total of three lens elements.

When a focal length of the optical photographing lens assembly is f, an entrance pupil diameter of the optical photographing lens assembly is EPD, a central thickness of the second lens element is CT2, and an axial distance between the second lens element and the third lens element is T23, the following conditions are satisfied:

$0.50 < f/EPD < 1.9$; and $0 < CT2/T23 < 3.4$.

According to another aspect of the present disclosure, an optical photographing lens assembly includes three lens elements. The three lens elements are, in order from an object side to an image side, a first lens element, a second lens element and a third lens element. Each of the three lens elements has an object-side surface facing toward the object side and an image-side surface facing toward the image side.

The object-side surface of the first lens element is concave in a paraxial region thereof, the object-side surface of the first lens element is aspheric and has at least one inflection point, and the object-side surface of the first lens element has at least one critical point in an off-axis region thereof. The object-side surface of the third lens element is convex in a paraxial region thereof. The optical photographing lens assembly has a total of three lens elements.

When a curvature radius of the object-side surface of the first lens element is R1, and an entrance pupil diameter of the optical photographing lens assembly is EPD, the following condition is satisfied:

$-6.0 < R1/EPD < 0$.

According to another aspect of the present disclosure, a fingerprint identification module includes the aforementioned optical photographing lens assembly and an image sensor, wherein the image sensor is disposed on an image surface of the optical photographing lens assembly.

According to another aspect of the present disclosure, an electronic device includes the aforementioned fingerprint identification module and a light-permeable sheet, wherein the light-permeable sheet is disposed between the optical photographing less assembly and an imaged object.

BRIEF DESCRIPTION OF THE DRAWINGS

The disclosure can be better understood by reading the following detailed description of the embodiments, with reference made to the accompanying drawings as follows.

DETAILED DESCRIPTION

An electronic device includes a fingerprint identification module and a light-permeable sheet. The fingerprint identification module includes an optical photographing lens assembly, and the optical photographing lens assembly includes three lens elements. The three lens elements are, in order from an object side to an image side, a first lens element, a second lens element and a third lens element. Each of the three lens elements of the optical photographing lens assembly has an object-side surface facing toward the object side and an image-side surface facing toward the image side. The light-permeable sheet is disposed between the first lens element of the optical photographing lens assembly and an imaged object.

The optical photographing lens assembly has a total of three lens elements. Therefore, it is favorable for obtaining a balance among a short total track length, a large aperture size and a wide field of view of the optical photographing lens assembly, and meeting the requirements of the fingerprint identification module.

The object-side surface of the first lens element is concave in a paraxial region thereof. Therefore, it is favorable for miniaturizing the optical photographing lens assembly in the configuration of wide field of view. The first lens element can have negative refractive power. Therefore, it is favorable for gathering light rays at wide field of view into the optical photographing lens assembly. The image-side surface of the first lens element can be concave in a paraxial region thereof. Therefore, it is favorable for adjusting the incident direction of light rays on the second lens element so as to correct aberrations and eliminate stray light.

The second lens element can have positive refractive power. Therefore, it is favorable for balancing the positive refractive power distribution so as to correct aberrations caused by reduction of the total track length. The object-side surface of the second lens element can be convex in a paraxial region thereof. Therefore, it is favorable for adjusting the refractive power of the second lens element and collaborating with the first lens element for correcting aberrations.

The third lens element can have positive refractive power. Therefore, it is favorable for reducing the total track length and reducing the incident angle of light on an image surface of the optical photographing lens assembly so as to improve response efficiency of the image sensor. The object-side surface of the third lens element can be convex in a paraxial region thereof. Therefore, it is favorable for adjusting the refractive power of the third lens element so as to correct aberrations and reduce the total track length. The image-side surface of the third lens element can be convex in a paraxial region thereof. Therefore, it is favorable for adjusting the travelling direction of light rays so as to correct aberrations such as off-axis field curvature.

Figure 44:
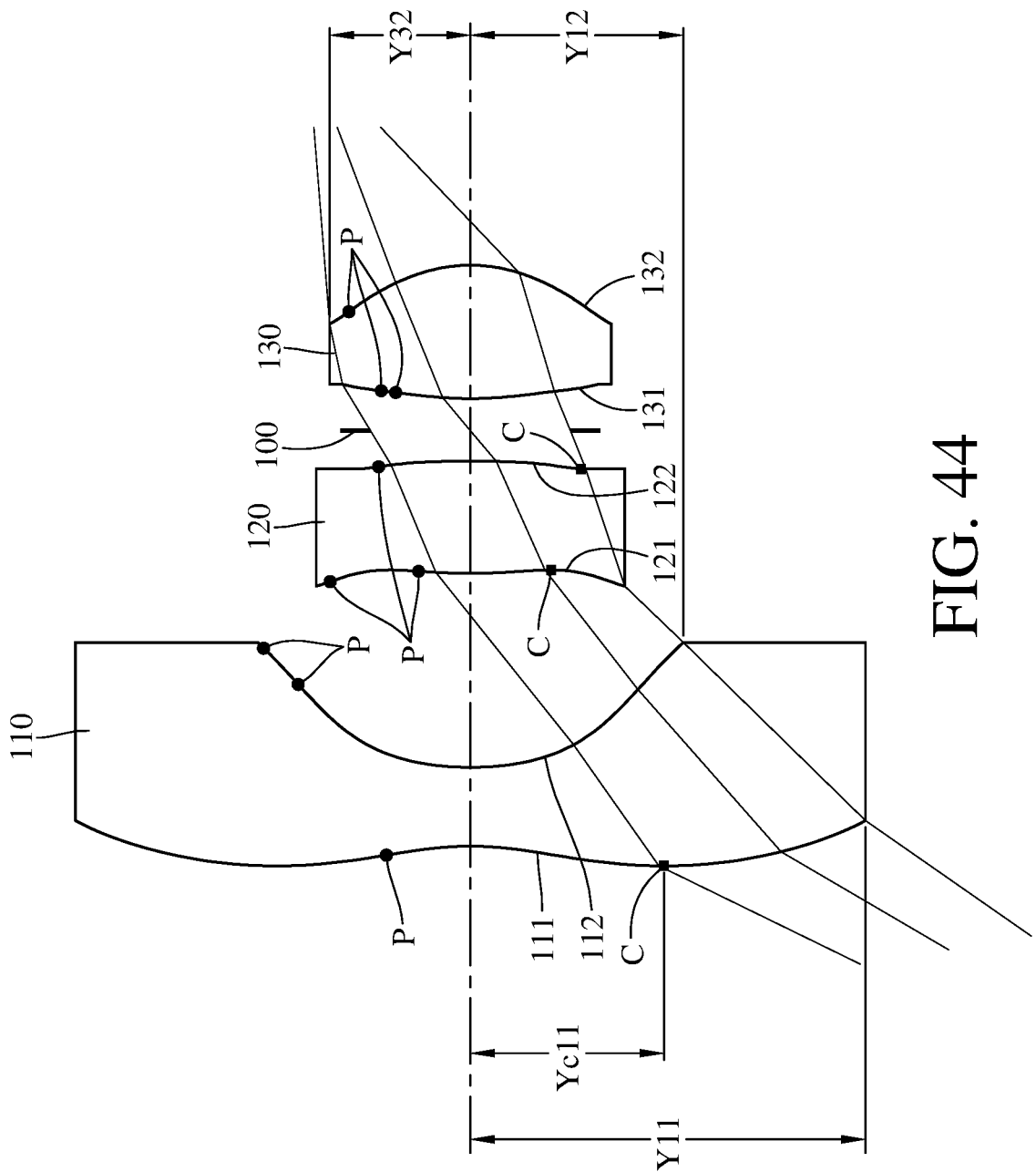
FIG. 44 shows a schematic view of Y11, Y12, Y32, Yc11 and inflection points and critical points of the three lens elements according to the 1st embodiment of the present disclosure.

According to the present disclosure, at least one lens element of the optical photographing lens assembly can have at least one aspheric surface having at least one inflection point. Therefore, it is favorable for increasing the shape variation of the lens element so as to miniaturize of the optical photographing lens assembly and improve image quality. Moreover, each of at least two lens elements of the optical photographing lens assembly can have at least one aspheric surface having at least one inflection point. Moreover, each of the three lens elements of the optical photographing lens assembly can have at least one aspheric surface having at least one inflection point. Moreover, the object-side surface of the first lens element is aspheric and has at least one inflection point. Therefore, it is favorable for adjusting the shape of the first lens element such that the optical photographing lens assembly is applicable to a configuration of large aperture size and wide field of view. Moreover, the object-side surface of the second lens element can be aspheric and can have at least one inflection point. Therefore, it is favorable for improving peripheral image quality and miniaturizing the optical photographing lens assembly. Please refer to FIG. 44, which shows a schematic view of inflection points P of the first lens element 110, the second lens element 120 and the third lens element 130 according to the 1st embodiment of the present disclosure.

According to the present disclosure, at least one lens element of the optical photographing lens assembly can have at least one lens surface having at least one critical point in an off-axis region thereof. Therefore, it is favorable for increasing the shape variation of the lens elements so as to increase image quality and illuminance. Moreover, each of at least two lens elements of the optical photographing lens assembly can have at least one lens surface having at least one critical point in an off-axis region thereof. Moreover, the object-side surface of the first lens element has at least one critical point in an off-axis region thereof. Therefore, it is favorable for adjusting the travelling direction of light rays at wide field of view so as to correct aberrations such as distortion, thereby further improving image quality on the peripheral region of the image surface. Moreover, the object-side surface of the second lens element can have at least one critical point in an off-axis region thereof. Therefore, it is favorable for improving image quality and illuminance on the peripheral region of the image surface. Please refer to FIG. 44, which shows a schematic view of critical points C of the first lens element 110 and the second lens element 120 according to the 1st embodiment of the present disclosure.

When a focal length of the optical photographing lens assembly is f, and an entrance pupil diameter of the optical photographing lens assembly is EPD, the following condition is satisfied: $0.50 < f/EPD < 1.9$. Therefore, it is favorable for providing a configuration of large aperture size and wide field of view. Moreover, the following condition can also be satisfied: $0.80 < f/EPD < 1.7$.

When an Abbe number of the first lens element is V1, an Abbe number of the second lens element is V2, and an Abbe number of the third lens element is V3, the following condition can be satisfied: $110.0 < V1+V2+V3 < 200.0$. Therefore, it is favorable for the materials of the lens elements to collaborate with one another for correcting aberrations. Moreover, the following condition can also be satisfied: $120.0 < V1+V2+V3 < 180.0$. According to the present disclosure, the Abbe number V of one lens element is obtained from the following equation: $V=(Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When a central thickness of the second lens element is CT2, and an axial distance between the second lens element and the third lens element is T23, the following condition can be satisfied: $0 < CT2/T23 < 3.4$. Therefore, it is favorable for the second and third lens elements to collaborate with each other for reducing the total track length. Moreover, the following condition can also be satisfied: $0.50 < CT2/T23 < 2.7$.

When a curvature radius of the object-side surface of the first lens element is R1, and the entrance pupil diameter of the optical photographing lens assembly is EPD, the following condition can be satisfied: $-9.0 < R1/EPD < 0$. Therefore, it is favorable for adjusting the shape of the first lens element and aperture size so as to obtaining a balance among a short total track length, a large aperture size and a wide field of view. Moreover, the following condition can also be satisfied: $-6.0 < R1/EPD < 0$. Moreover, the following condition can also be satisfied: $-5.4 < R1/EPD < -1.0$.

When the central thickness of the second lens element is CT2, a central thickness of the third lens element is CT3, and the axial distance between the second lens element and the third lens element is T23, the following condition can be satisfied: $0 < (CT2+CT3)/T23 < 7.2$. Therefore, it is favorable for the second and third lens elements to collaborate with each other for correcting aberrations such as off-axis distortion. Moreover, the following condition can also be satisfied: $1.4 < (CT2+CT3)/T23 < 6.6$.

When the focal length of the optical photographing lens assembly is f, a focal length of the first lens element is f1, a focal length of the second lens element is f2, and a focal length of the third lens element is f3, at least one of the following conditions can be satisfied: $|f/f1| < 0.80$;

|f/f2|<0.80; and |f/f3|<0.80. Therefore, it is favorable for increasing the field of view and correcting aberrations caused by a single lens element. Moreover, at least one of the following conditions can also be satisfied: 0.20<|f/f1|<0.60; |f/f2|<0.30; and |f/f3|<0.70.

Figure 45:
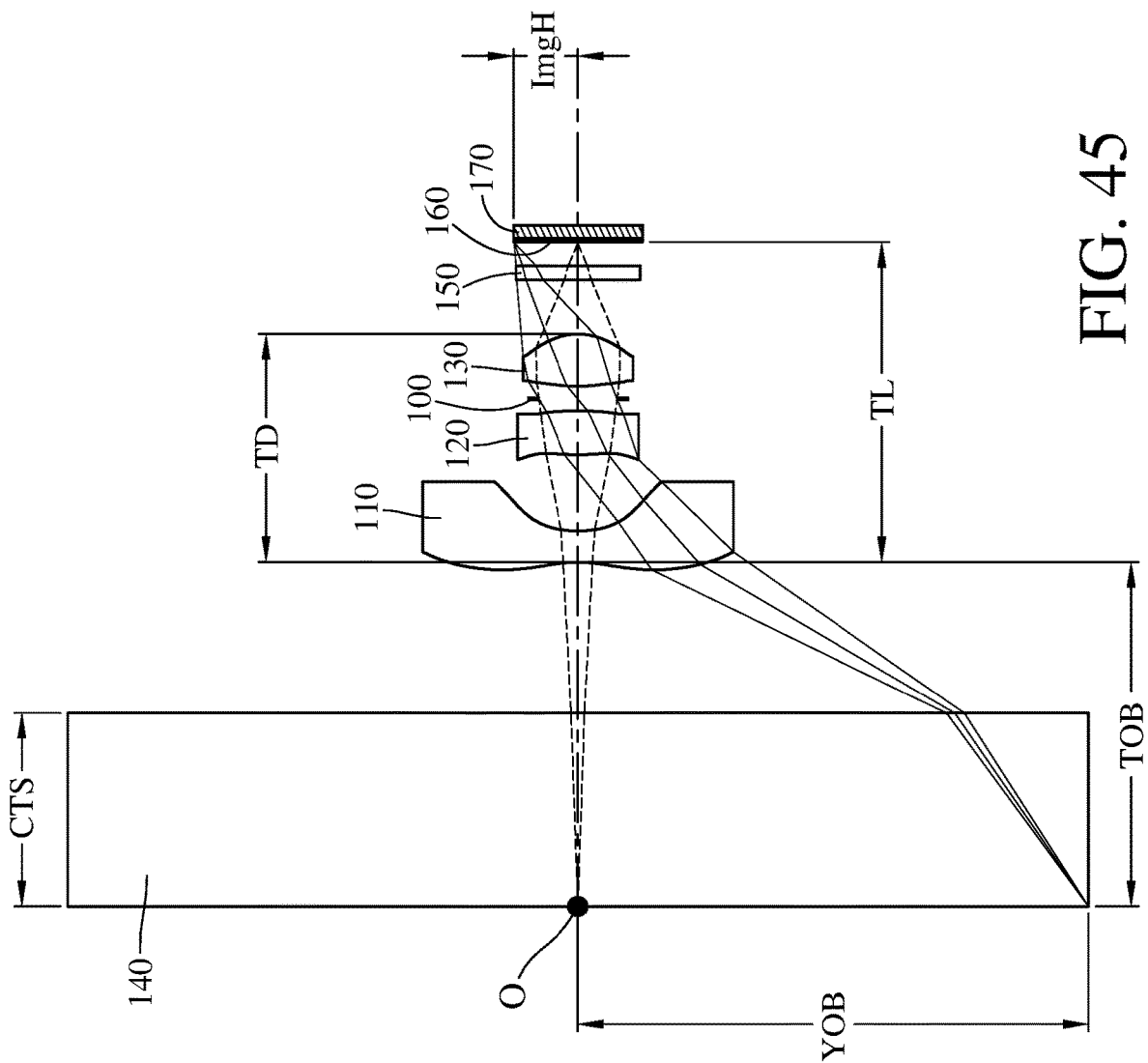
FIG. 45 shows a schematic view of CTS, ImgH, TD, TL, TOB and YOB according to the 1st embodiment of the present disclosure.

When an axial distance between the object-side surface of the first lens element and the image surface is TL, and the entrance pupil diameter of the optical photographing lens assembly is EPD, the following condition can be satisfied: 1.0<TL/EPD<16.5. Therefore, it is favorable for obtaining a balance between a short total track length and a large aperture size. Moreover, the following condition can also be satisfied: 4.0<TL/EPD<15.0. Please refer to FIG. 45, which shows a schematic view of TL according to the 1st embodiment of the present disclosure.

When a maximum field of view of the optical photographing lens assembly is FOV, the following condition can be satisfied: 90.0 [deg.]<FOV<180.0 [deg.]. Therefore, it is favorable for adjusting the field of view for various applications, and preventing distortion caused by an overly large field of view. Moreover, the following condition can also be satisfied: 100.0 [deg.]<FOV<160.0 [deg.].

When a maximum effective radius of the object-side surface of the first lens element is Y11, and a maximum effective radius of the image-side surface of the first lens element is Y12, the following condition can be satisfied: 1.1<Y11/Y12<4.0. Therefore, it is favorable for adjusting the shape of the first lens element such that light rays from various fields of view have proper incident angles on the first lens element so as to correct aberrations. Moreover, the following condition can also be satisfied: 1.4<Y11/Y12<3.2. Please refer to FIG. 44, which shows a schematic view of Y11 and Y12 according to the 1st embodiment of the present disclosure.

When the curvature radius of the object-side surface of the first lens element is R1, and a curvature radius of the image-side surface of the first lens element is R2, the following condition can be satisfied: |(R1+R2)/(R1−R2)|<0.45. Therefore, it is favorable for adjusting the shape of the first lens element so as to increase the field of view. Moreover, the following condition can also be satisfied: |(R1+R2)/(R1−R2)|<0.40.

When the Abbe number of the first lens element is V1, the Abbe number of the second lens element is V2, the Abbe number of the third lens element is V3, an Abbe number of the i-th lens element is Vi, a refractive index of the first lens element is N1, a refractive index of the second lens element is N2, a refractive index of the third lens element is N3, and a refractive index of the i-th lens element is Ni, at least one lens element of the optical photographing lens assembly can satisfy the following condition: 32.5<Vi/Ni<38.5, wherein i=1, 2, or 3. Therefore, a proper selection of materials of the lens elements is favorable for improving yield rate and reducing manufacturing costs. Moreover, when the first lens element of the optical photographing lens assembly satisfies the following condition: 32.5<V1/N1<38.5, it is favorable for improving manufacturing yield rate of the first lens element.

When the focal length of the second lens element is f2, and the focal length of the third lens element is f3, the following condition can be satisfied: 2.60<f2/f3<7.00. Therefore, it is favorable for the second and third lens elements to collaborate with each other for correcting aberrations.

When the axial distance between the object-side surface of the first lens element and the image surface is TL, the following condition can be satisfied: TL<6.5 [mm]. Therefore, it is favorable for obtaining a compact configuration of the optical photographing lens assembly for various applications. Moreover, the following condition can also be satisfied: TL<4.5 [mm]. Moreover, the following condition can also be satisfied: TL<3.0 [mm].

When a central thickness of the first lens element is CT1, and the central thickness of the second lens element is CT2, the following condition can be satisfied: 0<CT2/CT1<1.49. Therefore, it is favorable for adjusting the thickness ratio of the lens elements so as to reduce the total track length. Moreover, the following condition can also be satisfied: 0.18<CT2/CT1≤1.42.

When a curvature radius of the object-side surface of the second lens element is R3, and a curvature radius of the image-side surface of the second lens element is R4, the following condition can be satisfied: −9.0<(R3+R4)/(R3−R4)<0. Therefore, it is favorable for adjusting the shape of the second lens element so as to correct off-axis aberrations. Moreover, the following condition can also be satisfied: −7.0<(R3+R4)/(R3−R4)<−0.10. Moreover, the following condition can also be satisfied: −5.0<(R3+R4)/(R3−R4)<−0.25.

When the axial distance between the object-side surface of the first lens element and the image surface is TL, and the focal length of the optical photographing lens assembly is f, the following condition can be satisfied: 5.00<TL/f<13.0. Therefore, it is favorable for obtaining a balance between reducing the total track length and increasing the field of view. Moreover, the following condition can also be satisfied: 5.60<TL/f<12.0.

When the maximum effective radius of the object-side surface of the first lens element is Y11, and a maximum effective radius of the image-side surface of the third lens element is Y32, the following condition can be satisfied: 1.2<Y11/Y32<7.0. Therefore, it is favorable for adjusting the ratio between the outer diameters of the lens elements so as to increase the field of view and reduce the size of the optical photographing lens assembly. Moreover, the following condition can also be satisfied: 1.5<Y11/Y32<5.0. Please refer to FIG. 44, which shows a schematic view of Y11 and Y32 according to the 1st embodiment of the present disclosure.

When the Abbe number of the third lens element is V3, and the refractive index of the third lens element is N3, the following condition can be satisfied: 10.0<V3/N3<30.0. Therefore, a proper selection of the material of the third lens element is favorable for correcting aberrations such as chromatic aberration. Moreover, the following condition can also be satisfied: 11.0<V3/N3<21.0.

According to the present disclosure, at least two lens elements of the optical photographing lens assembly can be made of plastic material. Therefore, it is favorable for reducing manufacturing costs and increasing mass production, and it is also favorable for increasing the shape variation of the lens elements so as to reduce aberrations and miniaturize the optical photographing lens assembly. Moreover, all of the three lens elements of the optical photographing lens assembly can be made of plastic material.

When a sum of central thicknesses of all lens elements of the optical photographing lens assembly is ΣCT, and a sum of axial distances between each of all adjacent lens elements of the optical photographing lens assembly is EAT, the following condition can be satisfied: 1.0<ΣCT/ΣAT<2.8. Therefore, it is favorable for adjusting the axial thicknesses and axial distances between adjacent lens elements so as to miniaturize the optical photographing lens assembly. Moreover, the following condition can also be satisfied: $1.2<\Sigma CT/\Sigma AT<2.5$.

When the Abbe number of the second lens element is V2, and the Abbe number of the third lens element is V3, the following condition can be satisfied: $57.0<V2+V3<140$. Therefore, it is favorable for the second and third lens elements to collaborate with each other for correcting aberrations. Moreover, the following condition can also be satisfied: $64.0<V2+V3<130$. Moreover, the following condition can also be satisfied: $71.0<V2+V3<120$.

When an axial distance between the first lens element and the second lens element is T12, and the axial distance between the second lens element and the third lens element is T23, the following condition can be satisfied: $0<T12/T23\leq4.69$. Therefore, it is favorable for adjusting the axial distances between adjacent lens elements so as to reduce the total track length and correct aberrations such as distortion. Moreover, the following condition can also be satisfied: $1.00<T12/T23\leq4.69$.

When the focal length of the optical photographing lens assembly is f, the entrance pupil diameter of the optical photographing lens assembly is EPD, and half of the maximum field of view of the optical photographing lens assembly is HFOV, the following condition can be satisfied: $1.00<f/EPD+\cot(HFOV)<2.50$. Therefore, it is favorable for obtaining a balance between the field of view and aperture size. Moreover, the following condition can also be satisfied: $1.35<f/EPD+\cot(HFOV)<2.15$.

When the maximum effective radius of the object-side surface of the first lens element is Y11, and an axial distance between the object-side surface of the first lens element and the image-side surface of the third lens element is TD, the following condition can be satisfied: $0.61<Y11/TD<1.0$. Therefore, it is favorable for adjusting the size distribution of the optical photographing lens assembly so as to meet the requirement of compactness at the configuration of wide field of view.

When a maximum value among refractive indexes of all lens elements of the optical photographing lens assembly is Nmax, the following condition can be satisfied: $1.50<Nmax<1.70$. Therefore, a proper selection of materials of the lens elements is favorable for correcting aberrations.

When a vertical distance between the critical point on the object-side surface of the first lens element and an optical axis is Yc11, and the maximum effective radius of the object-side surface of the first lens element is Y11, the following condition can be satisfied: $0.15<Yc11/Y11<0.75$. Therefore, it is favorable for adjusting the position of the critical point so as to further improve image quality. Moreover, the following condition can also be satisfied: $0.25<Yc11/Y11<0.65$. Please refer to FIG. 44, which shows a schematic view of Yc11 and Y11 according to the 1st embodiment of the present disclosure.

When the Abbe number of the second lens element is V2, and the Abbe number of the third lens element is V3, at least one of the following conditions can be satisfied: $34.0<V2<70.0$; and $10.0<V3<70.0$. Therefore, a proper selection of materials of the lens elements is favorable for correcting aberrations. Moreover, at least one of the following conditions can also be satisfied: $42.0<V2<65.0$; and $15.0<V3<60.0$. Moreover, the following condition can also be satisfied: $50.0<V2<60.0$.

When a curvature radius of the object-side surface of the third lens element is R5, and a curvature radius of the image-side surface of the third lens element is R6, the following condition can be satisfied: $-8.5<R5/R6<-1.2$. Therefore, it is favorable for adjusting the refractive power of the third lens element so as to reduce the total track length. Moreover, the following condition can also be satisfied: $-6.5<R5/R6<-1.5$.

According to the present disclosure, the optical photographing lens assembly can be operated within a wavelength range of 400 nanometers (nm) to 700 nm. Therefore, using visible light as a light source is favorable for reducing the need of additional light sources, and the optical photographing lens assembly can work with light rays emitting from OLED (Organic light-emitting diode) displays. Moreover, the optical photographing lens assembly can also be operated within a wavelength range of 480 nm to 600 nm. Moreover, the optical photographing lens assembly can also be operated within a wavelength range of 500 nm to 575 nm.

According to the present disclosure, the optical photographing lens assembly further includes an aperture stop, and the aperture stop can be disposed between the first lens element and the third lens element. Therefore, it is favorable for adjusting the position of the aperture stop so as to obtain a balance between a wide field of view and a short total track length, and also favorable for correcting aberrations. Moreover, the aperture stop can also be disposed between the second lens element and the third lens element.

When an axial distance between the aperture stop and the image surface is SL, and the axial distance between the object-side surface of the first lens element and the image surface is TL, the following condition can be satisfied: $0.20<SL/TL<0.65$. Therefore, it is favorable for further adjusting the position of the aperture stop so as to reduce distortion.

When an axial distance between the imaged object and the object-side surface of the first lens element is TOB, and the axial distance between the object-side surface of the first lens element and the image surface is TL, the following condition can be satisfied: $0.50 \text{ [mm]}<TOB+TL<8.0 \text{ [mm]}$. Therefore, it is favorable for the imaged object and the image surface to have a proper distance therebetween so as to obtain a balance between the miniaturization and image quality of the optical photographing lens assembly. Moreover, the following condition can also be satisfied: $1.0 \text{ [mm]}<TOB+TL<7.0 \text{ [mm]}$. Moreover, the following condition can also be satisfied: $1.5 \text{ [mm]}<TOB+TL<6.0 \text{ [mm]}$. Please refer to FIG. 45, which shows a schematic view of TOB and TL according to the 1st embodiment of the present disclosure.

When the axial distance between the imaged object and the object-side surface of the first lens element is TOB, the axial distance between the object-side surface of the first lens element and the image surface is TL, and the entrance pupil diameter of the optical photographing lens assembly is EPD, the following condition can be satisfied: $(TOB+TL)/EPD<28.0$. Therefore, it is favorable for obtaining a balance among the miniaturization, high image quality and large aperture of the optical photographing lens assembly. Moreover, the following condition can also be satisfied: $7.0<(TOB+TL)/EPD<25.0$.

When the axial distance between the imaged object and the object-side surface of the first lens element is TOB, and the axial distance between the object-side surface of the first lens element and the image surface is TL, the following condition can be satisfied: $0<TOB/TL<2.0$. Therefore, it is favorable for adjusting the ratio of the object distance to the total track length so as to miniaturize the optical photographing lens assembly, and it is also favorable for adjusting the optical magnification. Moreover, the following condition can also be satisfied: $0.30<TOB/TL<1.6$.

When a maximum image height of the optical photographing lens assembly (half of a diagonal length of an effective photosensitive area of an image sensor) is ImgH, and an object height corresponding to the maximum image height of the optical photographing lens assembly is YOB, the following condition can be satisfied: $1.5<YOB/ImgH<9.5$. Therefore, it is favorable for adjusting the optical magnification for various applications. Moreover, the following condition can also be satisfied: $3.5<YOB/ImgH<9.0$. Please refer to FIG. 45, which shows a schematic view of YOB and ImgH according to the 1st embodiment of the present disclosure.

When a central thickness of the light-permeable sheet is CTS, the following condition can be satisfied: $0.2$ [mm] $<CTS<3.0$ [mm]. Therefore, it is favorable for preventing the light-permeable sheet from being overly thick so as to miniaturize the optical photographing lens assembly, and it is also favorable for preventing the light-permeable sheet from being overly thin so as to ensure that the light-permeable sheet has sufficient structural strength against external forces. Moreover, the following condition can also be satisfied: $0.4$ [mm] $<CTS<2.4$ [mm]. Moreover, the following condition can also be satisfied: $0.6$ [mm] $<CTS<1.8$ [mm]. Please refer to FIG. 45, which shows a schematic view of CTS according to the 1st embodiment of the present disclosure.

When the axial distance between the object-side surface of the first lens element and the image-side surface of the third lens element is TD, and the central thickness of the light-permeable sheet is CTS, the following condition can be satisfied: $0.50<TD/CTS<7.5$. Therefore, it is favorable for preventing the optical photographing lens assembly and the light-permeable sheet from being overly large. Moreover, the following condition can also be satisfied: $0.80<TD/CTS<5.0$.

According to the present disclosure, the aforementioned features and conditions can be utilized in numerous combinations so as to achieve corresponding effects.

According to the present disclosure, the lens elements of the optical photographing lens assembly can be made of either glass or plastic material. When the lens elements are made of glass material, the refractive power distribution of the optical photographing lens assembly may be more flexible. The glass lens element can either be made by grinding or molding. When the lens elements are made of plastic material, the manufacturing costs can be effectively reduced. Furthermore, surfaces of each lens element can be arranged to be aspheric, which allows more control variables for eliminating aberrations thereof, the required number of the lens elements can be reduced, and the total track length of the optical photographing lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters of the optical photographing lens assembly, fingerprint identification module and electronic device are not specifically defined, these parameters may be determined according to the operating wavelength range.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical photographing lens assembly, based on the corresponding image sensor, can be flat or curved, especially a curved surface being concave facing towards the object side of the optical photographing lens assembly.

According to the present disclosure, an image correction unit, such as a field flattener, can be optionally disposed between the lens element closest to the image side of the optical photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the fingerprint identification module. In general, a preferable image correction unit is, for example, a thin transparent element having a concave object-side surface and a planar image-side surface, and the thin transparent element is disposed near the image surface.

According to the present disclosure, the optical photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing lens assembly and thereby provides a wider field of view for the same.

According to the present disclosure, the optical photographing lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
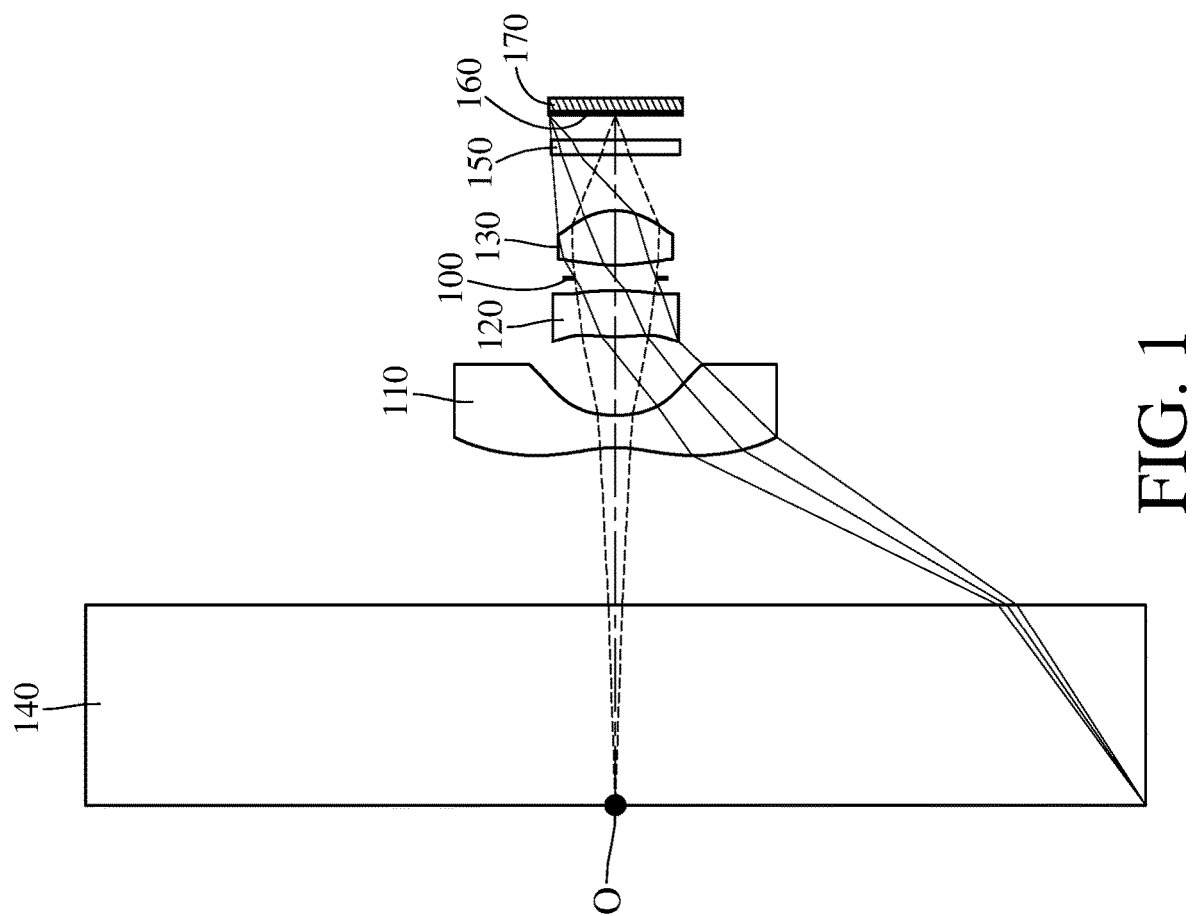
FIG. 1 is a schematic view of a fingerprint identification module and a light-permeable sheet according to the 1st embodiment of the present disclosure.
Figure 2:
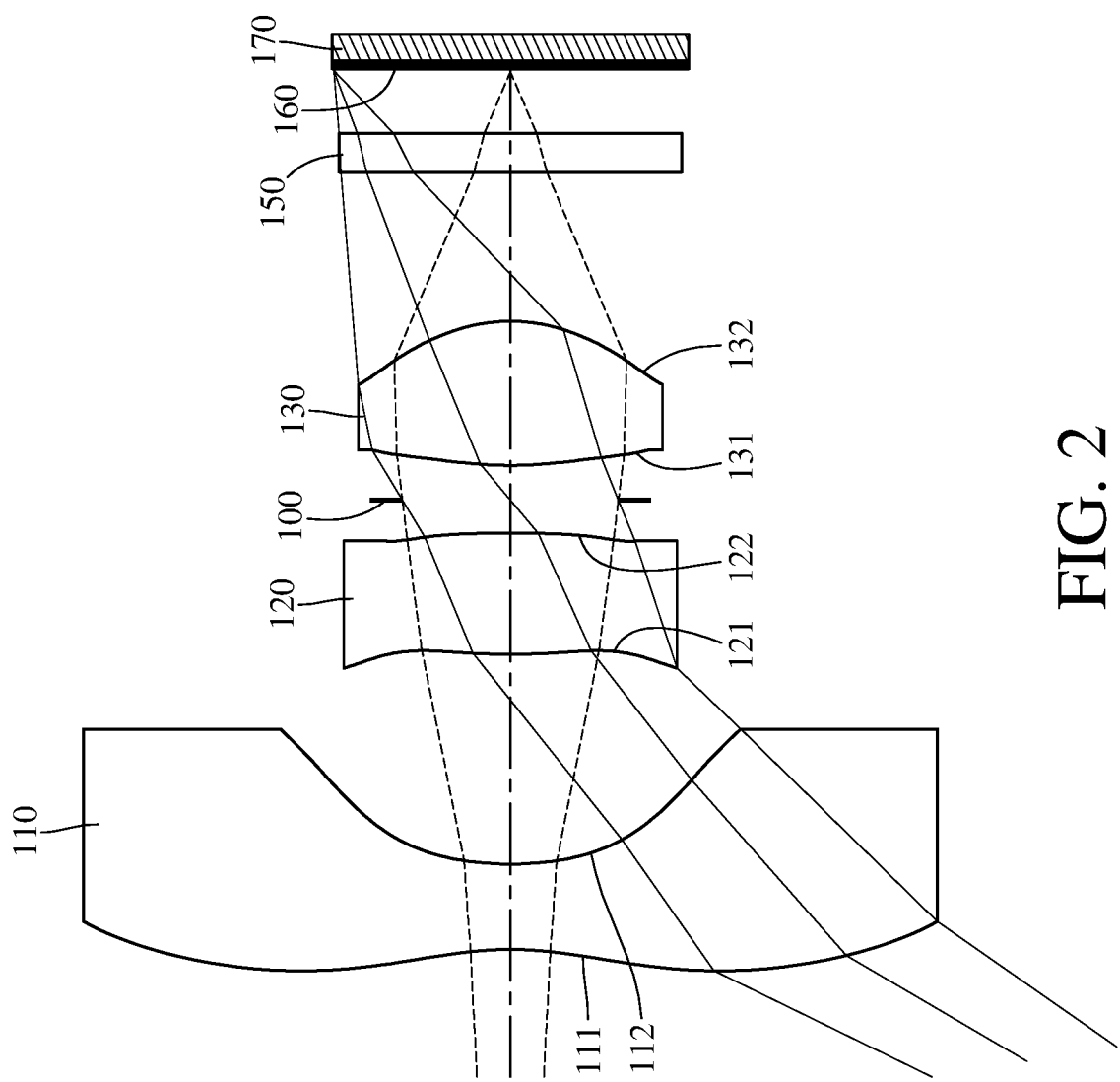
FIG. 2 is a schematic view of the fingerprint identification module in FIG. 1.
Figure 3:
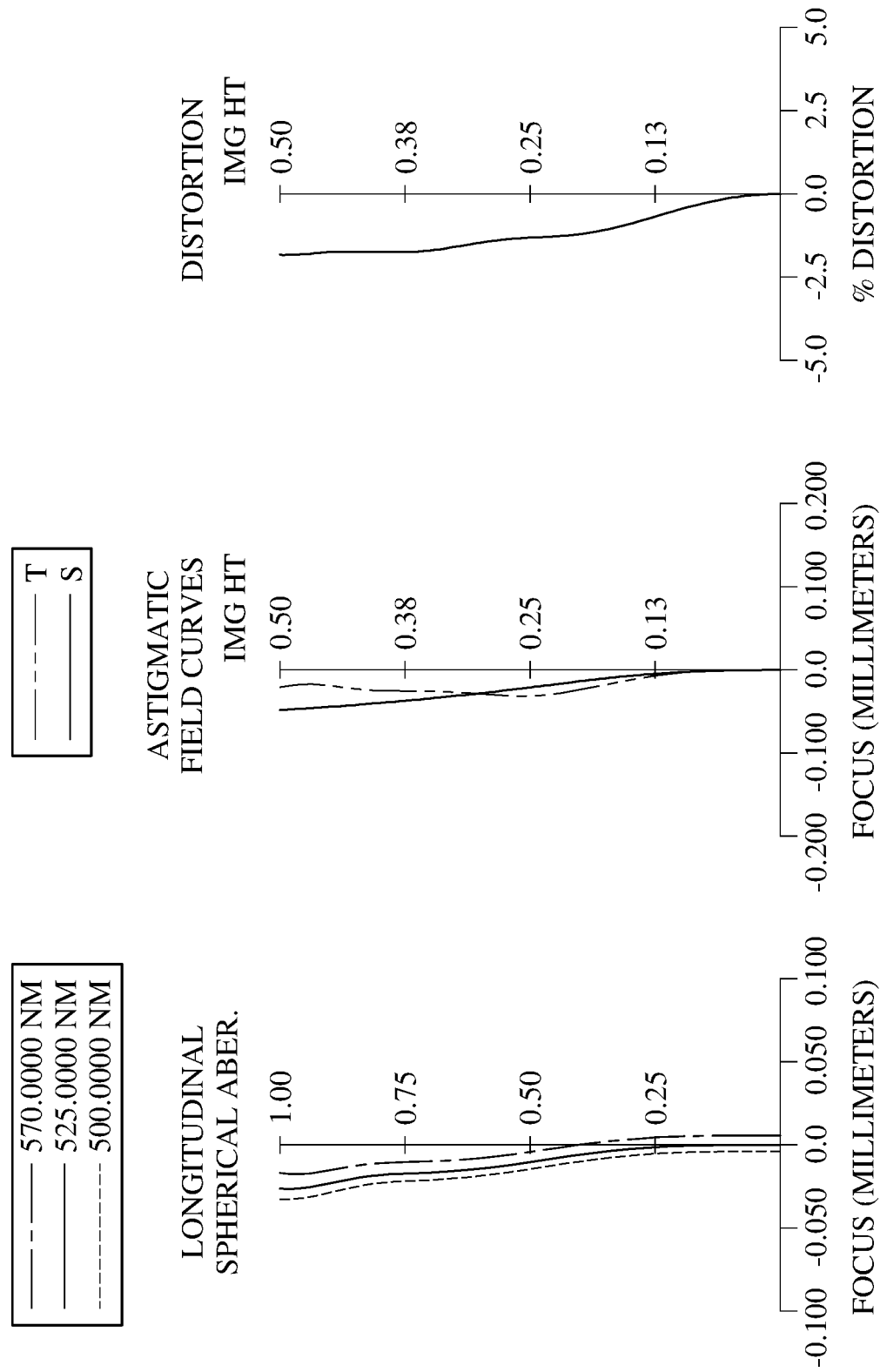
FIG. 3 shows spherical aberration curves, astigmatic field curves and a distortion curve of the fingerprint identification module according to the 1st embodiment.

FIG. 1 is a schematic view of a fingerprint identification module and a light-permeable sheet according to the 1st embodiment of the present disclosure. FIG. 2 is a schematic view of the fingerprint identification module in FIG. 1. FIG. 3 shows, in order from left to right, spherical aberration curves, astigmatic field curves and a distortion curve of the fingerprint identification module according to the 1st embodiment. In FIG. 1 and FIG. 2, the fingerprint identification module includes the optical photographing lens assembly (its reference numeral is omitted) of the present disclosure and an image sensor 170. The optical photographing lens assembly includes, in order from an object side to an image side, a first lens element 110, a second lens element 120, an aperture stop 100, a third lens element 130, a filter 150 and an image surface 160. The optical photographing lens assembly includes three lens elements (110, 120 and 130) with no additional lens element disposed between each of the adjacent three lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has two inflection points. The object-side surface 111 of the first lens element 110 has one critical point in an off-axis region thereof.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has two inflection points. The image-side surface 122 of the second lens element 120 has one inflection point. The object-side surface 121 of the second lens element 120 has one critical point in an off-axis region thereof. The image-side surface 122 of the second lens element 120 has one critical point in an off-axis region thereof.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric. The object-side surface 131 of the third lens element 130 has two inflection points. The image-side surface 132 of the third lens element 130 has one inflection point.

The light-permeable sheet 140 is made of glass material and located between an imaged object O and the first lens element 110, and will not affect the focal length of the optical photographing lens assembly. The filter 150 is made of glass material and located between the third lens element 130 and the image surface 160, and will not affect the focal length of the optical photographing lens assembly. The image sensor 170 is disposed on or near the image surface 160 of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16 and 18.

In the optical photographing lens assembly of the fingerprint identification module according to the 1st embodiment, when a focal length of the optical photographing lens assembly is f, an f-number of the optical photographing lens assembly in an working distance (in this condition, the working distance includes a central thickness of the light-permeable sheet 140) is Fno(work), an f-number of the optical photographing lens assembly for imaged object at an infinite distance is Fno(inf.), and half of a maximum field of view of the optical photographing lens assembly is HFOV, these parameters have the following values: f=0.34 millimeters (mm), Fno(work)=1.25, Fno(inf.)=1.21, HFOV=59.6 degrees (deg.).

When a maximum value among refractive indexes of all lens elements of the optical photographing lens assembly is Nmax, the following condition is satisfied: Nmax=1.567. In this embodiment, among the first lens element 110, the second lens element 120 and the third lens element 130, a refractive index of the third lens element 130 is larger than the refractive indexes of the other lens elements, and Nmax is equal to the refractive index of the third lens element 130.

When an Abbe number of the second lens element 120 is V2, the following condition is satisfied: V2=55.9.

When an Abbe number of the third lens element 130 is V3, the following condition is satisfied: V3=44.6.

When the Abbe number of the second lens element 120 is V2, and the Abbe number of the third lens element 130 is V3, the following condition is satisfied: V2+V3=100.5.

When an Abbe number of the first lens element 110 is V1, the Abbe number of the second lens element 120 is V2, and the Abbe number of the third lens element 130 is V3, the following condition is satisfied: V1+V2+V3=156.6.

When the Abbe number of the first lens element 110 is V1, and a refractive index of the first lens element 110 is N1, the following condition is satisfied: V1/N1=36.21.

When the Abbe number of the second lens element 120 is V2, and a refractive index of the second lens element 120 is N2, the following condition is satisfied: V2/N2=36.37.

When the Abbe number of the third lens element 130 is V3, and the refractive index of the third lens element 130 is N3, the following condition is satisfied: V3/N3=28.48.

When a sum of central thicknesses of all lens elements of the optical photographing lens assembly is ΣCT, and a sum of axial distances between each of all adjacent lens elements of the optical photographing lens assembly is ΣAT, the following condition is satisfied: ΣCT/ΣAT=1.26. In this embodiment, an axial distance between two adjacent lens elements is an air gap in a paraxial region between the two adjacent lens elements. In this embodiment, ΣCT is the sum of the central thicknesses of the first lens element 110, the second lens element 120, and the third lens element 130, and ΣAT is the sum of the axial distance between the first lens element 110 and the second lens element 120, and the axial distance between the second lens element 120 and the third lens element 130.

When the central thickness of the second lens element 120 is CT2, the central thickness of the third lens element 130 is CT3, and the axial distance between the second lens element 120 and the third lens element 130 is T23, the following condition is satisfied: (CT2+CT3)/T23=3.92.

When the central thickness of the first lens element 110 is CT1, and the central thickness of the second lens element 120 is CT2, the following condition is satisfied: CT2/CT1=1.42.

When the central thickness of the second lens element 120 is CT2, and the axial distance between the second lens element 120 and the third lens element 130 is T23, the following condition is satisfied: CT2/T23=1.79.

When a central thickness of the light-permeable sheet 140 is CTS, the following condition is satisfied: CTS=1.50 [mm].

When an axial distance between the aperture stop 100 and the image surface 160 is SL, and an axial distance between the object-side surface 111 of the first lens element 110 and the image surface 160 is TL, the following condition is satisfied: SL/TL=0.49.

When the axial distance between the first lens element 110 and the second lens element 120 is T12, and the axial distance between the second lens element 120 and the third lens element 130 is T23, the following condition is satisfied: T12/T23=3.10.

When an axial distance between the object-side surface 111 of the first lens element 110 and the image-side surface 132 of the third lens element 130 is TD, and the central thickness of the light-permeable sheet 140 is CTS, the following condition is satisfied: TD/CTS=1.18.

When the axial distance between the object-side surface 111 of the first lens element 110 and the image surface 160 is TL, the following condition is satisfied: TL=2.48 [mm].

When the axial distance between the object-side surface 111 of the first lens element 110 and the image surface 160 is TL, and an entrance pupil diameter of the optical photographing lens assembly is EPD, the following condition is satisfied: TL/EPD=8.83.

When the axial distance between the object-side surface 111 of the first lens element 110 and the image surface 160 is TL, and the focal length of the optical photographing lens assembly is f, the following condition is satisfied: TL/f=7.31.

When an axial distance between the imaged object O and the object-side surface 111 of the first lens element 110 is TOB, and the axial distance between the object-side surface 111 of the first lens element 110 and the image surface 160 is TL, the following condition is satisfied: TOB+TL=5.16 [mm].

When the axial distance between the imaged object O and the object-side surface 111 of the first lens element 110 is TOB, the axial distance between the object-side surface 111 of the first lens element 110 and the image surface 160 is TL, and the entrance pupil diameter of the optical photographing lens assembly is EPD, the following condition is satisfied: (TOB+TL)/EPD=18.33.

When the axial distance between the imaged object O and the object-side surface 111 of the first lens element 110 is TOB, and the axial distance between the object-side surface 111 of the first lens element 110 and the image surface 160 is TL, the following condition is satisfied: TOB/TL=1.08.

When a curvature radius of the object-side surface 111 of the first lens element 110 is R1, and a curvature radius of the image-side surface 112 of the first lens element 110 is R2, the following condition is satisfied: |(R1+R2)/(R1−R2)|=0.01

When the curvature radius of the object-side surface 111 of the first lens element 110 is R1, and the entrance pupil diameter of the optical photographing lens assembly is EPD, the following condition is satisfied: R1/EPD=−3.43.

When a curvature radius of the object-side surface 121 of the second lens element 120 is R3, and a curvature radius of the image-side surface 122 of the second lens element 120 is R4, the following condition is satisfied: (R3+R4)/(R3−R4)=−0.49.

When a curvature radius of the object-side surface 131 of the third lens element 130 is R5, and a curvature radius of the image-side surface 132 of the third lens element 130 is R6, the following condition is satisfied: R5/R6=−2.34.

When the focal length of the optical photographing lens assembly is f, and the entrance pupil diameter of the optical photographing lens assembly is EPD, the following condition is satisfied: f/EPD=1.21.

When the focal length of the optical photographing lens assembly is f, the entrance pupil diameter of the optical photographing lens assembly is EPD, and half of the maximum field of view of the optical photographing lens assembly is HFOV, the following condition is satisfied: f/EPD+cot(HFOV)=1.79.

When the focal length of the optical photographing lens assembly is f, and a focal length of the first lens element 110 is f1, the following condition is satisfied: |f/f1|=0.41.

When the focal length of the optical photographing lens assembly is f, and a focal length of the second lens element 120 is f2, the following condition is satisfied: |f/f2|=0.13.

When the focal length of the optical photographing lens assembly is f, and a focal length of the third lens element 130 is f3, the following condition is satisfied: |f/f3|=0.54.

When the focal length of the second lens element 120 is f2, and the focal length of the third lens element 130 is f3, the following condition is satisfied: f2/f3=4.35.

When the maximum field of view of the optical photographing lens assembly is FOV, the following condition is satisfied: FOV=119.3 [deg.].

When a maximum effective radius of the object-side surface 111 of the first lens element 110 is Y11, and the axial distance between the object-side surface 111 of the first lens element 110 and the image-side surface 132 of the third lens element 130 is TD, the following condition is satisfied: Y11/TD=0.68.

When the maximum effective radius of the object-side surface 111 of the first lens element 110 is Y11, and a maximum effective radius of the image-side surface 112 of the first lens element 110 is Y12, the following condition is satisfied: Y11/Y12=1.86.

When the maximum effective radius of the object-side surface 111 of the first lens element 110 is Y11, and a maximum effective radius of the image-side surface 132 of the third lens element 130 is Y32, the following condition is satisfied: Y11/Y32=2.81.

When a vertical distance between the critical point on the object-side surface 111 of the first lens element 110 and the optical axis is Yc11, and the maximum effective radius of the object-side surface 111 of the first lens element 110 is Y11, the following condition is satisfied: Yc11/Y11=0.49.

When a maximum image height of the optical photographing lens assembly is ImgH, and an object height corresponding to the maximum image height of the optical photographing lens assembly is YOB, the following condition is satisfied: YOB/ImgH=7.92.

The detailed optical data of the 1st embodiment are shown in Table 1 and the aspheric surface data are shown in Table 2 below.

sponding schematic parameter and aberration curves, and the definitions of the tables are the same as Table 1 and Table 2 of the 1st embodiment. Therefore, an explanation in this regard will not be provided again.

2nd Embodiment

Figure 4:
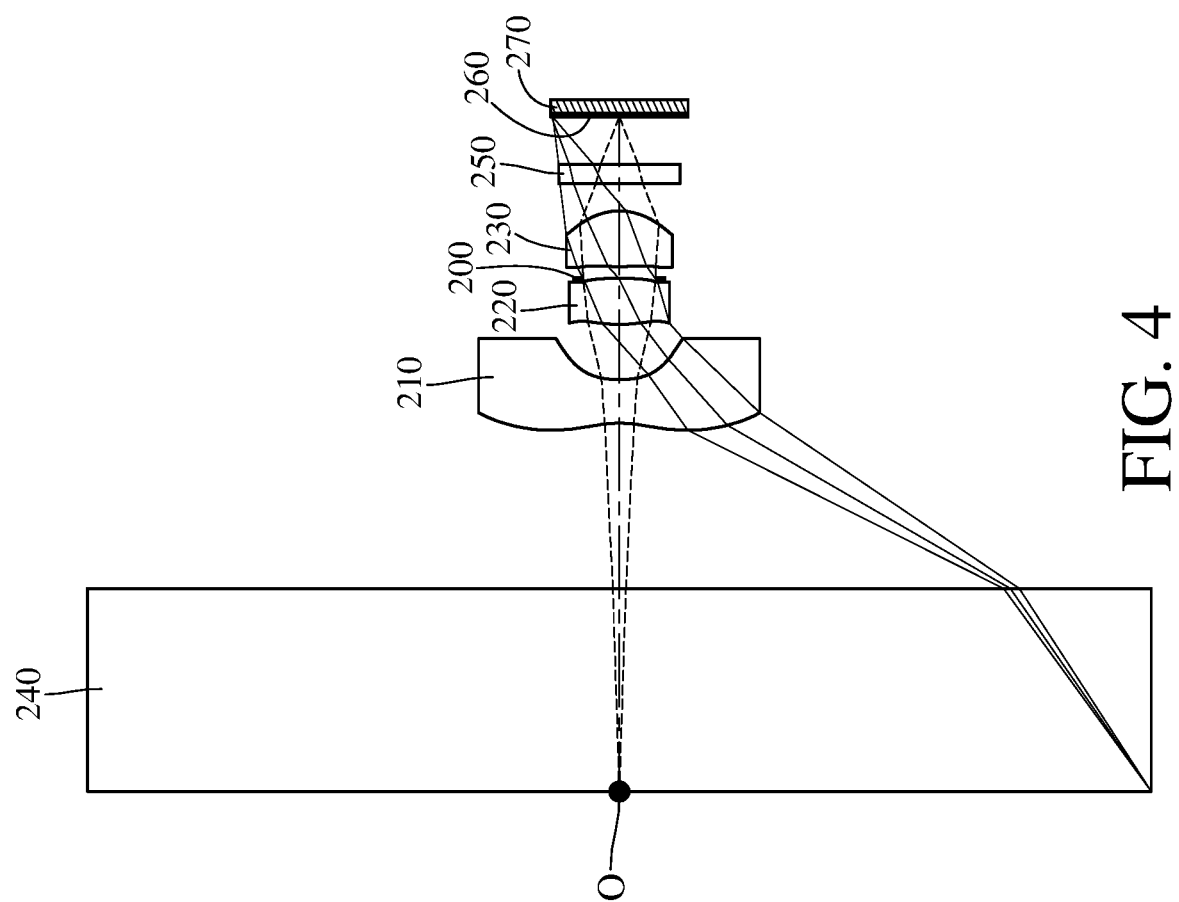
FIG. 4 is a schematic view of a fingerprint identification module and a light-permeable sheet according to the 2nd embodiment of the present disclosure.
Figure 5:
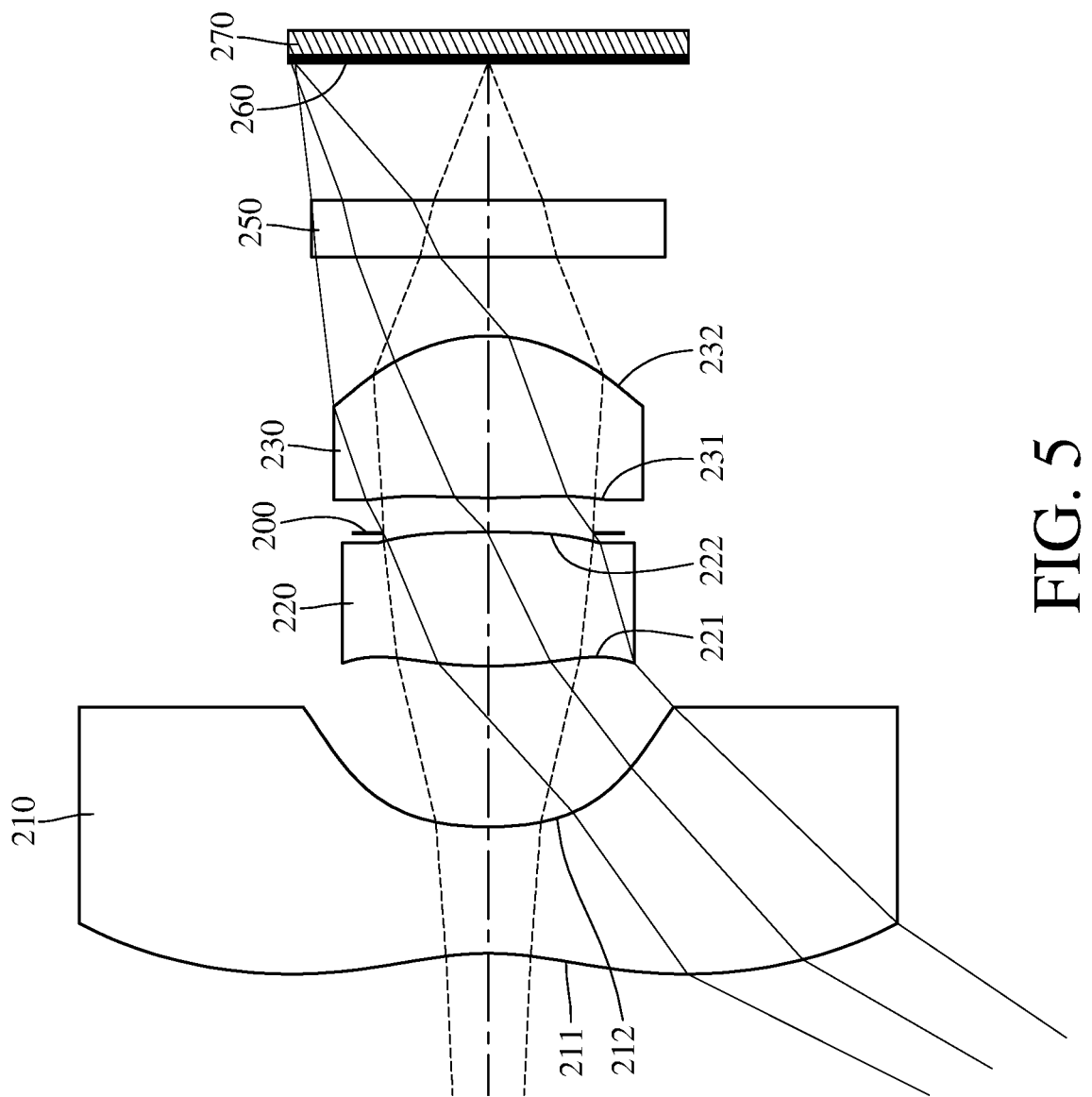
FIG. 5 is a schematic view of the fingerprint identification module in FIG. 4.
Figure 6:
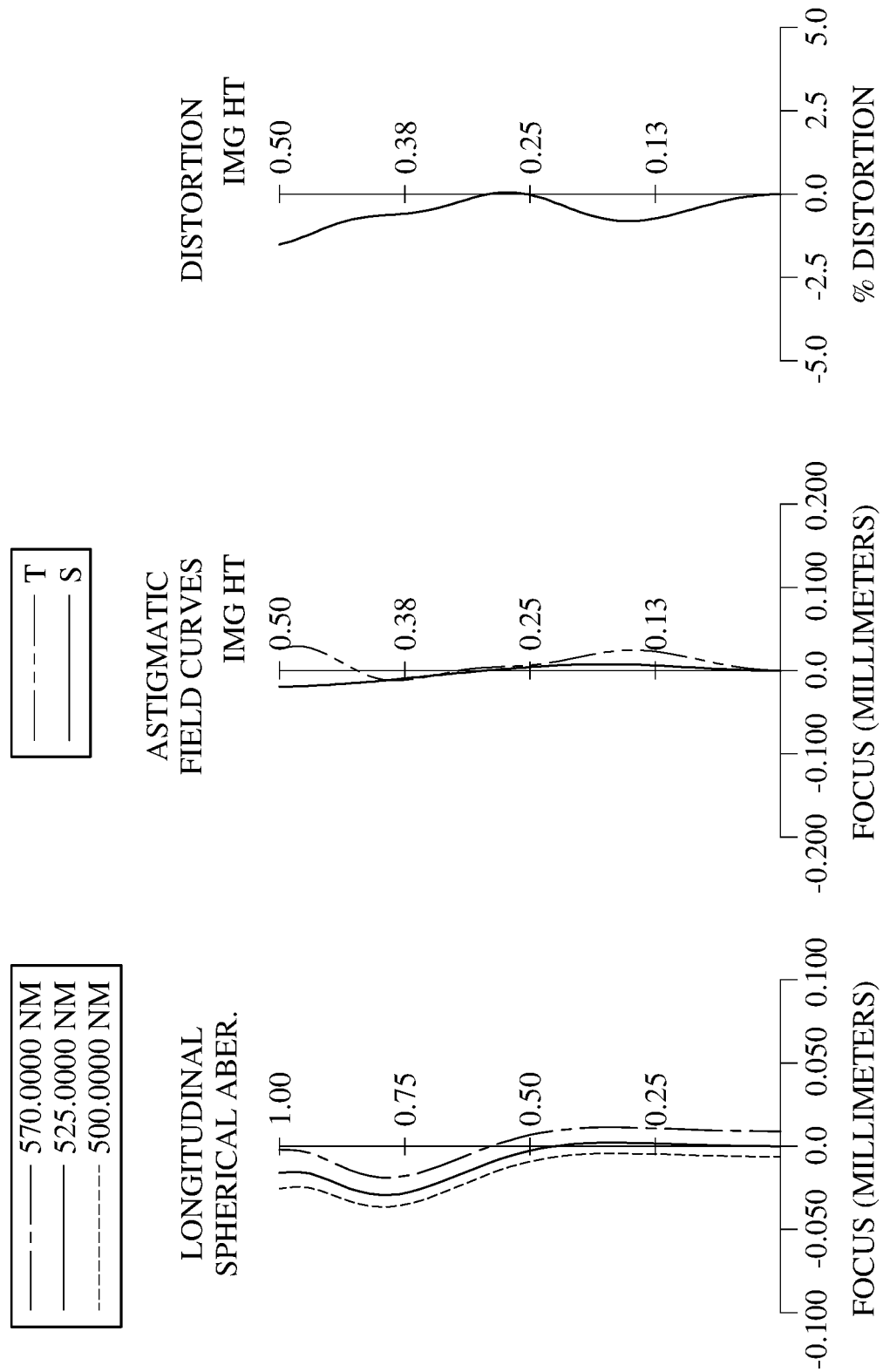
FIG. 6 shows spherical aberration curves, astigmatic field curves and a distortion curve of the fingerprint identification module according to the 2nd embodiment.

FIG. 4 is a schematic view of a fingerprint identification module and a light-permeable sheet according to the 2nd embodiment of the present disclosure. FIG. 5 is a schematic view of the fingerprint identification module in FIG. 4. FIG. 6 shows, in order from left to right, spherical aberration curves, astigmatic field curves and a distortion curve of the fingerprint identification module according to the 2nd embodiment. In FIG. 4 and FIG. 5, the fingerprint identification module includes the optical photographing lens assembly (its reference numeral is omitted) of the present disclosure and an image sensor 270. The optical photographing lens assembly includes, in order from an object side to an image side, a first lens element 210, a second lens element 220, an aperture stop 200, a third lens element 230, a filter

TABLE 1

1st Embodiment
f = 0.34 mm, Fno(work) = 1.25, Fno(inf.) = 1.21, HFOV = 59.6 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.175 | | | | |
| 3 | Lens 1 | −0.965 | (ASP) | 0.241 | Plastic | 1.549 | 56.1 | −0.83 |
| 4 | | 0.937 | (ASP) | 0.592 | | | | |
| 5 | Lens 2 | 1.934 | (ASP) | 0.342 | Plastic | 1.538 | 55.9 | 2.72 |
| 6 | | −5.594 | (ASP) | 0.093 | | | | |
| 7 | Ape. Stop | Plano | | 0.098 | | | | |
| 8 | Lens 3 | 1.068 | (ASP) | 0.407 | Plastic | 1.567 | 44.6 | 0.62 |
| 9 | | −0.457 | (ASP) | 0.420 | | | | |
| 10 | Filter | Plano | | 0.110 | Glass | 1.520 | 64.2 | — |
| 11 | | Plano | | 0.182 | | | | |
| 12 | Image | Plano | | — | | | | |

Note:
Reference wavelength is 525.0 nm.
The working distance is the axial distance (2.675 mm) between the imaged object O (Surface 0) and the object-side surface 111 (Surface 3).

TABLE 2

Aspheric Coefficients

| | Surface # | | | | | |
|---|---|---|---|---|---|---|
| | 3 | 4 | 5 | 6 | 8 | 9 |
| k = | −1.2559E+00 | −3.3836E−01 | −5.8250E−01 | 7.5804E+01 | 1.1247E+00 | −2.8297E−01 |
| A4 = | 1.8610E+00 | 1.2902E+00 | 5.5395E−01 | −2.9584E+00 | −3.2498E+00 | 2.8890E+00 |
| A6 = | −4.3440E+00 | 3.8035E+00 | −4.9308E+01 | 5.4194E+01 | 2.7945E+01 | −7.1073E+01 |
| A8 = | 7.3673E+00 | −1.2426E+01 | 2.8996E+02 | −1.4521E+03 | −3.1109E+02 | 2.2558E+03 |
| A10 = | −8.6449E+00 | −1.7006E+01 | −6.5845E+02 | 2.2602E+04 | 2.0522E+03 | −4.1055E+04 |
| A12 = | 6.7467E+00 | 4.2612E+01 | 5.4394E+02 | −1.6618E+05 | −4.6202E+03 | 4.2678E+05 |
| A14 = | −3.3141E+00 | — | — | 4.8119E+05 | — | −2.5148E+06 |
| A16 = | 9.2238E−01 | — | — | — | — | 7.8534E+06 |
| A18 = | −1.1026E−01 | — | — | — | — | −1.0066E+07 |

In Table 1, the curvature radius, the thickness and the focal length are shown in millimeters (mm). Surface numbers 0-12 represent the surfaces sequentially arranged from the object side to the image side along the optical axis. In Table 2, k represents the conic coefficient of the equation of the aspheric surface profiles. A4-18 represent the aspheric coefficients ranging from the 4th order to the 18th order. The tables presented below for each embodiment are the corre-

250 and an image surface 260. The optical photographing lens assembly includes three lens elements (210, 220 and 230) with no additional lens element disposed between each of the adjacent three lens elements.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has one inflection point. The image-side surface 212 of the first lens element 210 has one inflection point. The object-side surface 211 of the first lens element 210 has one critical point in an off-axis region thereof.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has one inflection point. The image-side surface 222 of the second lens element 220 has one inflection point. The object-side surface 221 of the second lens element 220 has one critical point in an off-axis region thereof.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The object-side surface 231 of the third lens element 230 has two inflection points. The image-side surface 232 of the third lens element 230 has one inflection point. The object-side surface 231 of the third lens element 230 has one critical point in an off-axis region thereof.

The light-permeable sheet 240 is made of glass material and located between an imaged object O and the first lens element 210, and will not affect the focal length of the optical photographing lens assembly. The filter 250 is made of glass material and located between the third lens element 230 and the image surface 260, and will not affect the focal length of the optical photographing lens assembly. The image sensor 270 is disposed on or near the image surface 260 of the optical photographing lens assembly.

The detailed optical data of the 2nd embodiment are shown in Table 3 and the aspheric surface data are shown in Table 4 below.

TABLE 3

2nd Embodiment
f = 0.34 mm, Fno(work) = 1.34, Fno(inf.) = 1.30, HFOV = 60.0 deg.

| Surface # |  | Curvature Radius |  | Thickness | Material | Index | Abbe # | Focal Length |
|---|---|---|---|---|---|---|---|---|
| 0 | Object | Plano |  | 0.000 |  |  |  |  |
| 1 | Sheet | Plano |  | 1.500 | Glass | 1.520 | 64.2 | — |
| 2 |  | Plano |  | 1.221 |  |  |  |  |
| 3 | Lens 1 | −0.764 | (ASP) | 0.321 | Plastic | 1.548 | 56.0 | −0.69 |
| 4 |  | 0.854 | (ASP) | 0.408 |  |  |  |  |
| 5 | Lens 2 | 1.047 | (ASP) | 0.340 | Plastic | 1.548 | 56.0 | 1.65 |
| 6 |  | −5.845 | (ASP) | −0.003 |  |  |  |  |
| 7 | Ape. Stop | Plano |  | 0.090 |  |  |  |  |
| 8 | Lens 3 | 1.890 | (ASP) | 0.411 | Plastic | 1.623 | 26.0 | 0.59 |
| 9 |  | −0.421 | (ASP) | 0.200 |  |  |  |  |
| 10 | Filter | Plano |  | 0.145 | Glass | 1.520 | 64.2 | — |
| 11 |  | Plano |  | 0.347 |  |  |  |  |
| 12 | Image | Plano |  | — |  |  |  |  |

Note:
Reference wavelength is 525.0 nm.
The working distance is the axial distance (2.721 mm) between the imaged object O (Surface 0) and the object-side surface 211 (Surface 3).

TABLE 4

Aspheric Coefficients

| | Surface # | | | | |
|---|---|---|---|---|---|
| 3 | 4 | 5 | 6 | 8 | 9 |
| k = | −1.0000E+00 | −1.0000E+00 | 0.0000E+00 | 0.0000E+00 | −1.0000E+00 | −1.0000E+00 |
| A4 = | 3.6012E+00 | 4.6261E+00 | −5.6905E−01 | −6.4064E+00 | −5.7343E+00 | 2.3176E+00 |
| A6 = | −1.2825E+01 | 8.2744E+00 | −3.0874E+01 | 1.6661E+02 | 7.2051E+01 | −8.3253E+01 |
| A8 = | 3.2959E+01 | −2.6673E+02 | 1.8995E+02 | −5.9039E+03 | −1.2920E+03 | 1.4386E+03 |
| A10 = | −5.6794E+01 | 2.5944E+03 | −2.3023E+03 | 1.1244E+05 | 1.1244E+04 | −1.3090E+04 |
| A12 = | 6.3477E+01 | −1.0972E+04 | 1.5579E+04 | −1.1488E+06 | −3.1000E+04 | 5.7634E+04 |
| A14 = | −4.3932E+01 | 1.5786E+04 | −3.1695E+04 | 4.4329E+06 | — | −9.3236E+04 |
| A16 = | 1.7061E+01 | — | — | — | — | — |
| A18 = | −2.8360E+00 | — | — | — | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 0.34 | TL/EPD | 8.69 |
| Fno(work) | 1.34 | TL/f | 6.69 |
| Fno(inf.) | 1.30 | TOB + TL [mm] | 4.98 |
| HFOV [deg.] | 60.0 | (TOB + TL)/EPD | 19.15 |
| Nmax | 1.623 | TOB/TL | 1.20 |
| V2 | 56.0 | |(R1 + R2)/(R1 − R2)| | 0.06 |
| V3 | 26.0 | R1/EPD | −2.94 |
| V2 + V3 | 82.0 | (R3 + R4)/(R3 − R4) | −0.70 |
| V1 + V2 + V3 | 137.9 | R5/R6 | −4.50 |
| V1/N1 | 36.17 | f/EPD | 1.30 |
| V2/N2 | 36.17 | f/EPD + cot(HFOV) | 1.88 |
| V3/N3 | 16.01 | |f/f1| | 0.49 |
| ΣCT/ΣAT | 2.17 | |f/f2| | 0.20 |
| (CT2 + CT3)/T23 | 8.63 | |f/f3| | 0.57 |
| CT2/CT1 | 1.06 | f2/f3 | 2.78 |
| CT2/T23 | 3.91 | FOV [deg.] | 120.0 |
| CTS [mm] | 1.50 | Y11/TD | 0.66 |
| SL/TL | 0.53 | Y11/Y12 | 2.21 |
| T12/T23 | 4.69 | Y11/Y32 | 2.65 |
| TD/CTS | 1.04 | Yc11/Y11 | 0.49 |
| TL [mm] | 2.26 | YOB/ImgH | 7.85 |

3rd Embodiment

Figure 7:
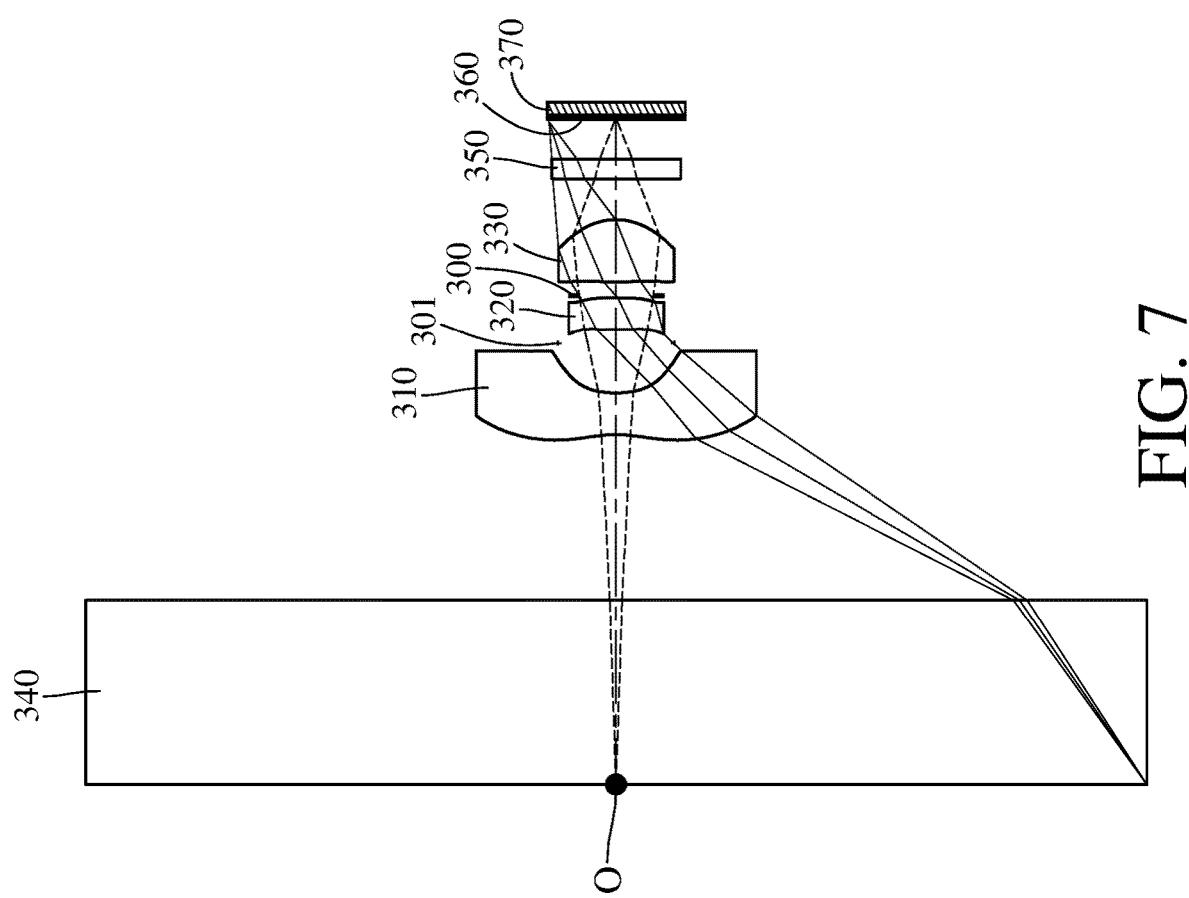
FIG. 7 is a schematic view of a fingerprint identification module and a light-permeable sheet according to the 3rd embodiment of the present disclosure.
Figure 8:
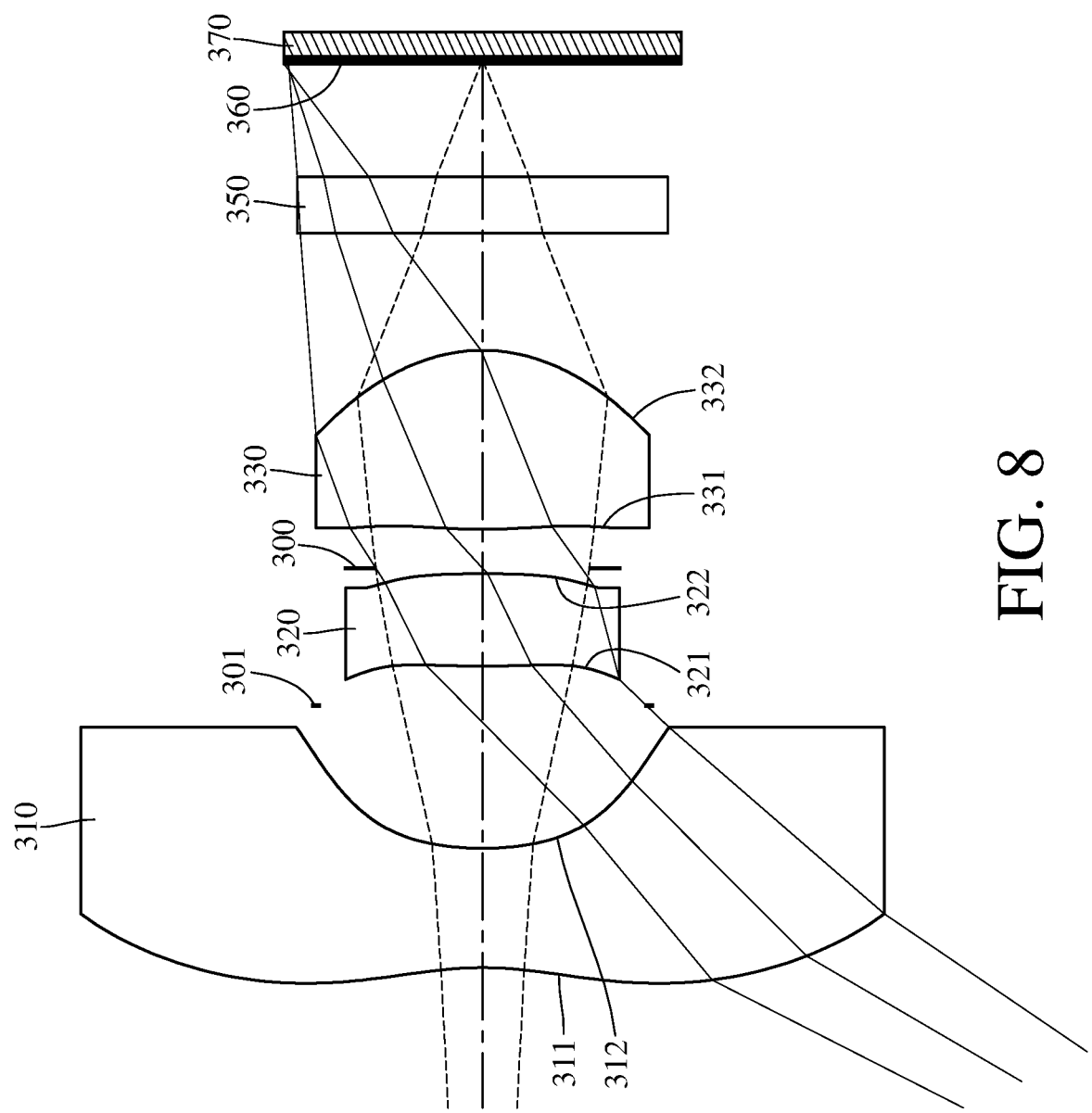
FIG. 8 is a schematic view of the fingerprint identification module in FIG. 7.
Figure 9:
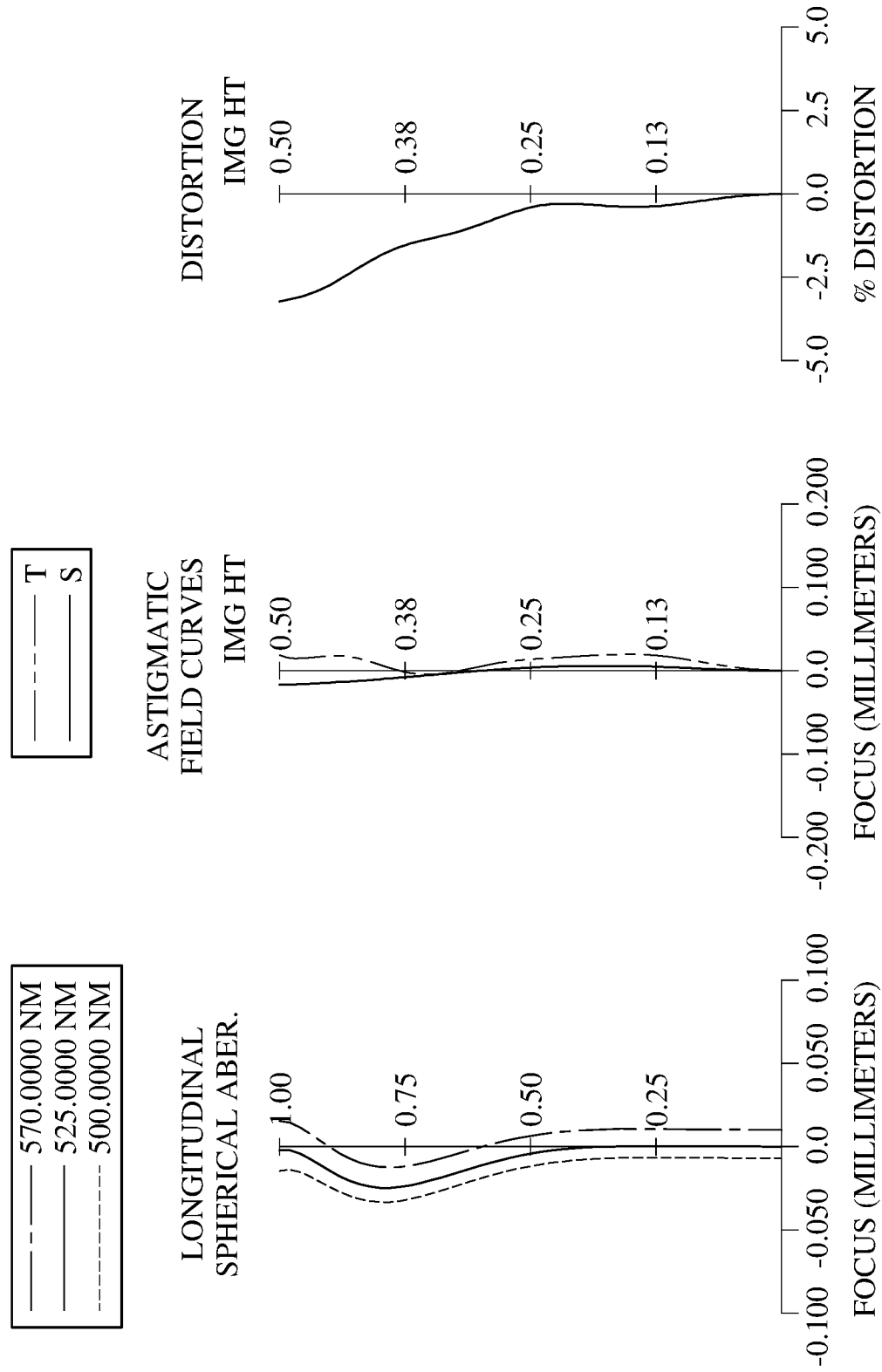
FIG. 9 shows spherical aberration curves, astigmatic field curves and a distortion curve of the fingerprint identification module according to the 3rd embodiment.

FIG. 7 is a schematic view of a fingerprint identification module and a light-permeable sheet according to the 3rd embodiment of the present disclosure. FIG. 8 is a schematic view of the fingerprint identification module in FIG. 7. FIG. 9 shows, in order from left to right, spherical aberration curves, astigmatic field curves and a distortion curve of the fingerprint identification module according to the 3rd embodiment. In FIG. 7 and FIG. 8, the fingerprint identification module includes the optical photographing lens assembly (its reference numeral is omitted) of the present disclosure and an image sensor 370. The optical photographing lens assembly includes, in order from an object side to an image side, a first lens element 310, a stop 301, a second lens element 320, an aperture stop 300, a third lens element 330, a filter 350 and an image surface 360. The optical photographing lens assembly includes three lens elements (310, 320 and 330) with no additional lens element disposed between each of the adjacent three lens elements.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one inflection point. The object-side surface 311 of the first lens element 310 has one critical point in the off-axis region thereof.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has two inflection points. The image-side surface 322 of the second lens element 320 has one inflection point. The object-side surface 321 of the second lens element 320 has one critical point in an off-axis region thereof.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has two inflection points. The image-side surface 332 of the third lens element 330 has one inflection point. The object-side surface 331 of the third lens element 330 has one critical point in an off-axis region thereof.

The light-permeable sheet 340 is made of glass material and located between an imaged object O and the first lens element 310, and will not affect the focal length of the optical photographing lens assembly. The filter 350 is made of glass material and located between the third lens element 330 and the image surface 360, and will not affect the focal length of the optical photographing lens assembly. The image sensor 370 is disposed on or near the image surface 360 of the optical photographing lens assembly.

The detailed optical data of the 3rd embodiment are shown in Table 5 and the aspheric surface data are shown in Table 6 below.

TABLE 5

3rd Embodiment
f = 0.33 mm, Fno(work) = 1.32, Fno(inf.) = 1.29, HFOV = 59.7 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.354 | Glass | 1.520 | 64.2 | — |
| 2 | | Plano | | 1.218 | | | | |
| 3 | Lens 1 | −0.879 | (ASP) | 0.306 | Plastic | 1.548 | 56.0 | −0.73 |
| 4 | | 0.824 | (ASP) | 0.366 | | | | |
| 5 | Stop | Plano | | 0.101 | | | | |
| 6 | Lens 2 | 2.256 | (ASP) | 0.237 | Plastic | 1.548 | 56.0 | 2.96 |
| 7 | | −5.579 | (ASP) | 0.014 | | | | |
| 8 | Ape. Stop | Plano | | 0.100 | | | | |
| 9 | Lens 3 | 1.394 | (ASP) | 0.459 | Plastic | 1.623 | 26.0 | 0.58 |
| 10 | | −0.426 | (ASP) | 0.300 | | | | |
| 11 | Filter | Plano | | 0.145 | Glass | 1.520 | 64.2 | — |
| 12 | | Plano | | 0.288 | | | | |
| 13 | Image | Plano | | — | | | | |

Note:
Reference wavelength is 525.0 nm.
The working distance is the axial distance (2.572 mm) between the imaged object O (Surface 0) and the object-side surface 311 (Surface 3).
An effective radius of the stop 301 (Surface 5) is 0.420 mm.

TABLE 6

Aspheric Coefficients

| Surface # | 3 | 4 | 6 | 7 | 9 | 10 |
|---|---|---|---|---|---|---|
| k = | −1.0000E+00 | −1.0000E+00 | 0.0000E+00 | 0.0000E+00 | −1.0000E+00 | −1.0000E+00 |
| A4 = | 3.3420E+00 | 3.8628E+00 | −3.3897E+00 | −8.3650E+00 | −5.3145E+00 | 1.6048E+00 |
| A6 = | −1.2452E+01 | 5.8089E+00 | 3.6257E+00 | 1.8084E+02 | 6.6246E+01 | −5.5217E+01 |
| A8 = | 3.5368E+01 | −1.1443E+02 | −5.2436E+02 | −4.3100E+03 | −1.0363E+03 | 8.4087E+02 |
| A10 = | −6.8725E+01 | 1.1557E+03 | 5.5947E+03 | 6.0701E+04 | 8.0144E+03 | −6.5825E+03 |
| A12 = | 8.7167E+01 | −5.4735E+03 | −1.6996E+04 | −4.4711E+05 | −2.0796E+04 | 2.4274E+04 |
| A14 = | −6.8535E+01 | 8.3764E+03 | 1.0116E+04 | 1.4482E+06 | — | −3.2384E+04 |
| A16 = | 3.0213E+01 | — | — | — | — | — |
| A18 = | −5.6925E+00 | — | — | — | — | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.33 | TL/EPD | 8.91 |
| Fno(work) | 1.32 | TL/f | 6.93 |
| Fno(inf.) | 1.29 | TOB + TL [mm] | 4.89 |
| HFOV [deg.] | 59.7 | (TOB + TL)/EPD | 18.80 |
| Nmax | 1.623 | TOB/TL | 1.11 |
| V2 | 56.0 | |(R1 + R2)/(R1 − R2)| | 0.03 |
| V3 | 26.0 | R1/EPD | −3.38 |
| V2 + V3 | 82.0 | (R3 + R4)/(R3 − R4) | −0.42 |
| V1 + V2 + V3 | 137.9 | R5/R6 | −3.27 |
| V1/N1 | 36.17 | f/EPD | 1.29 |
| V2/N2 | 36.17 | f/EPD + cot(HFOV) | 1.87 |
| V3/N3 | 16.01 | |f/f1| | 0.46 |
| ΣCT/ΣAT | 1.72 | |f/f2| | 0.11 |
| (CT2 + CT3)/T23 | 6.11 | |f/f3| | 0.58 |
| CT2/CT1 | 0.77 | f2/f3 | 5.11 |
| CT2/T23 | 2.08 | FOV [deg.] | 119.3 |
| CTS [mm] | 1.35 | Y11/TD | 0.65 |
| SL/TL | 0.56 | Y11/Y12 | 2.15 |
| T12/T23 | 4.10 | Y11/Y32 | 2.41 |
| TD/CTS | 1.17 | Yc11/Y11 | 0.44 |
| TL [mm] | 2.32 | YOB/ImgH | 7.79 |

4th Embodiment

Figure 10:
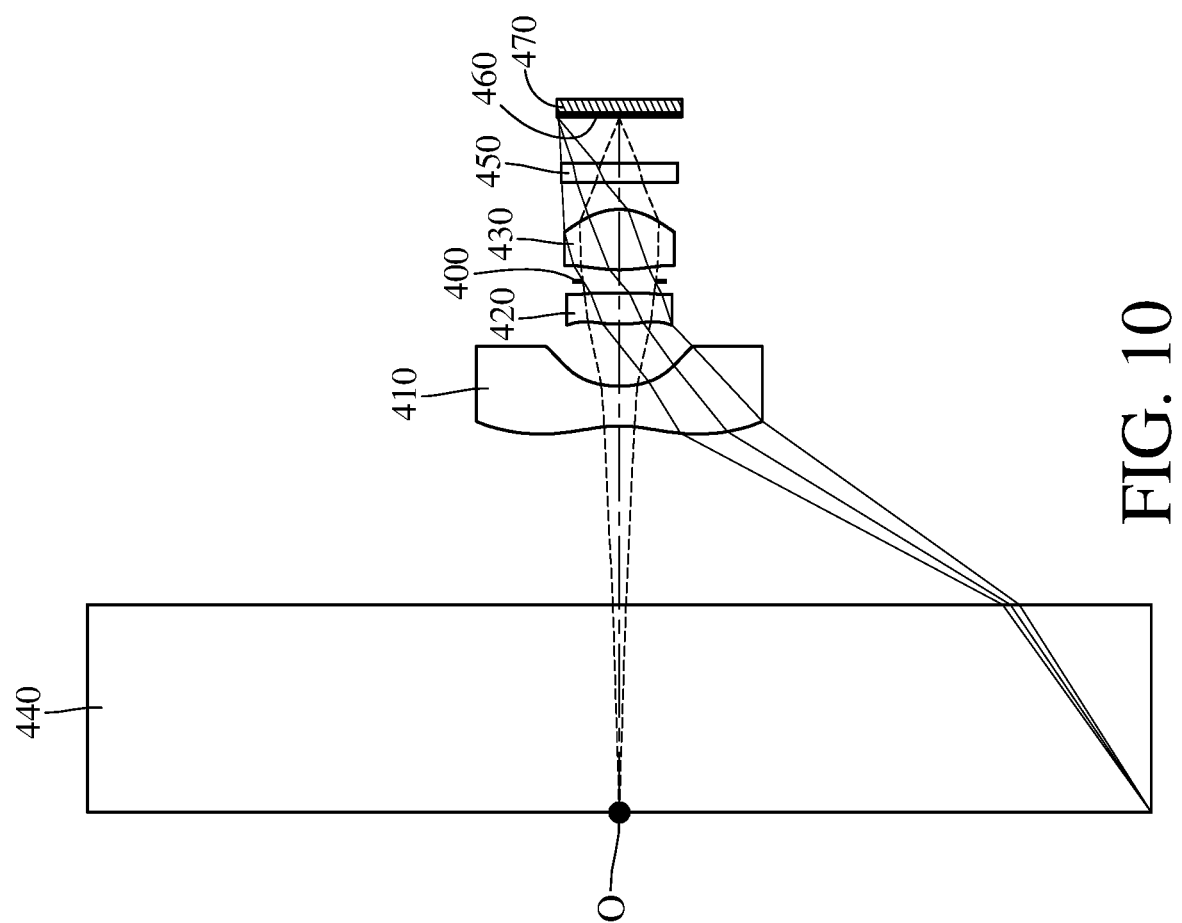
FIG. 10 is a schematic view of a fingerprint identification module and a light-permeable sheet according to the 4th embodiment of the present disclosure.
Figure 11:
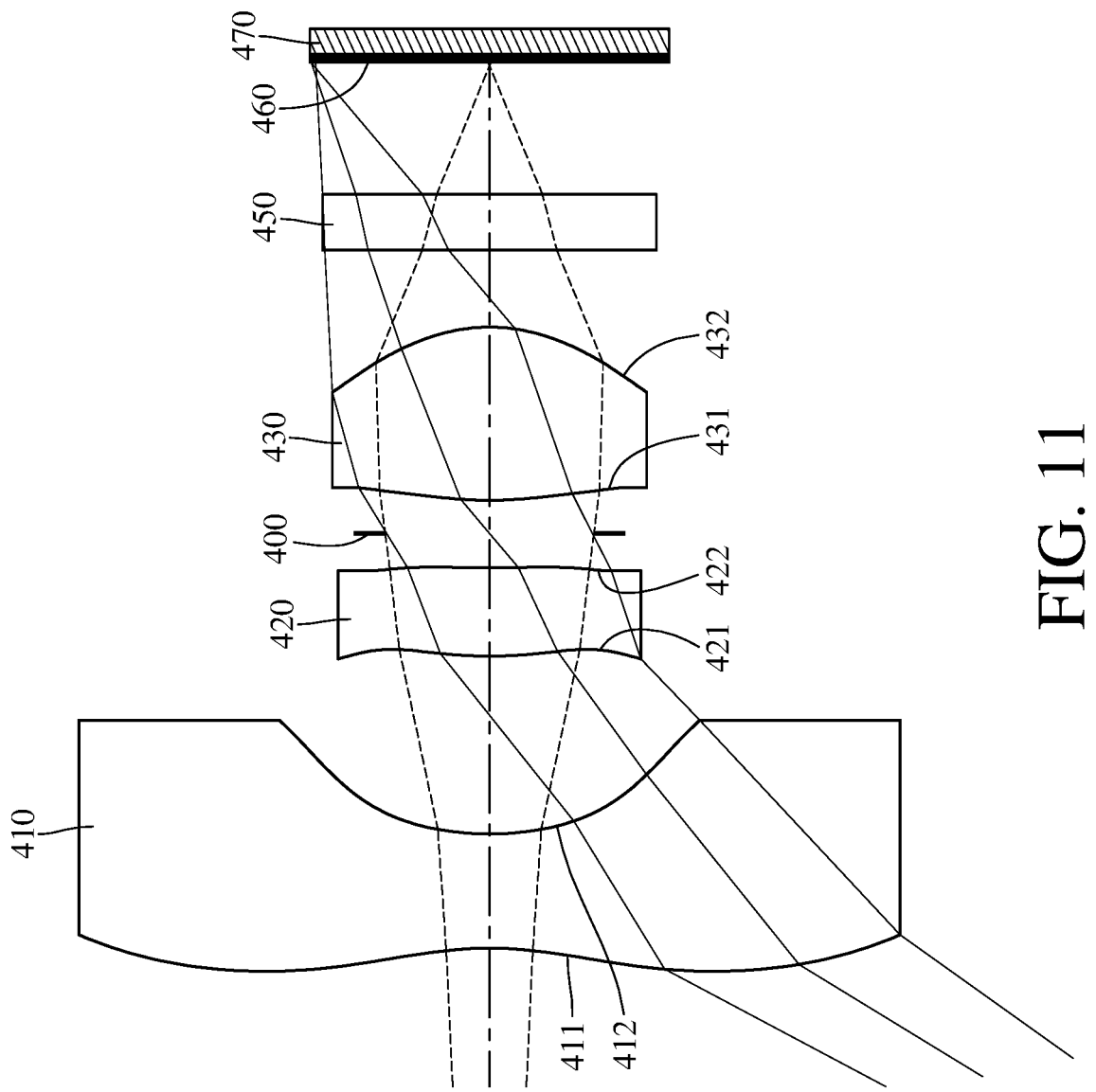
FIG. 11 is a schematic view of the fingerprint identification module in FIG. 10.
Figure 12:
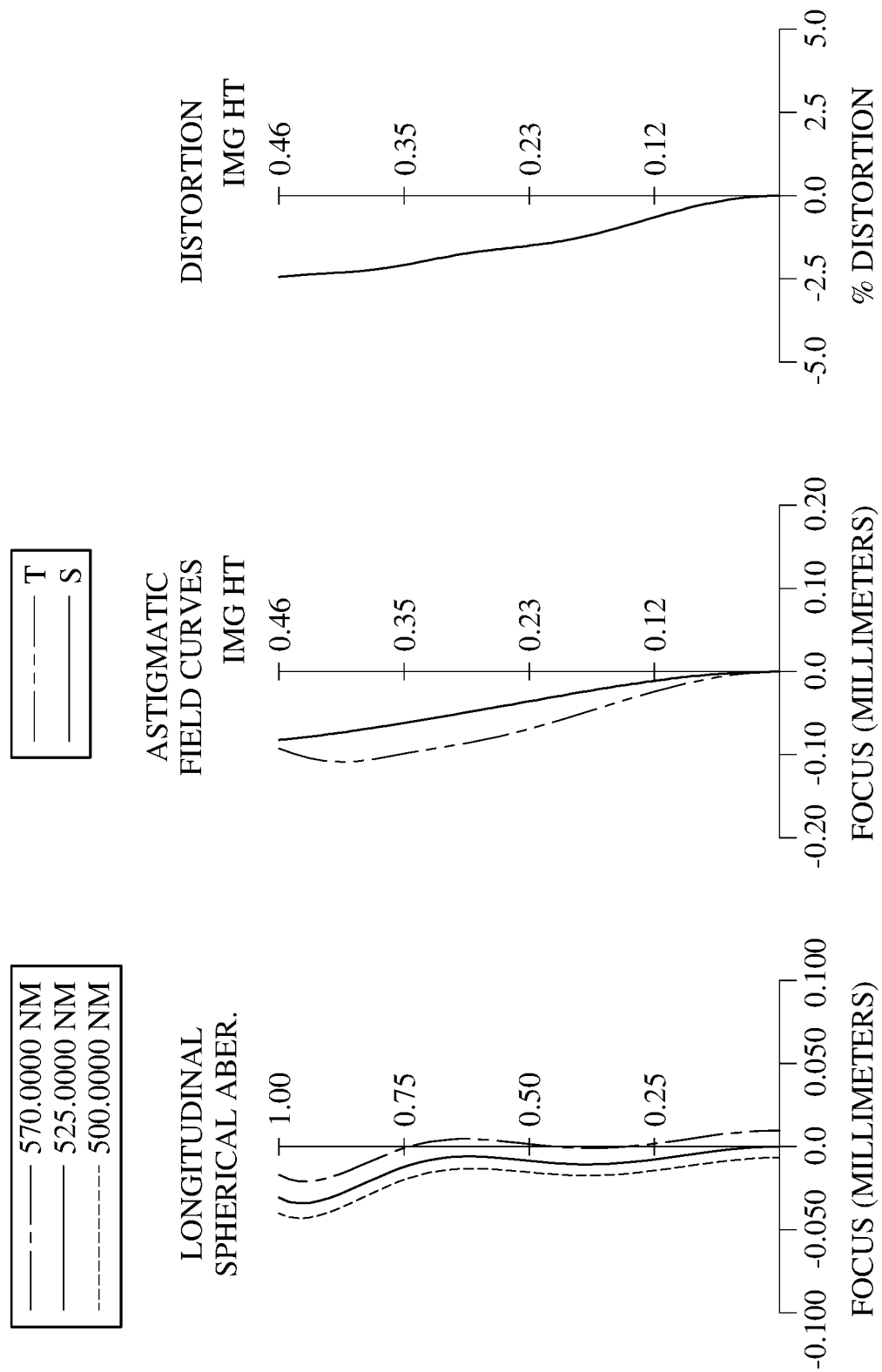
FIG. 12 shows spherical aberration curves, astigmatic field curves and a distortion curve of the fingerprint identification module according to the 4th embodiment.

FIG. 10 is a schematic view of a fingerprint identification module and a light-permeable sheet according to the 4th embodiment of the present disclosure. FIG. 11 is a schematic view of the fingerprint identification module in FIG. 10. FIG. 12 shows, in order from left to right, spherical aberration curves, astigmatic field curves and a distortion curve of the fingerprint identification module according to the 4th embodiment. In FIG. 10 and FIG. 11, the fingerprint identification module includes the optical photographing lens assembly (its reference numeral is omitted) of the present disclosure and an image sensor 470. The optical photographing lens assembly includes, in order from an object side to an image side, a first lens element 410, a second lens element 420, an aperture stop 400, a third lens element 430, a filter 450 and an image surface 460. The optical photographing lens assembly includes three lens elements (410, 420 and 430) with no additional lens element disposed between each of the adjacent three lens elements.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has one inflection point. The object-side surface 411 of the first lens element 410 has one critical point in the off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has two inflection points. The image-side surface 422 of the second lens element 420 has two inflection points. The object-side surface 421 of the second lens element 420 has one critical point in an off-axis region thereof. The image-side surface 422 of the second lens element 420 has two critical points in an off-axis region thereof.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has one inflection point.

The light-permeable sheet 440 is made of glass material and located between an imaged object O and the first lens element 410, and will not affect the focal length of the optical photographing lens assembly. The filter 450 is made of glass material and located between the third lens element 430 and the image surface 460, and will not affect the focal length of the optical photographing lens assembly. The image sensor 470 is disposed on or near the image surface 460 of the optical photographing lens assembly.

The detailed optical data of the 4th embodiment are shown in Table 7 and the aspheric surface data are shown in Table 8 below.

TABLE 7

4th Embodiment
f = 0.33 mm, Fno(work) = 1.28, Fno(inf.) = 1.24, HFOV = 58.5 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.550 | Glass | 1.520 | 64.2 | — |
| 2 | | Plano | | 1.331 | | | | |
| 3 | Lens 1 | −0.949 | (ASP) | 0.297 | Plastic | 1.548 | 56.0 | −0.75 |
| 4 | | 0.798 | (ASP) | 0.462 | | | | |
| 5 | Lens 2 | 1.240 | (ASP) | 0.230 | Plastic | 1.548 | 56.0 | 3.33 |
| 6 | | 3.615 | (ASP) | 0.089 | | | | |
| 7 | Ape. Stop | Plano | | 0.086 | | | | |
| 8 | Lens 3 | 0.955 | (ASP) | 0.450 | Plastic | 1.623 | 26.0 | 0.56 |
| 9 | | −0.449 | (ASP) | 0.200 | | | | |
| 10 | Filter | Plano | | 0.145 | Glass | 1.520 | 64.2 | — |
| 11 | | Plano | | 0.344 | | | | |
| 12 | Image | Plano | | — | | | | |

Note:
Reference wavelength is 525.0 nm.
The working distance is the axial distance (2.881 mm) between the imaged object O (Surface 0) and the object-side surface 411 (Surface 3).

TABLE 8

Aspheric Coefficients

| | Surface # | | | | | |
|---|---|---|---|---|---|---|
| | 3 | 4 | 5 | 6 | 8 | 9 |
| k = | −1.0000E+00 | −1.0000E+00 | 0.0000E+00 | 0.0000E+00 | 0.0000E+00 | 0.0000E+00 |
| A4 = | 1.9609E+00 | 1.0573E+00 | 2.0229E+00 | −7.4860E+00 | −5.6513E+00 | 1.7408E+00 |
| A6 = | −4.7188E+00 | 1.0750E+01 | −9.7614E+01 | 2.9964E+02 | 7.1837E+01 | 2.7268E+01 |
| A8 = | 8.7007E+00 | −3.6459E+01 | 6.1152E+02 | −8.4501E+03 | −6.8829E+02 | −8.2060E+02 |
| A10 = | −1.1286E+01 | −2.4450E+01 | −1.3455E+03 | 1.1783E+05 | 3.9311E+03 | 1.5460E+04 |
| A12 = | 9.8120E+00 | 1.0724E+02 | 7.6871E+02 | −7.9391E+05 | −9.7538E+03 | −1.7538E+05 |
| A14 = | −5.3884E+00 | — | — | 2.1403E+06 | — | 1.1853E+06 |
| A16 = | 1.6811E+00 | — | — | — | — | −4.2829E+06 |
| A18 = | −2.2638E−01 | — | — | — | — | 6.4269E+06 |

In the 4th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.33 | TL/EPD | 8.55 |
| Fno(work) | 1.28 | TL/f | 6.88 |
| Fno(inf.) | 1.24 | TOB + TL [mm] | 5.18 |
| HFOV [deg.] | 58.5 | (TOB + TL)/EPD | 19.26 |
| Nmax | 1.623 | TOB/TL | 1.25 |
| V2 | 56.0 | |(R1 + R2)/(R1 − R2)| | 0.09 |
| V3 | 26.0 | R1/EPD | −3.52 |
| V2 + V3 | 82.0 | (R3 + R4)/(R3 − R4) | −2.04 |
| V1 + V2 + V3 | 137.9 | R5/R6 | −2.13 |
| V1/N1 | 36.17 | f/EPD | 1.24 |
| V2/N2 | 36.17 | f/EPD + cot(HFOV) | 1.86 |
| V3/N3 | 16.01 | |f/f1| | 0.45 |
| ΣCT/ΣAT | 1.53 | |f/f2| | 0.10 |
| (CT2 + CT3)/T23 | 3.89 | |f/f3| | 0.60 |
| CT2/CT1 | 0.77 | f2/f3 | 5.96 |
| CT2/T23 | 1.31 | FOV [deg.] | 117.1 |
| CTS [mm] | 1.55 | Y11/TD | 0.66 |

-continued

| 4th Embodiment | | | |
|---|---|---|---|
| SL/TL | 0.53 | Y11/Y12 | 1.95 |
| T12/T23 | 2.64 | Y11/Y32 | 2.61 |
| TD/CTS | 1.04 | Yc11/Y11 | 0.55 |
| TL [mm] | 2.30 | YOB/ImgH | 8.55 |

5th Embodiment

Figure 13:
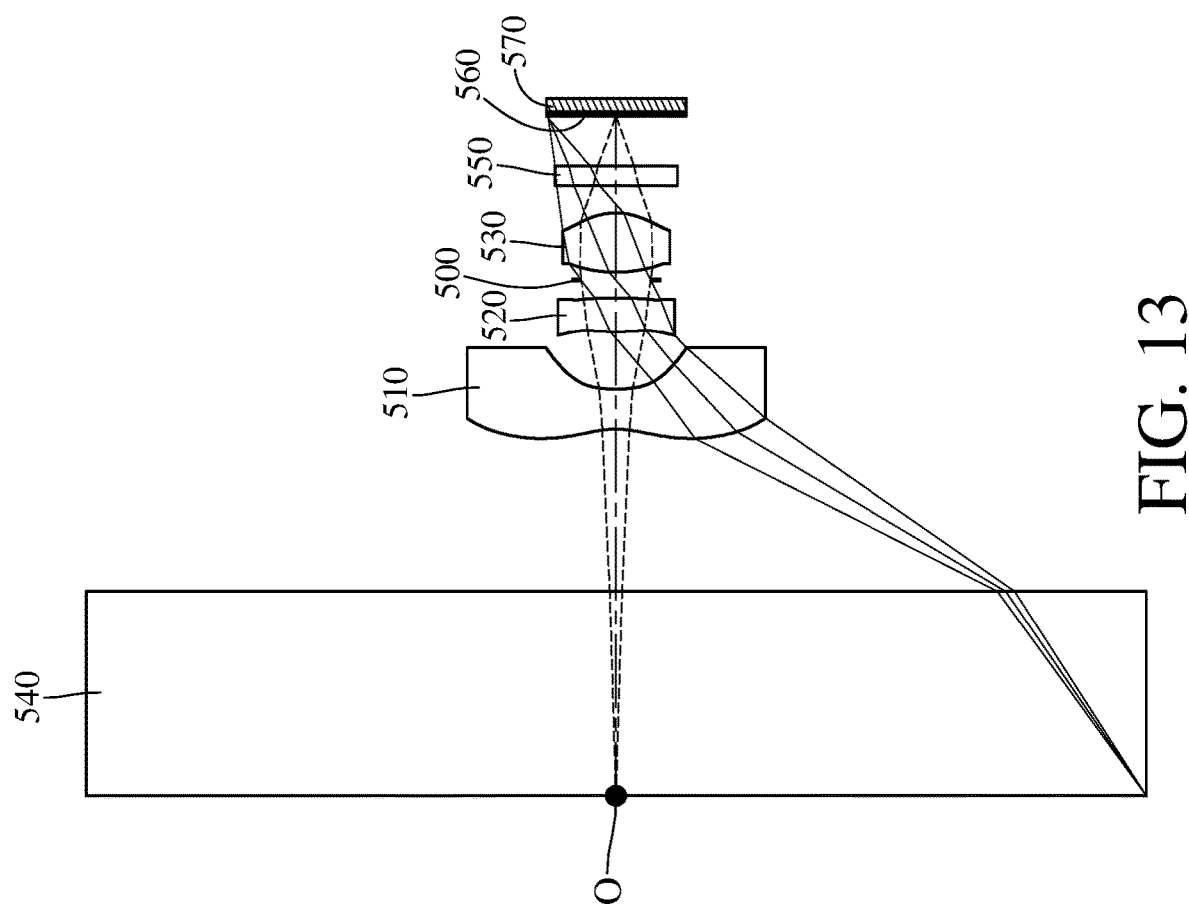
FIG. 13 is a schematic view of a fingerprint identification module and a light-permeable sheet according to the 5th embodiment of the present disclosure.
Figure 14:
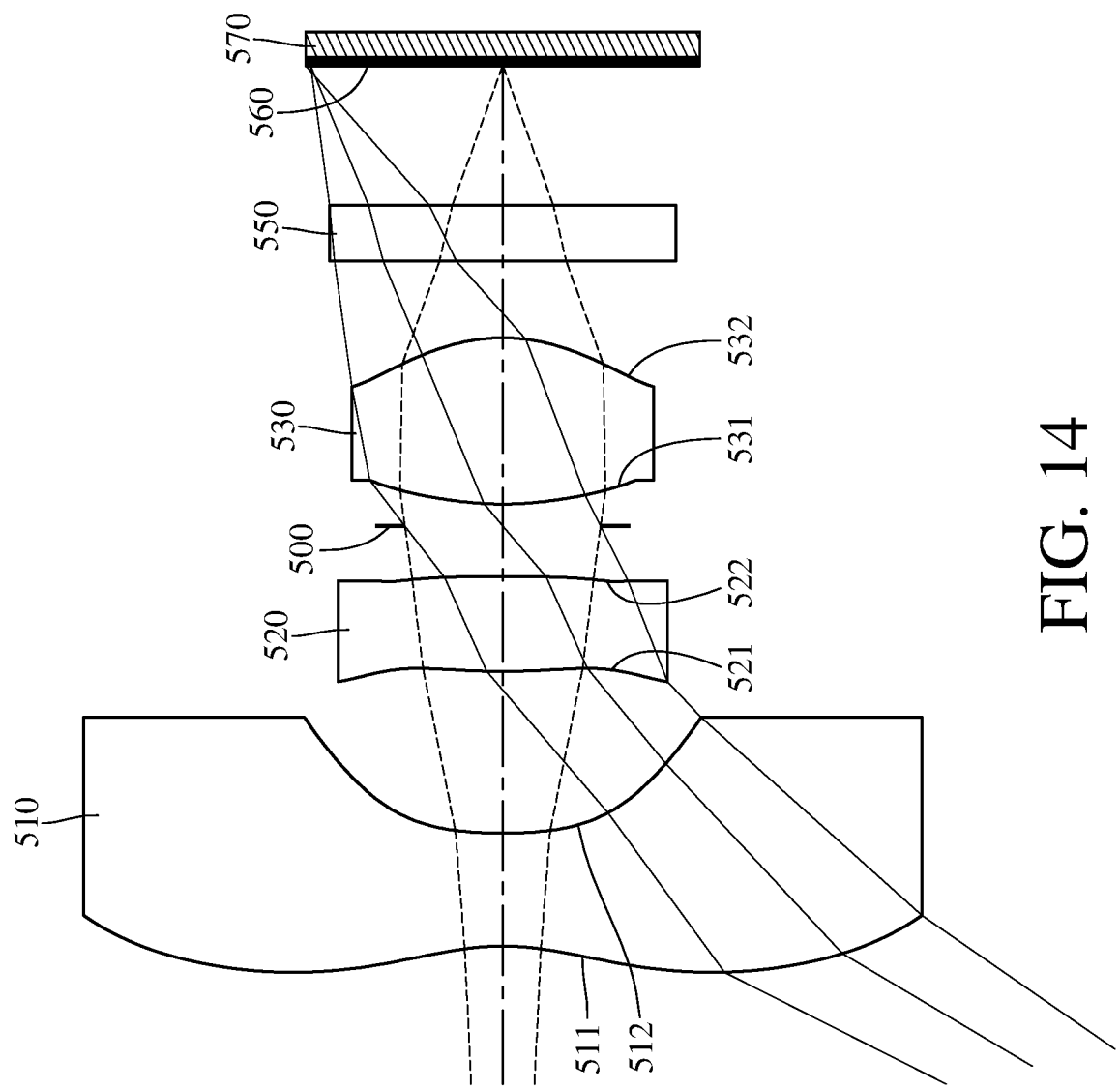
FIG. 14 is a schematic view of the fingerprint identification module in FIG. 13.
Figure 15:
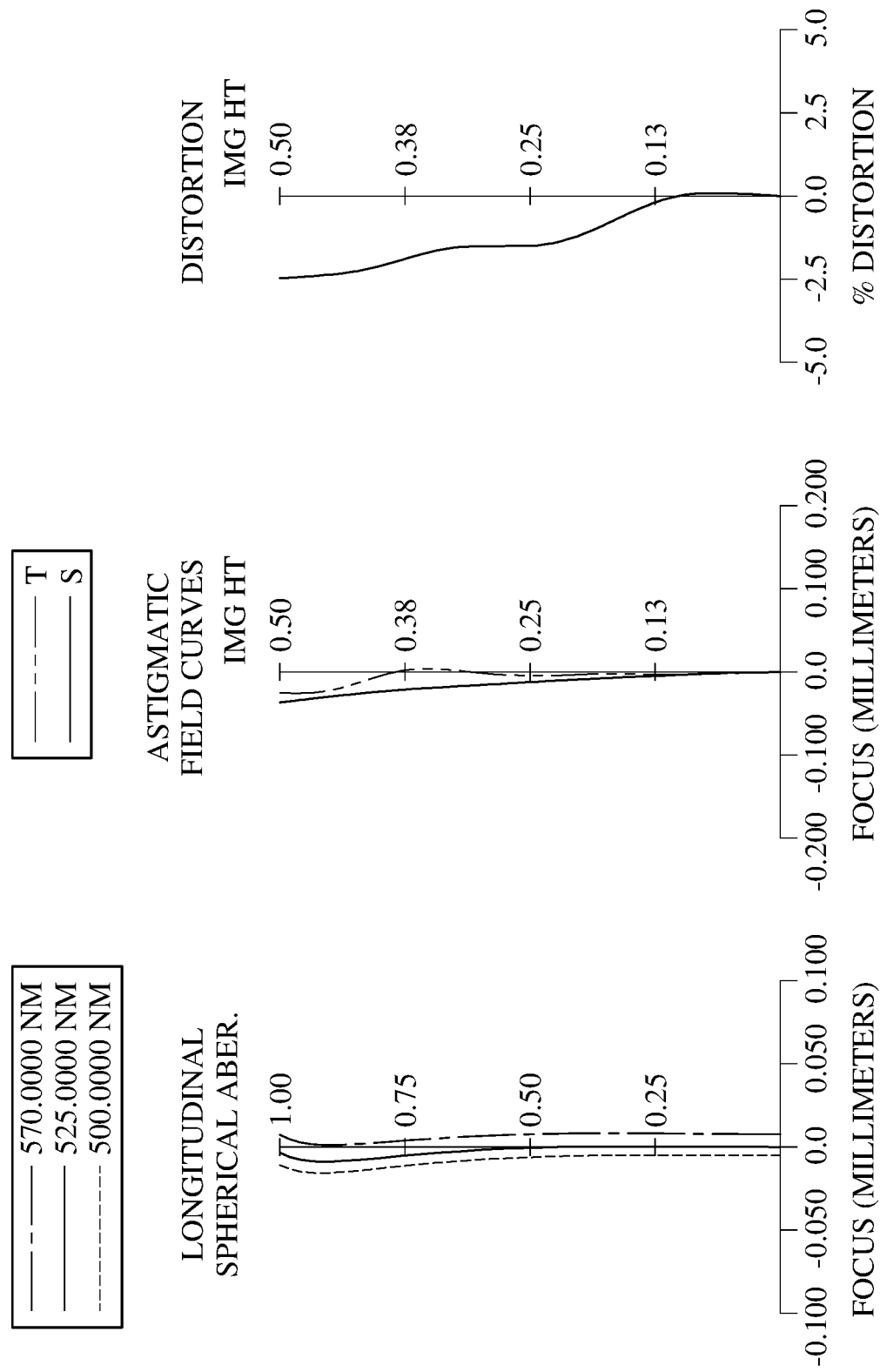
FIG. 15 shows spherical aberration curves, astigmatic field curves and a distortion curve of the fingerprint identification module according to the 5th embodiment.

FIG. 13 is a schematic view of a fingerprint identification module and a light-permeable sheet according to the 5th embodiment of the present disclosure. FIG. 14 is a schematic view of the fingerprint identification module in FIG. 13. FIG. 15 shows, in order from left to right, spherical aberration curves, astigmatic field curves and a distortion curve of the fingerprint identification module according to the 5th embodiment. In FIG. 13 and FIG. 14, the fingerprint identification module includes the optical photographing lens assembly (its reference numeral is omitted) of the present disclosure and an image sensor 570. The optical photographing lens assembly includes, in order from an object side to an image side, a first lens element 510, a second lens element 520, an aperture stop 500, a third lens element 530, a filter 550 and an image surface 560. The optical photographing lens assembly includes three lens elements (510, 520 and 530) with no additional lens element disposed between each of the adjacent three lens elements.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has one inflection point. The object-side surface 511 of the first lens element 510 has one critical point in the off-axis region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has two inflection points. The image-side surface 522 of the second lens element 520 has one inflection point. The object-side surface 521 of the second lens element 520 has one critical point in an off-axis region thereof. The image-side surface 522 of the second lens element 520 has one critical point in an off-axis region thereof.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. The image-side surface 532 of the third lens element 530 has one inflection point.

The light-permeable sheet 540 is made of glass material and located between an imaged object O and the first lens element 510, and will not affect the focal length of the optical photographing lens assembly. The filter 550 is made of glass material and located between the third lens element 530 and the image surface 560, and will not affect the focal length of the optical photographing lens assembly. The image sensor 570 is disposed on or near the image surface 560 of the optical photographing lens assembly.

The detailed optical data of the 5th embodiment are shown in Table 9 and the aspheric surface data are shown in Table 10 below.

TABLE 9

5th Embodiment
f = 0.34 mm, Fno(work) = 1.45, Fno(inf.) = 1.40, HFOV = 59.3 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.187 | | | | |
| 3 | Lens 1 | −0.611 | (ASP) | 0.294 | Plastic | 1.548 | 55.9 | −0.72 |
| 4 | | 1.325 | (ASP) | 0.421 | | | | |
| 5 | Lens 2 | 1.692 | (ASP) | 0.247 | Plastic | 1.548 | 55.9 | 2.71 |
| 6 | | −11.577 | (ASP) | 0.132 | | | | |
| 7 | Ape. Stop | Plano | | 0.057 | | | | |
| 8 | Lens 3 | 0.877 | (ASP) | 0.433 | Plastic | 1.592 | 32.6 | 0.58 |
| 9 | | −0.467 | (ASP) | 0.200 | | | | |
| 10 | Filter | Plano | | 0.145 | Glass | 1.520 | 64.2 | — |
| 11 | | Plano | | 0.364 | | | | |
| 12 | Image | Plano | | — | | | | |

Note:
Reference wavelength is 525.0 nm.
The working distance is the axial distance (2.687 mm) between the imaged object O (Surface 0) and the object-side surface 511 (Surface 3).

TABLE 10

Aspheric Coefficients

| Surface # | | | | | |
|---|---|---|---|---|---|
| 3 | 4 | 5 | 6 | 8 | 9 |
| k = −1.0736E+01 | 1.2740E+00 | 8.1933E+00 | 1.1523E+01 | −1.3232E+00 | −1.1065E+00 |
| A4 = 1.0715E+00 | 5.3929E+00 | −1.4924E+00 | −1.4413E+00 | −1.7842E+00 | 8.0704E−01 |
| A6 = −2.2732E+00 | −2.7877E+01 | −4.4712E+01 | −3.6983E+01 | 1.1362E+01 | 6.0417E+00 |
| A8 = 3.1159E+00 | 2.6028E+02 | 3.1895E+02 | 9.4208E+02 | 7.9425E+01 | −1.2232E+02 |
| A10 = −2.5951E+00 | −1.5743E+03 | −6.1416E+02 | −1.0721E+04 | −1.0056E+03 | 1.1653E+03 |
| A12 = 1.2047E+00 | 4.3390E+03 | — | 7.3433E+04 | 3.4676E+03 | −3.2306E+03 |
| A14 = −2.3410E−01 | −4.3564E+03 | — | −1.7114E+05 | −3.0379E+03 | 1.8664E+03 |

In the 5th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.34 | TL/EPD | 9.55 |
| Fno(work) | 1.45 | TL/f | 6.83 |
| Fno(inf.) | 1.40 | TOB + TL [mm] | 4.98 |
| HFOV [deg.] | 59.3 | (TOB + TL)/EPD | 20.75 |
| Nmax | 1.592 | TOB/TL | 1.17 |
| V2 | 55.9 | |(R1 + R2)/(R1 − R2)| | 0.37 |
| V3 | 32.6 | R1/EPD | −2.55 |
| V2 + V3 | 88.5 | (R3 + R4)/(R3 − R4) | −0.74 |
| V1 + V2 + V3 | 144.4 | R5/R6 | −1.88 |
| V1/N1 | 36.12 | f/EPD | 1.40 |
| V2/N2 | 36.12 | f/EPD + cot(HFOV) | 1.99 |
| V3/N3 | 20.46 | |f/f1| | 0.46 |
| ΣCT/ΣAT | 1.60 | |f/f2| | 0.12 |
| (CT2 + CT3)/T23 | 3.60 | |f/f3| | 0.57 |
| CT2/CT1 | 0.84 | f2/f3 | 4.64 |
| CT2/T23 | 1.31 | FOV [deg.] | 118.6 |
| CTS [mm] | 1.50 | Y11/TD | 0.69 |
| SL/TL | 0.52 | Y11/Y12 | 2.11 |
| T12/T23 | 2.23 | Y11/Y32 | 2.78 |
| TD/CTS | 1.06 | Yc11/Y11 | 0.50 |
| TL [mm] | 2.29 | YOB/ImgH | 7.76 |

6th Embodiment

Figure 16:
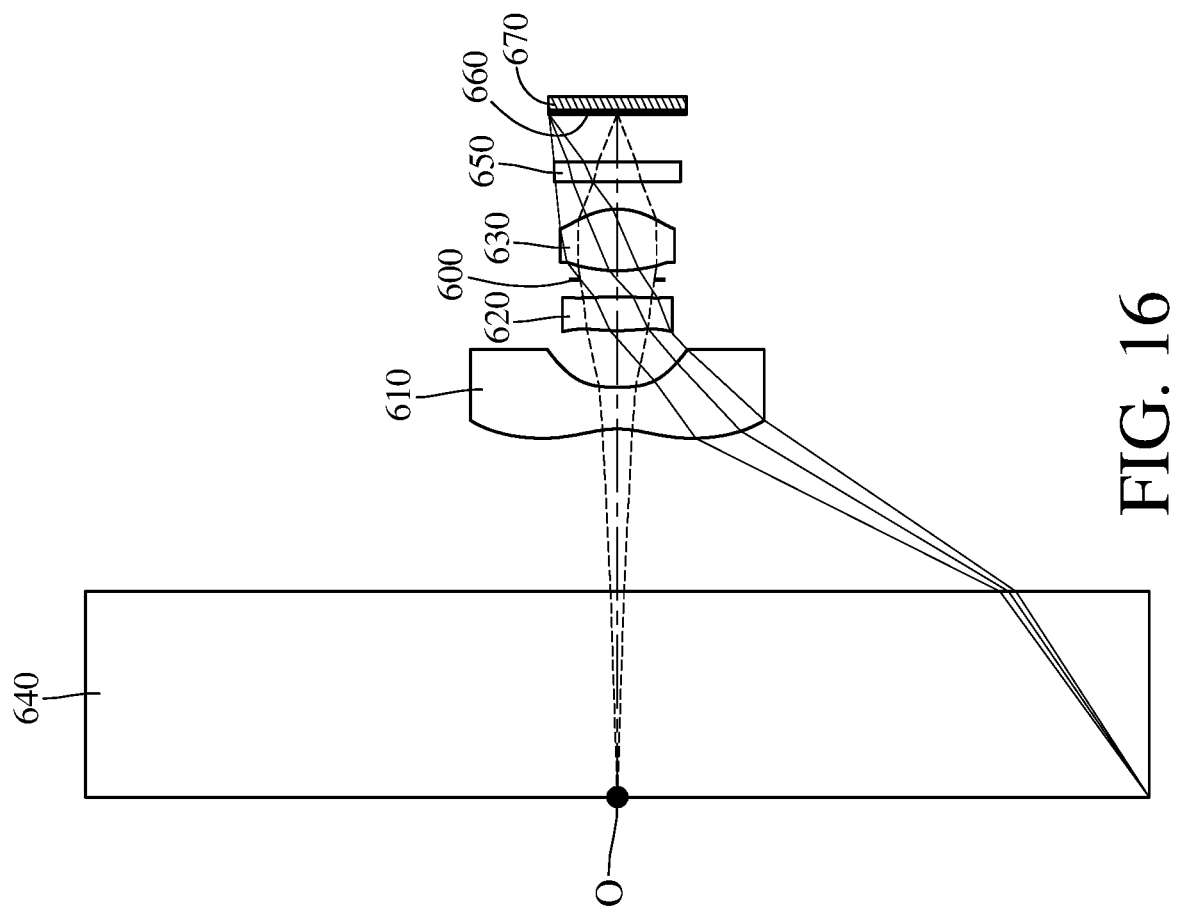
FIG. 16 is a schematic view of a fingerprint identification module and a light-permeable sheet according to the 6th embodiment of the present disclosure.
Figure 17:
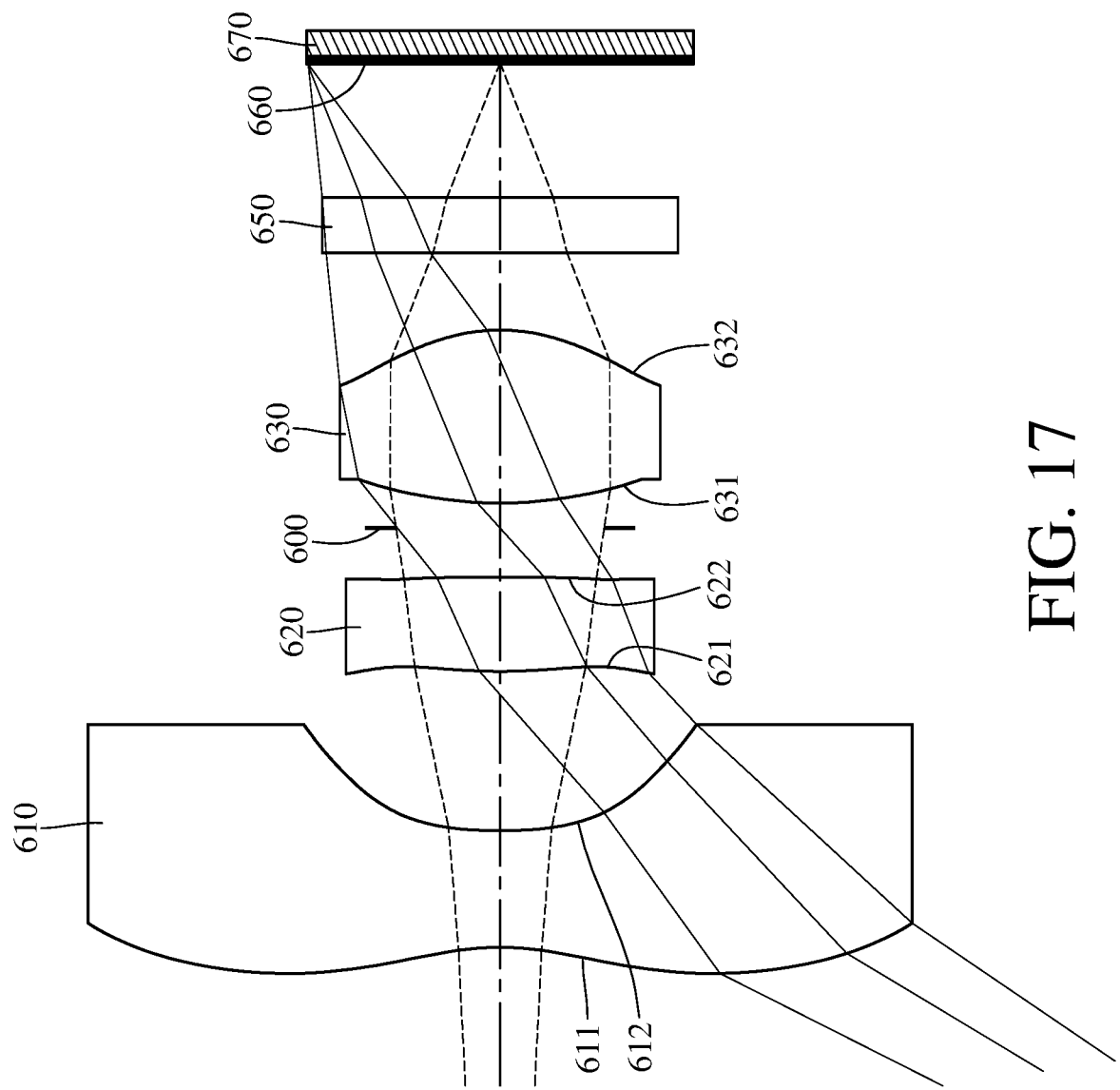
FIG. 17 is a schematic view of the fingerprint identification module in FIG. 16.
Figure 18:
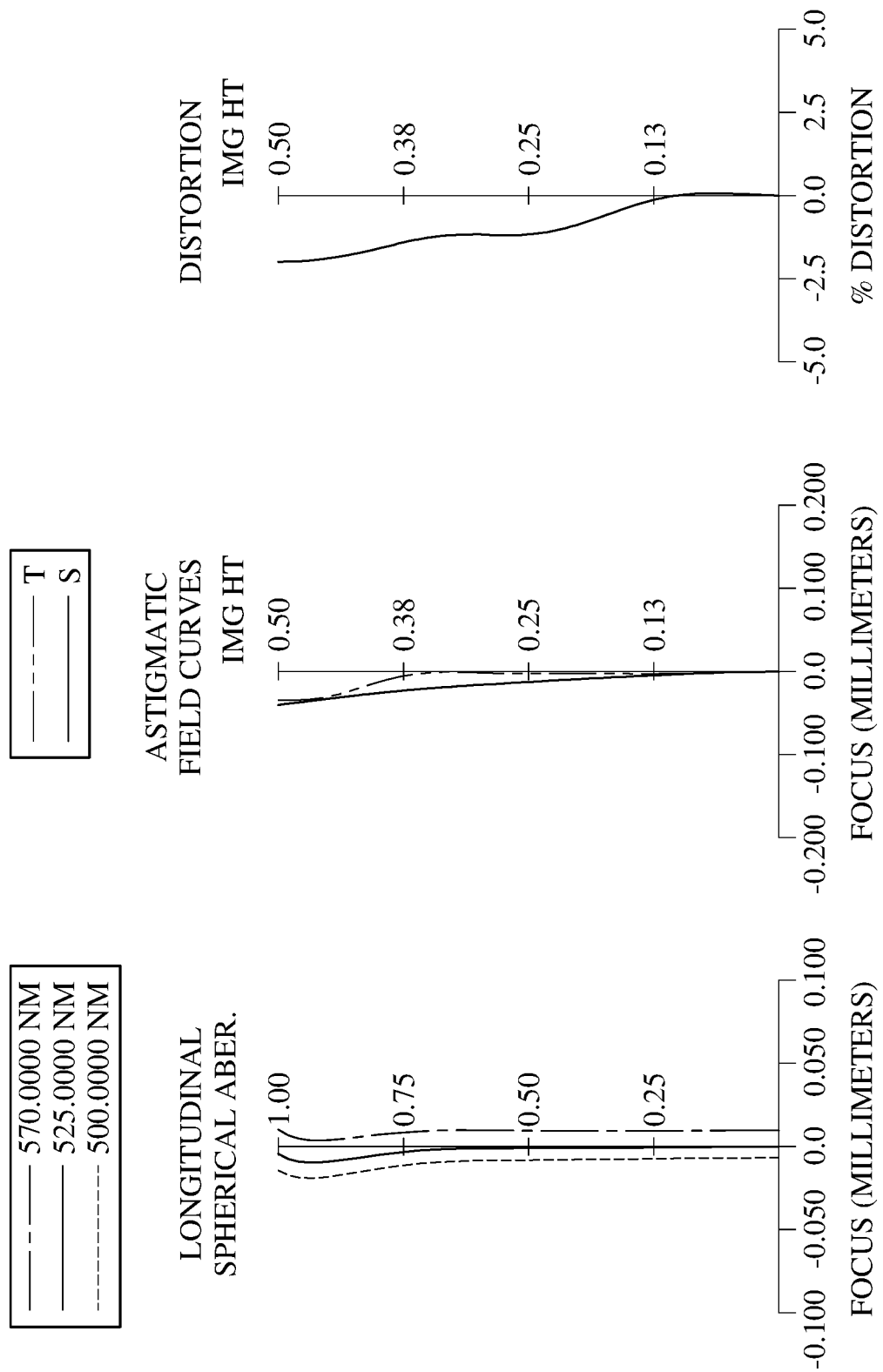
FIG. 18 shows spherical aberration curves, astigmatic field curves and a distortion curve of the fingerprint identification module according to the 6th embodiment.

FIG. 16 is a schematic view of a fingerprint identification module and a light-permeable sheet according to the 6th embodiment of the present disclosure. FIG. 17 is a schematic view of the fingerprint identification module in FIG. 16. FIG. 18 shows, in order from left to right, spherical aberration curves, astigmatic field curves and a distortion curve of the fingerprint identification module according to the 6th embodiment. In FIG. 16 and FIG. 17, the fingerprint identification module includes the optical photographing lens assembly (its reference numeral is omitted) of the present disclosure and an image sensor 670. The optical photographing lens assembly includes, in order from an object side to an image side, a first lens element 610, a second lens element 620, an aperture stop 600, a third lens element 630, a filter 650 and an image surface 660. The optical photographing lens assembly includes three lens elements (610, 620 and 630) with no additional lens element disposed between each of the adjacent three lens elements.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has one inflection point. The object-side surface 611 of the first lens element 610 has one critical point in the off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has two inflection points. The image-side surface 622 of the second lens element 620 has two inflection points. The object-side surface 621 of the second lens element 620 has one critical point in an off-axis region thereof. The image-side surface 622 of the second lens element 620 has one critical point in an off-axis region thereof.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The image-side surface 632 of the third lens element 630 has one inflection point.

The light-permeable sheet 640 is made of glass material and located between an imaged object O and the first lens element 610, and will not affect the focal length of the optical photographing lens assembly. The filter 650 is made of glass material and located between the third lens element 630 and the image surface 660, and will not affect the focal length of the optical photographing lens assembly. The image sensor 670 is disposed on or near the image surface 660 of the optical photographing lens assembly.

The detailed optical data of the 6th embodiment are shown in Table 11 and the aspheric surface data are shown in Table 12 below.

TABLE 11

6th Embodiment
f = 0.34 mm, Fno(work) = 1.34, Fno(inf.) = 1.29, HFOV = 59.1 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Sheet | Plano | | 1.500 | Glass | 1.520 | 64.2 | — |
| 2 | | Plano | | 1.186 | | | | |
| 3 | Lens 1 | −0.659 | (ASP) | 0.303 | Plastic | 1.548 | 56.0 | −0.76 |
| 4 | | 1.311 | (ASP) | 0.414 | | | | |
| 5 | Lens 2 | 1.453 | (ASP) | 0.244 | Plastic | 1.551 | 52.9 | 2.81 |
| 6 | | 22.287 | (ASP) | 0.128 | | | | |
| 7 | Ape. Stop | Plano | | 0.065 | | | | |
| 8 | Lens 3 | 0.944 | (ASP) | 0.450 | Plastic | 1.629 | 25.0 | 0.57 |
| 9 | | −0.472 | (ASP) | 0.200 | | | | |
| 10 | Filter | Plano | | 0.145 | Glass | 1.520 | 64.2 | — |
| 11 | | Plano | | 0.346 | | | | |
| 12 | Image | Plano | | — | | | | |

Note:
Reference wavelength is 525.0 nm.

The working distance is the axial distance (2.686 mm) between the imaged object O (Surface 0) and the object-side surface 611 (Surface 3).

TABLE 12

Aspheric Coefficients

| Surface # | 3 | 4 | 5 | 6 | 8 | 9 |
|---|---|---|---|---|---|---|
| k = | −1.0632E+01 | 3.1272E+00 | 6.0042E+00 | 1.1523E+01 | −1.9228E+00 | −9.6576E−01 |
| A4 = | 9.8579E−01 | 4.2285E+00 | −1.0713E+00 | −1.6890E+00 | −1.5935E+00 | 1.2031E+00 |
| A6 = | −1.9166E+00 | −2.0977E+01 | −4.3056E+01 | −9.2918E−01 | 6.7864E+00 | −2.2833E+00 |
| A8 = | 2.4233E+00 | 2.4462E+02 | 2.8715E+02 | 4.3223E+01 | 9.8024E+01 | −2.7368E+01 |
| A10 = | −1.8868E+00 | −1.6824E+03 | −5.3701E+02 | −7.2318E+02 | −9.9470E+02 | 4.3233E+02 |
| A12 = | 8.3679E−01 | 5.0504E+03 | — | 2.2350E+04 | 3.3668E+03 | −9.9755E+02 |
| A14 = | −1.5794E−01 | −5.5207E+03 | — | −7.8725E+04 | −3.4122E+03 | 2.5462E+00 |

In the 6th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.34 | TL/EPD | 8.83 |
| Fno(work) | 1.34 | TL/f | 6.82 |
| Fno(inf.) | 1.29 | TOB + TL [mm] | 4.98 |
| HFOV [deg.] | 59.1 | (TOB + TL)/EPD | 19.16 |
| Nmax | 1.629 | TOB/TL | 1.17 |
| V2 | 52.9 | \|(R1 + R2)/(R1 − R2)\| | 0.33 |
| V3 | 25.0 | R1/EPD | −2.53 |
| V2 + V3 | 78.0 | (R3 + R4)/(R3 − R4) | −1.14 |
| V1 + V2 + V3 | 134.0 | R5/R6 | −2.00 |
| V1/N1 | 36.18 | f/EPD | 1.29 |
| V2/N2 | 34.13 | f/EPD + cot(HFOV) | 1.89 |
| V3/N3 | 15.37 | \|f/f1\| | 0.44 |
| ΣCT/ΣAT | 1.64 | \|f/f2\| | 0.12 |
| (CT2 + CT3)/T23 | 3.60 | \|f/f3\| | 0.59 |
| CT2/CT1 | 0.81 | f2/f3 | 4.93 |
| CT2/T23 | 1.26 | FOV [deg.] | 118.1 |
| CTS [mm] | 1.50 | Y11/TD | 0.67 |
| SL/TL | 0.53 | Y11/Y12 | 2.10 |
| T12/T23 | 2.15 | Y11/Y32 | 2.57 |
| TD/CTS | 1.07 | Yc11/Y11 | 0.52 |
| TL [mm] | 2.30 | YOB/ImgH | 7.75 |

7th Embodiment

Figure 19:
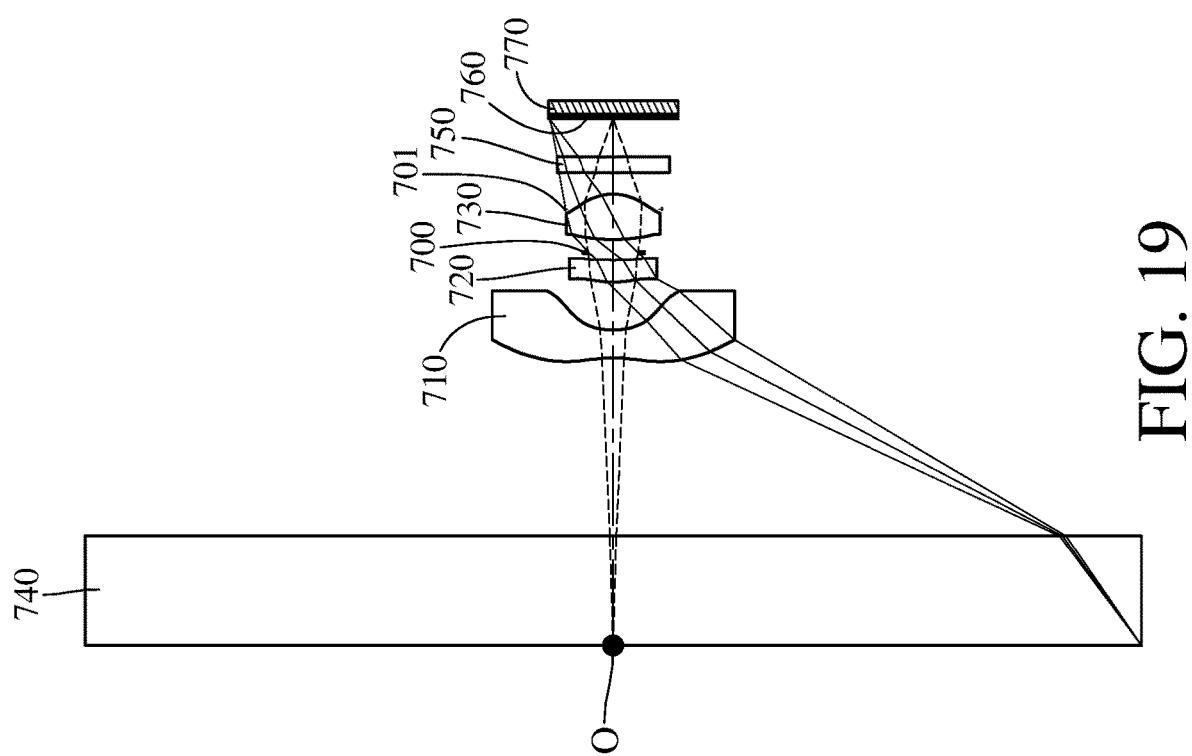
FIG. 19 is a schematic view of a fingerprint identification module and a light-permeable sheet according to the 7th embodiment of the present disclosure.
Figure 20:
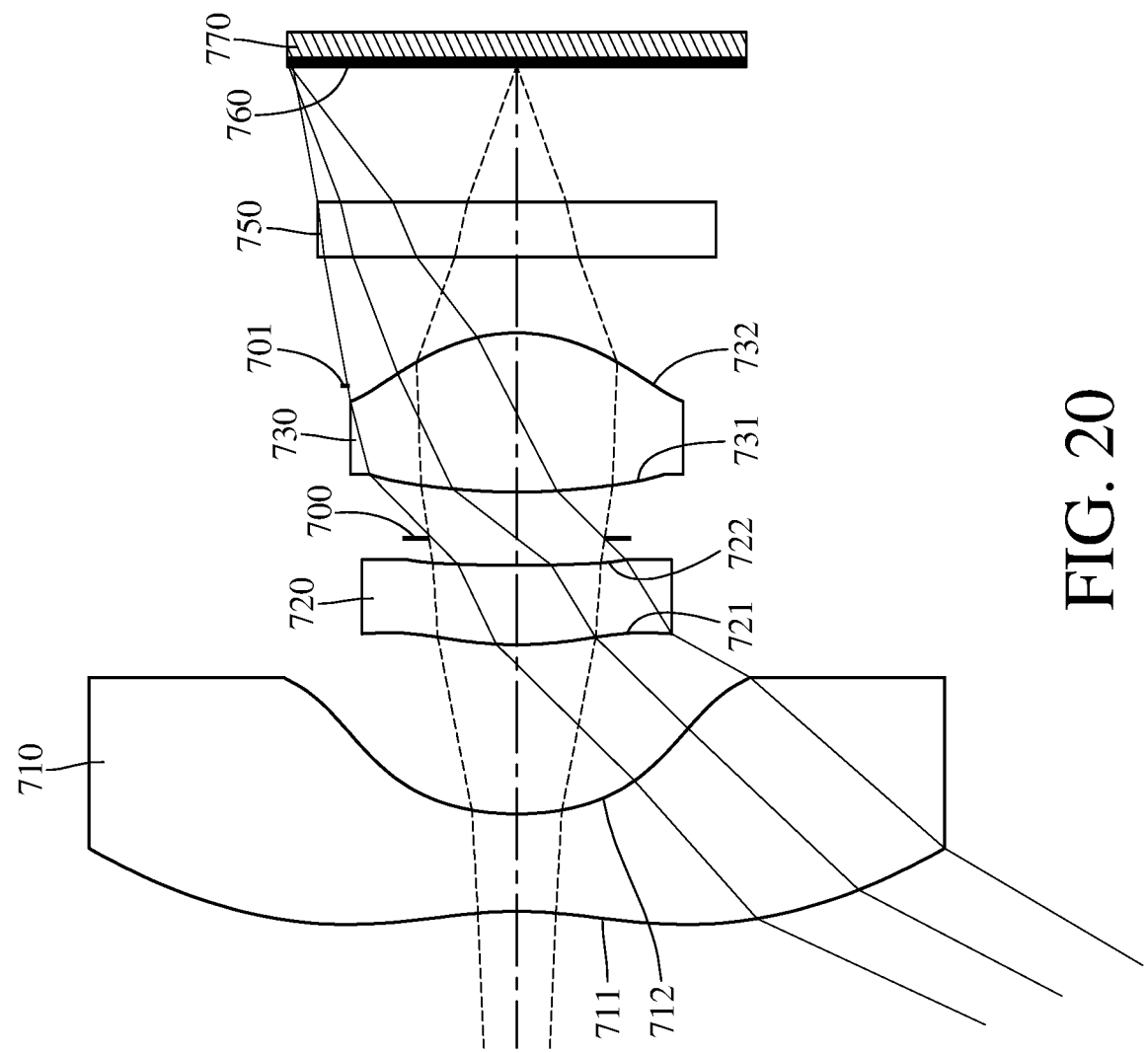
FIG. 20 is a schematic view of the fingerprint identification module in FIG. 19.
Figure 21:
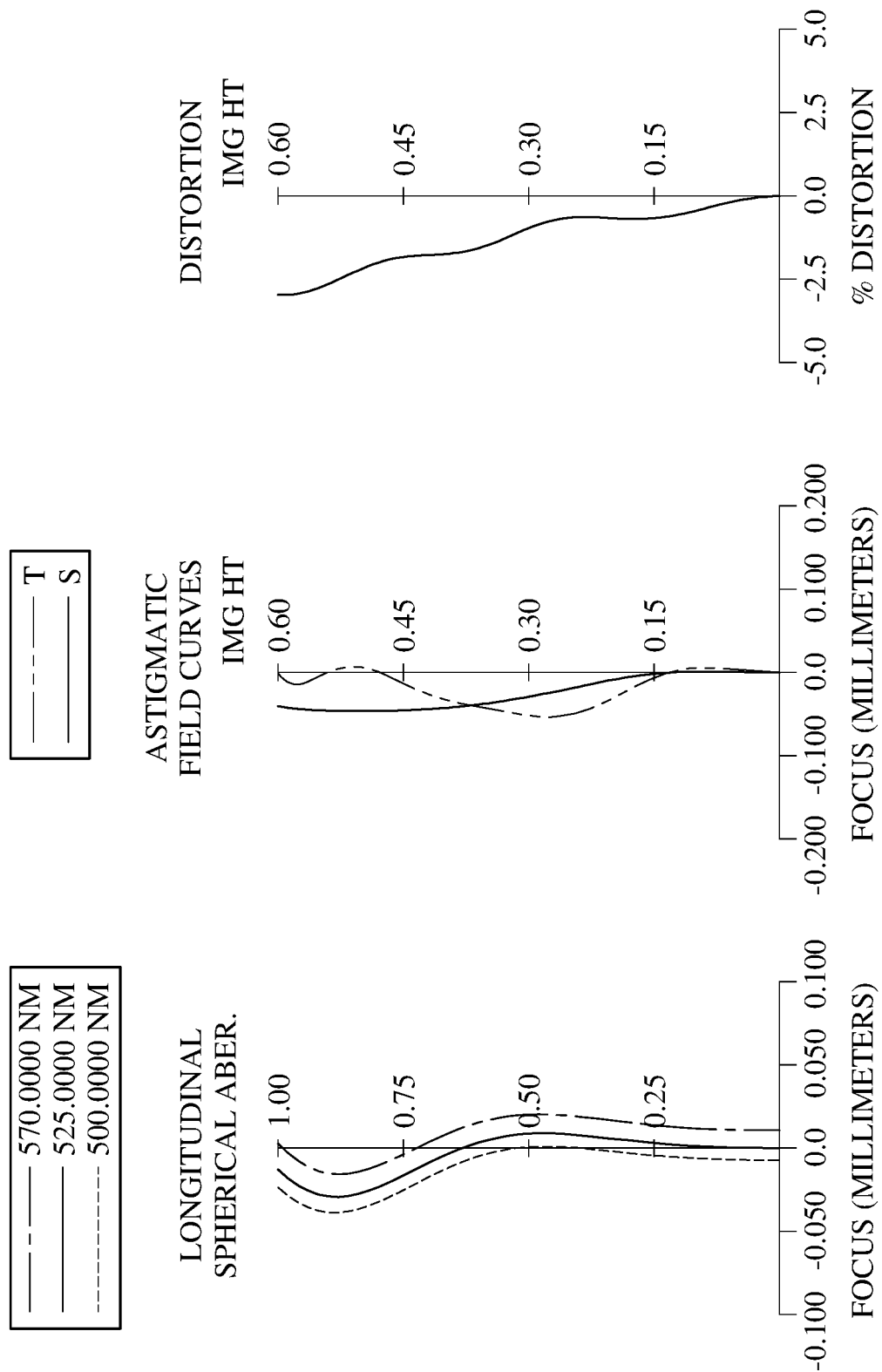
FIG. 21 shows spherical aberration curves, astigmatic field curves and a distortion curve of the fingerprint identification module according to the 7th embodiment.

FIG. 19 is a schematic view of a fingerprint identification module and a light-permeable sheet according to the 7th embodiment of the present disclosure. FIG. 20 is a schematic view of the fingerprint identification module in FIG. 19. FIG. 21 shows, in order from left to right, spherical aberration curves, astigmatic field curves and a distortion curve of the fingerprint identification module according to the 7th embodiment. In FIG. 19 and FIG. 20, the fingerprint identification module includes the optical photographing lens assembly (its reference numeral is omitted) of the present disclosure and an image sensor 770. The optical photographing lens assembly includes, in order from an object side to an image side, a first lens element 710, a second lens element 720, an aperture stop 700, a third lens element 730, a stop 701, a filter 750 and an image surface 760. The optical photographing lens assembly includes three lens elements (710, 720 and 730) with no additional lens element disposed between each of the adjacent three lens elements.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has two inflection points. The object-side surface 711 of the first lens element 710 has one critical point in the off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has one inflection point. The object-side surface 721 of the second lens element 720 has one critical point in an off-axis region thereof.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has one inflection point.

The light-permeable sheet 740 is made of glass material and located between an imaged object O and the first lens element 710, and will not affect the focal length of the optical photographing lens assembly. The filter 750 is made of glass material and located between the third lens element 730 and the image surface 760, and will not affect the focal length of the optical photographing lens assembly. The image sensor 770 is disposed on or near the image surface 760 of the optical photographing lens assembly.

The detailed optical data of the 7th embodiment are shown in Table 13 and the aspheric surface data are shown in Table 14 below.

TABLE 13

7th Embodiment
f = 0.35 mm, Fno(work) = 1.44, Fno(inf.) = 1.40, HFOV = 62.4 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 1.022 | Glass | 1.520 | 64.2 | — |
| 2 | | Plano | 1.658 | | | | |
| 3 | Lens 1 | −1.077 (ASP) | 0.257 | Plastic | 1.548 | 56.0 | −0.75 |
| 4 | | 0.715 (ASP) | 0.446 | | | | |
| 5 | Lens 2 | 0.969 (ASP) | 0.209 | Plastic | 1.548 | 56.0 | 2.37 |
| 6 | | 3.529 (ASP) | 0.071 | | | | |
| 7 | Ape. Stop | Plano | 0.122 | | | | |
| 8 | Lens 3 | 1.364 (ASP) | 0.420 | Plastic | 1.649 | 23.5 | 0.56 |
| 9 | | −0.439 (ASP) | −0.140 | | | | |
| 10 | Stop | Plano | 0.340 | | | | |
| 11 | Filter | Plano | 0.145 | Glass | 1.520 | 64.2 | — |
| 12 | | Plano | 0.357 | | | | |
| 13 | Image | Plano | — | | | | |

Note:
Reference wavelength is 525.0 nm.
The working distance is the axial distance (2.680 mm) between the imaged object O (Surface 0) and the object-side surface 711 (Surface 3).
An effective radius of the stop 701 (Surface 10) is 0.445 mm.

TABLE 14

Aspheric Coefficients

| Surface # | 3 | 4 | 5 | 6 | 8 | 9 |
|---|---|---|---|---|---|---|
| k = | −1.0000E+00 | −1.0000E+00 | 0.0000E+00 | 0.0000E+00 | −1.0000E+00 | −1.0000E+00 |
| A4 = | 2.3902E+00 | 2.3884E+00 | −7.4818E−01 | −3.9472E+00 | −3.5147E+00 | 1.7704E+00 |
| A6 = | −6.9699E+00 | −1.4949E+01 | −2.1214E+01 | 4.0398E+02 | 8.9240E+01 | −7.7576E+01 |
| A8 = | 1.5581E+01 | 2.6125E+02 | 7.8450E+01 | −1.7798E+04 | −1.6755E+03 | 1.6567E+03 |
| A10 = | −2.4051E+01 | −1.7302E+03 | −4.3439E+02 | 3.9382E+05 | 2.0038E+04 | −1.7408E+04 |
| A12 = | 2.4157E+01 | 4.9453E+03 | 5.9626E+03 | −4.5408E+06 | −1.3723E+05 | 9.7580E+04 |
| A14 = | −1.4886E+01 | −6.6011E+03 | −2.7438E+04 | 2.6352E+07 | 4.9673E+05 | −2.7450E+05 |
| A16 = | 5.0699E+00 | 3.4376E+03 | 3.8469E+04 | −6.1090E+07 | −7.3887E+05 | 3.0522E+05 |
| A18 = | −7.2589E−01 | — | — | — | — | — |

In the 7th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.35 | TL/EPD | 9.01 |
| Fno(work) | 1.44 | TL/f | 6.44 |
| Fno(inf.) | 1.40 | TOB + TL [mm] | 4.91 |
| HFOV [deg.] | 62.4 | (TOB + TL)/EPD | 19.87 |
| Nmax | 1.649 | TOB/TL | 1.20 |
| V2 | 56.0 | |(R1 + R2)/(R1 − R2)| | 0.20 |
| V3 | 23.5 | R1/EPD | −4.36 |
| V2 + V3 | 79.5 | (R3 + R4)/(R3 − R4) | −1.76 |
| V1 + V2 + V3 | 135.5 | R5/R6 | −3.11 |
| V1/N1 | 36.17 | f/EPD | 1.40 |
| V2/N2 | 36.17 | f/EPD + cot(HFOV) | 1.92 |
| V3/N3 | 14.25 | |f/f1| | 0.46 |
| ΣCT/ΣAT | 1.39 | |f/f2| | 0.15 |
| (CT2 + CT3)/T23 | 3.26 | |f/f3| | 0.61 |
| CT2/CT1 | 0.81 | f2/f3 | 4.21 |
| CT2/T23 | 1.08 | FOV [deg.] | 124.7 |
| CTS [mm] | 1.02 | Y11/TD | 0.74 |
| SL/TL | 0.56 | Y11/Y12 | 1.83 |
| T12/T23 | 2.31 | Y11/Y32 | 2.57 |
| TD/CTS | 1.49 | Yc11/Y11 | 0.40 |
| TL [mm] | 2.23 | YOB/ImgH | 8.18 |

8th Embodiment

Figure 22:
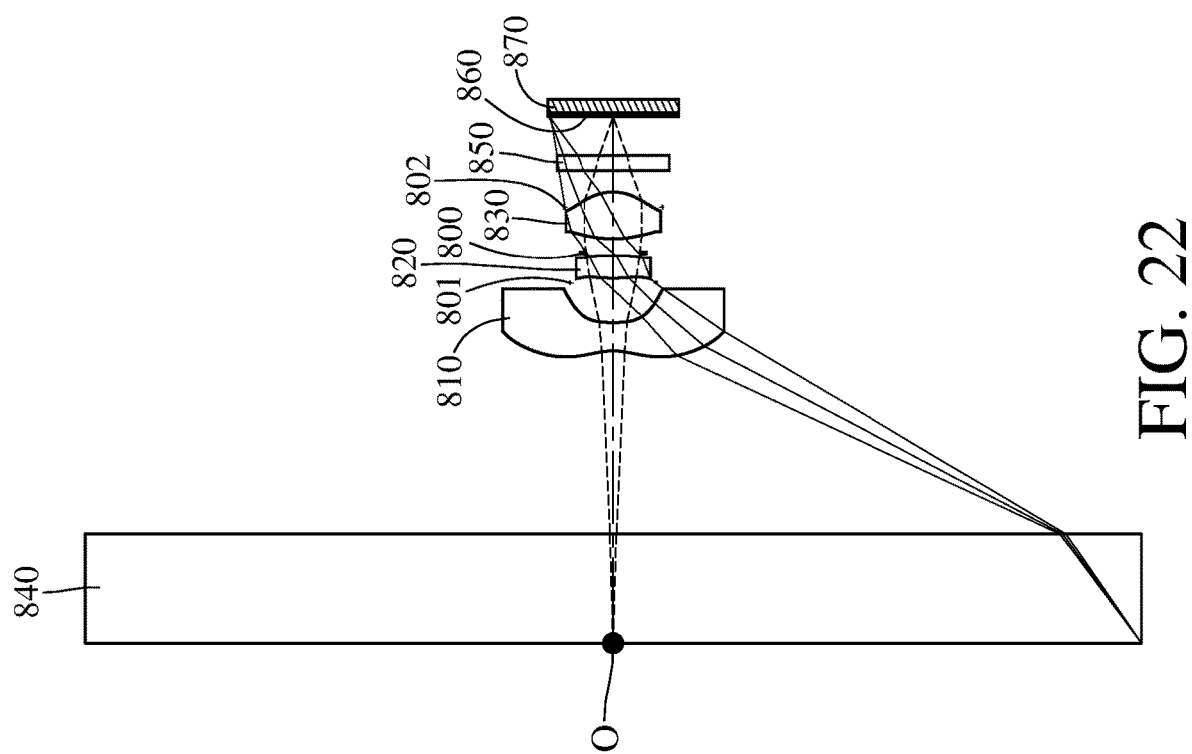
FIG. 22 is a schematic view of a fingerprint identification module and a light-permeable sheet according to the 8th embodiment of the present disclosure.
Figure 23:
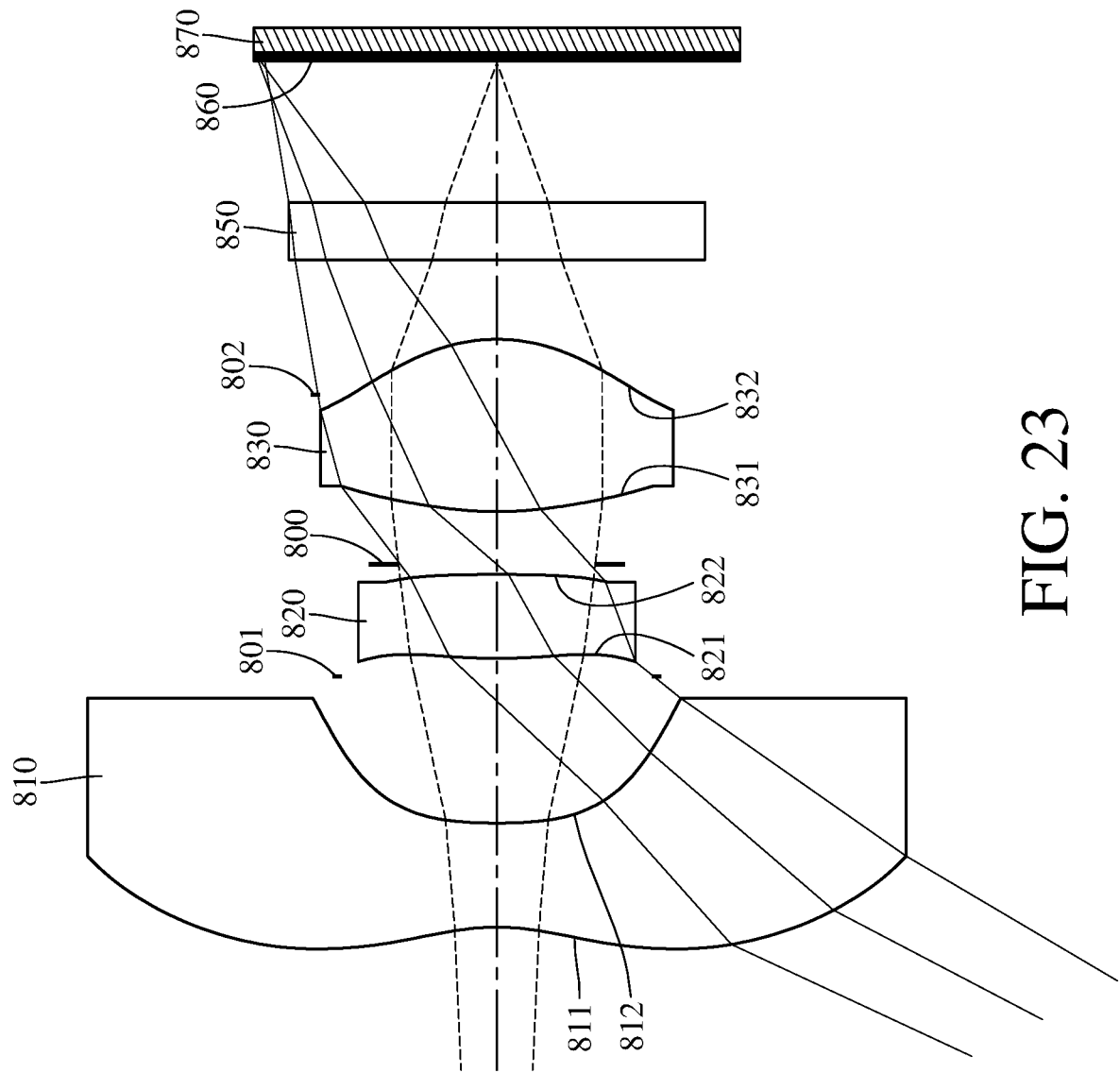
FIG. 23 is a schematic view of the fingerprint identification module in FIG. 22.
Figure 24:
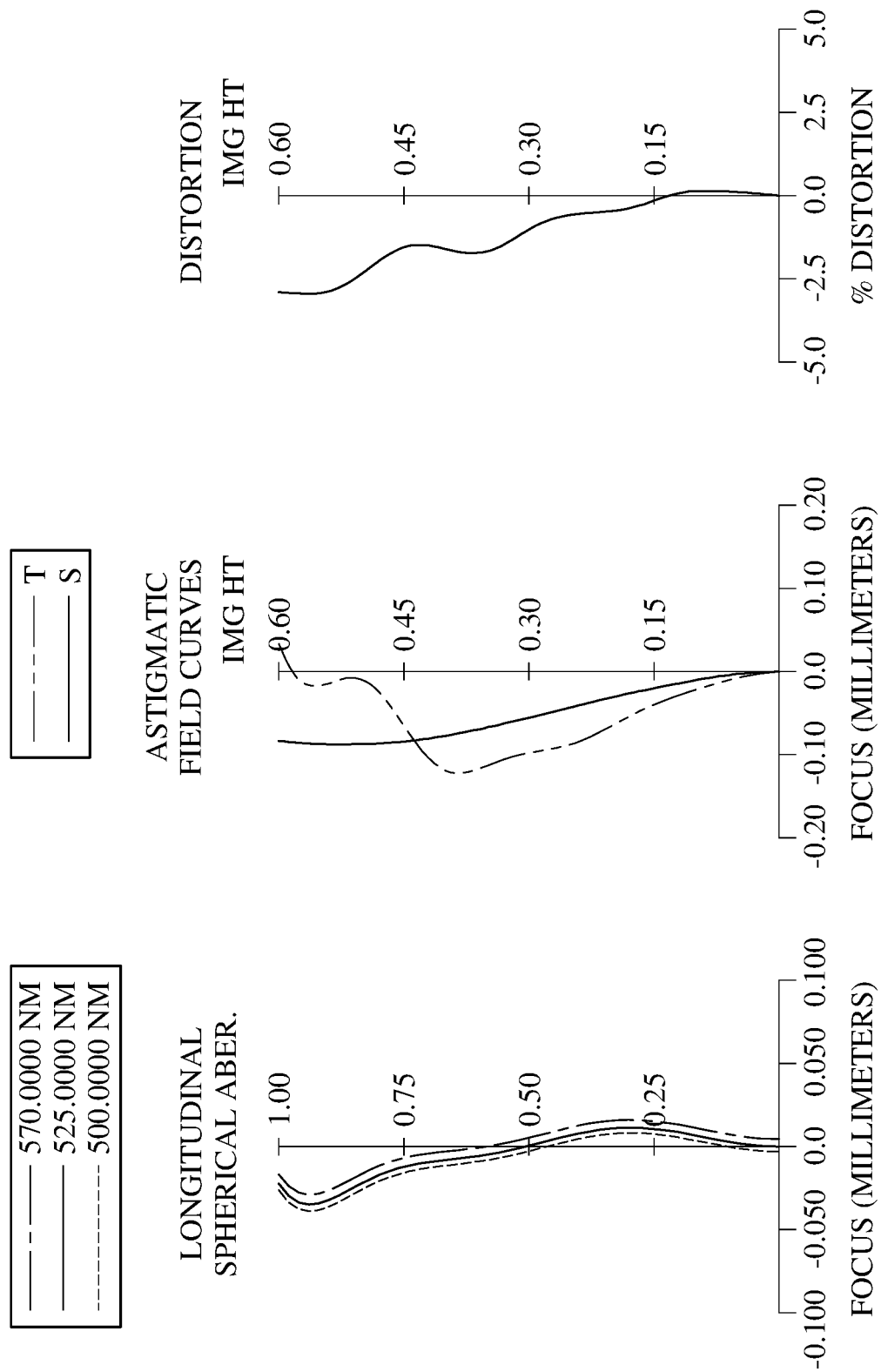
FIG. 24 shows spherical aberration curves, astigmatic field curves and a distortion curve of the fingerprint identification module according to the 8th embodiment.

FIG. 22 is a schematic view of a fingerprint identification module and a light-permeable sheet according to the 8th embodiment of the present disclosure. FIG. 23 is a schematic view of the fingerprint identification module in FIG. 22. FIG. 24 shows, in order from left to right, spherical aberration curves, astigmatic field curves and a distortion curve of the fingerprint identification module according to the 8th embodiment. In FIG. 22 and FIG. 23, the fingerprint identification module includes the optical photographing lens assembly (its reference numeral is omitted) of the present disclosure and an image sensor 870. The optical photographing lens assembly includes, in order from an object side to an image side, a first lens element 810, a stop 801, a second lens element 820, an aperture stop 800, a third lens element 830, a stop 802, a filter 850 and an image surface 860. The optical photographing lens assembly includes three lens elements (810, 820 and 830) with no additional lens element disposed between each of the adjacent three lens elements.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The object-side surface 811 of the first lens element 810 has one critical point in the off-axis region thereof.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric. The object-side surface 821 of the second lens element 820 has one inflection point. The object-side surface 821 of the second lens element 820 has one critical point in an off-axis region thereof.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The object-side surface 831 of the third lens element 830 has one inflection point. The image-side surface 832 of the third lens element 830 has two inflection points.

The light-permeable sheet 840 is made of glass material and located between an imaged object O and the first lens element 810, and will not affect the focal length of the optical photographing lens assembly. The filter 850 is made of glass material and located between the third lens element 830 and the image surface 860, and will not affect the focal length of the optical photographing lens assembly. The image sensor 870 is disposed on or near the image surface 860 of the optical photographing lens assembly.

The detailed optical data of the 8th embodiment are shown in Table 15 and the aspheric surface data are shown in Table 16 below.

TABLE 15

8th Embodiment
f = 0.34 mm, Fno(work) = 1.43, Fno(inf.) = 1.39, HFOV = 62.3 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 1.022 | Glass | 1.520 | 64.2 | — |
| 2 | | Plano | 1.704 | | | | |
| 3 | Lens 1 | −0.576 (ASP) | 0.262 | Plastic | 1.548 | 56.0 | −0.68 |
| 4 | | 1.237 (ASP) | 0.369 | | | | |
| 5 | Stop | Plano | 0.046 | | | | |
| 6 | Lens 2 | 1.714 (ASP) | 0.211 | Plastic | 1.548 | 56.0 | 2.26 |
| 7 | | −4.251 (ASP) | 0.025 | | | | |
| 8 | Ape. Stop | Plano | 0.133 | | | | |
| 9 | Lens 3 | 0.862 (ASP) | 0.434 | Plastic | 1.548 | 56.0 | 0.60 |
| 10 | | −0.433 (ASP) | −0.140 | | | | |
| 11 | Stop | Plano | 0.340 | | | | |
| 12 | Filter | Plano | 0.145 | Glass | 1.520 | 64.2 | — |
| 13 | | Plano | 0.356 | | | | |
| 14 | Image | Plano | — | | | | |

Note:
Reference wavelength is 525.0 nm.
The working distance is the axial distance (2.726 mm) between the imaged object O (Surface 0) and the object-side surface 811 (Surface 3).
An effective radius of the stop 801 (Surface 5) is 0.395 mm.
An effective radius of the stop 802 (Surface 11) is 0.450 mm.

TABLE 16

Aspheric Coefficients

| Surface # | 3 | 4 | 6 | 7 | 9 | 10 |
|---|---|---|---|---|---|---|
| k = | −1.0000E+00 | −1.0000E+00 | 0.0000E+00 | 0.0000E+00 | −1.0000E+00 | −1.0000E+00 |
| A4 = | 6.0226E+00 | 1.8565E+00 | 3.0468E+00 | 5.7619E+00 | −3.7574E+00 | 7.9649E−01 |
| A6 = | −2.6457E+01 | 1.5175E+02 | −2.3620E+02 | −7.0972E+02 | 4.2330E+01 | −3.0113E+01 |
| A8 = | 8.1879E+01 | −2.6817E+03 | 4.9948E+03 | 3.2094E+04 | −2.5836E+02 | 7.1337E+02 |
| A10 = | −1.6676E+02 | 2.3912E+04 | −6.5425E+04 | −7.7992E+05 | −2.1773E+02 | −6.8961E+03 |
| A12 = | 2.1793E+02 | −1.1188E+05 | 4.9075E+05 | 1.0202E+07 | 1.6944E+04 | 3.3396E+04 |
| A14 = | −1.7525E+02 | 2.5877E+05 | −1.8808E+06 | −6.7146E+07 | −1.0616E+05 | −7.2548E+04 |
| A16 = | 7.8772E+01 | −2.3309E+05 | 2.8316E+06 | 1.7345E+08 | 2.0864E+05 | 4.5283E+04 |
| A18 = | −1.5113E+01 | — | — | — | — | — |

In the 8th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.34 | TL/EPD | 8.83 |
| Fno(work) | 1.43 | TL/f | 6.36 |
| Fno(inf.) | 1.39 | TOB + TL [mm] | 4.91 |
| HFOV [deg.] | 62.3 | (TOB + TL)/EPD | 19.87 |
| Nmax | 1.548 | TOB/TL | 1.25 |
| V2 | 56.0 | |(R1 + R2)/(R1 − R2)| | 0.36 |
| V3 | 56.0 | R1/EPD | −2.33 |
| V2 + V3 | 112.0 | (R3 + R4)/(R3 − R4) | −0.43 |
| V1 + V2 + V3 | 167.9 | R5/R6 | −1.99 |
| V1/N1 | 36.17 | f/EPD | 1.39 |
| V2/N2 | 36.17 | f/EPD + cot(HFOV) | 1.91 |
| V3/N3 | 36.17 | |f/f1| | 0.50 |
| ΣCT/ΣAT | 1.58 | |f/f2| | 0.15 |
| (CT2 + CT3)/T23 | 4.08 | |f/f3| | 0.57 |
| CT2/CT1 | 0.81 | f2/f3 | 3.78 |
| CT2/T23 | 1.34 | FOV [deg.] | 124.7 |
| CTS [mm] | 1.02 | Y11/TD | 0.70 |
| SL/TL | 0.58 | Y11/Y12 | 2.23 |
| T12/T23 | 2.63 | Y11/Y32 | 2.32 |
| TD/CTS | 1.45 | Yc11/Y11 | 0.43 |
| TL [mm] | 2.18 | YOB/ImgH | 8.19 |

9th Embodiment

Figure 25:
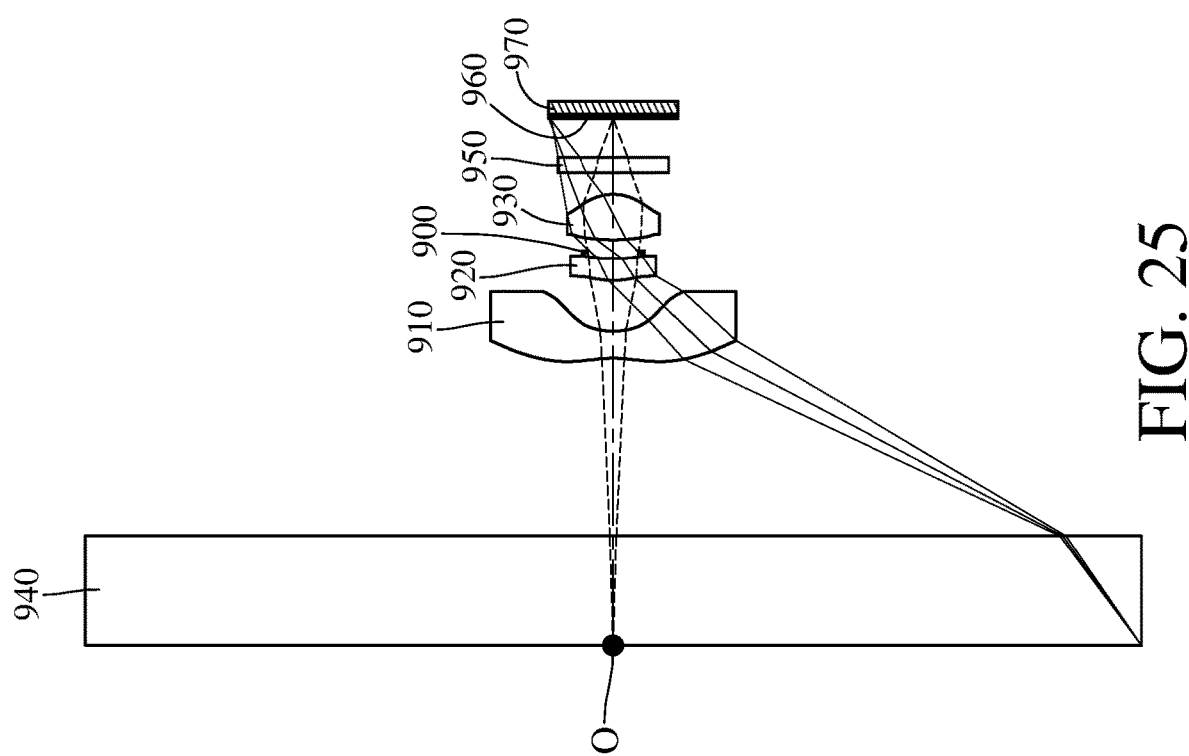
FIG. 25 is a schematic view of a fingerprint identification module and a light-permeable sheet according to the 9th embodiment of the present disclosure.
Figure 26:
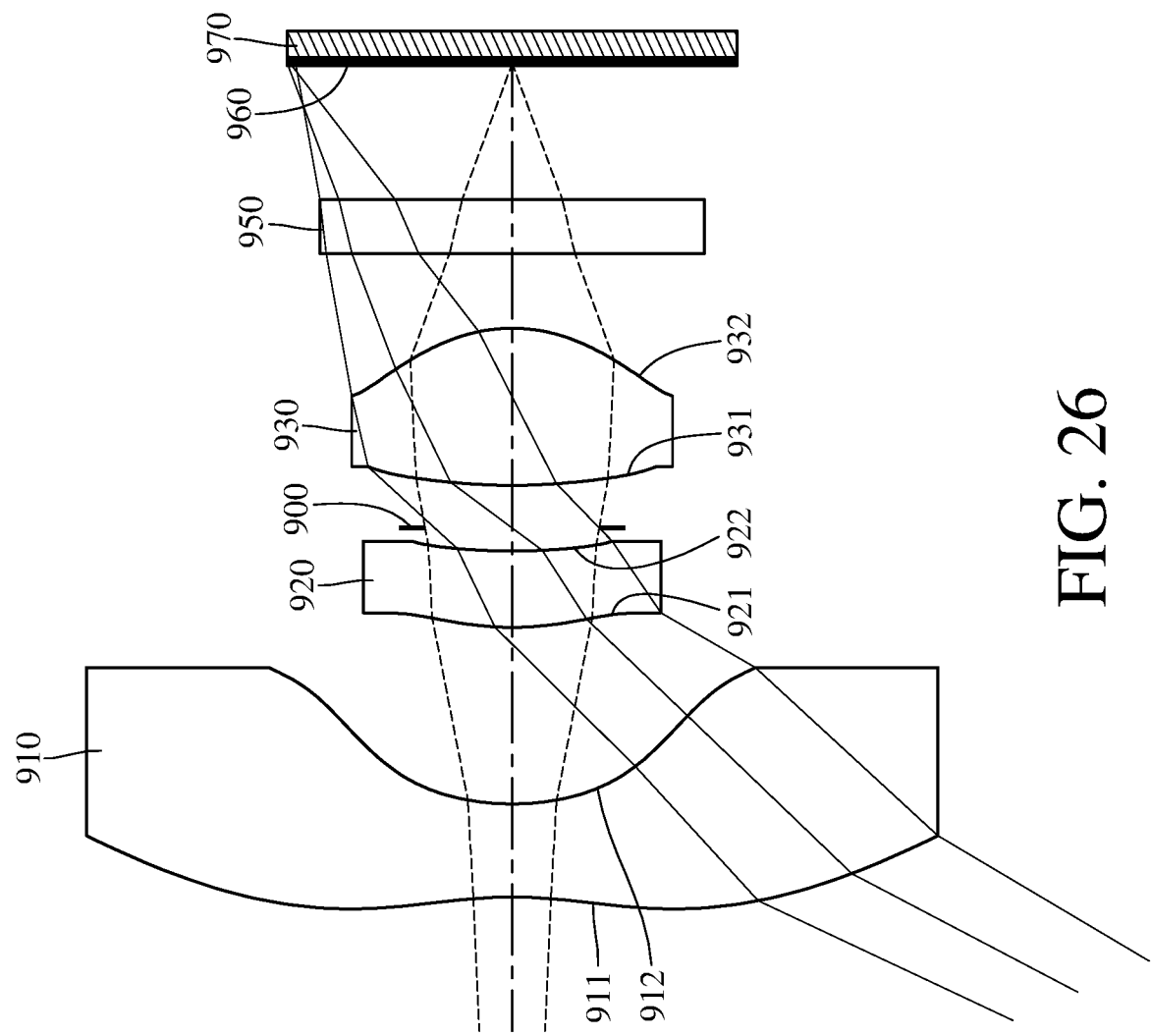
FIG. 26 is a schematic view of the fingerprint identification module in FIG. 25.
Figure 27:
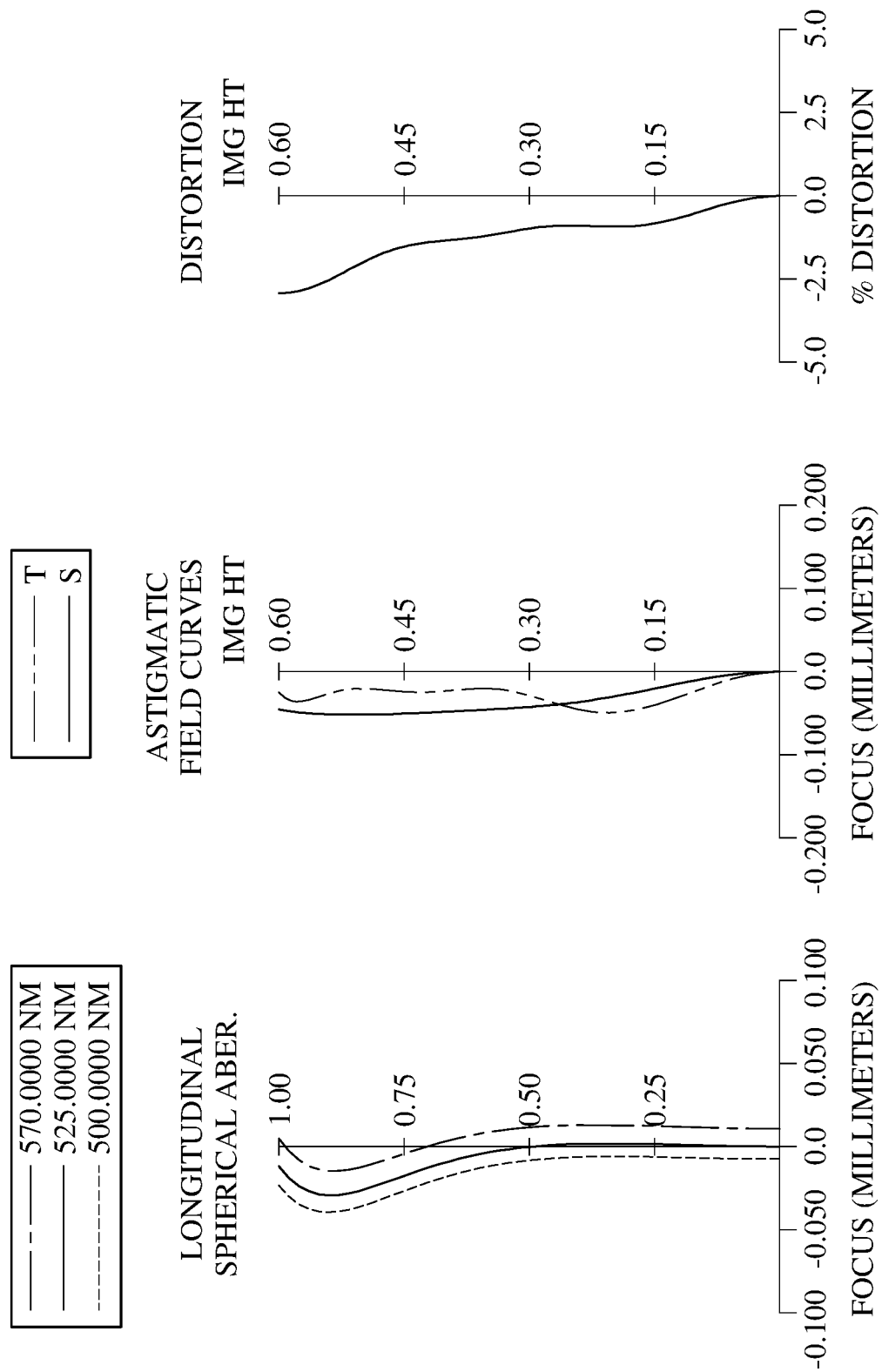
FIG. 27 shows spherical aberration curves, astigmatic field curves and a distortion curve of the fingerprint identification module according to the 9th embodiment.

FIG. 25 is a schematic view of a fingerprint identification module and a light-permeable sheet according to the 9th embodiment of the present disclosure. FIG. 26 is a schematic view of the fingerprint identification module in FIG. 25. FIG. 27 shows, in order from left to right, spherical aberration curves, astigmatic field curves and a distortion curve of the fingerprint identification module according to the 9th embodiment. In FIG. 25 and FIG. 26, the fingerprint identification module includes the optical photographing lens assembly (its reference numeral is omitted) of the present disclosure and an image sensor 970. The optical photographing lens assembly includes, in order from an object side to an image side, a first lens element 910, a second lens element 920, an aperture stop 900, a third lens element 930, a filter 950 and an image surface 960. The optical photographing lens assembly includes three lens elements (910, 920 and 930) with no additional lens element disposed between each of the adjacent three lens elements.

The first lens element 910 with negative refractive power has an object-side surface 911 being concave in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has one inflection point. The image-side surface 912 of the first lens element 910 has two inflection points. The object-side surface 911 of the first lens element 910 has one critical point in the off-axis region thereof.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has three inflection points. The object-side surface 921 of the second lens element 920 has two critical points in an off-axis region thereof.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. The image-side surface 932 of the third lens element 930 has one inflection point.

The light-permeable sheet 940 is made of glass material and located between an imaged object O and the first lens element 910, and will not affect the focal length of the optical photographing lens assembly. The filter 950 is made of glass material and located between the third lens element 930 and the image surface 960, and will not affect the focal length of the optical photographing lens assembly. The image sensor 970 is disposed on or near the image surface 960 of the optical photographing lens assembly.

The detailed optical data of the 9th embodiment are shown in Table 17 and the aspheric surface data are shown in Table 18 below.

TABLE 17

9th Embodiment
f = 0.35 mm, Fno(work) = 1.43, Fno(inf.) = 1.38, HFOV = 62.3 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 1.022 | Glass | 1.520 | 64.2 | — |
| 2 | | Plano | 1.656 | | | | |
| 3 | Lens 1 | −1.133 (ASP) | 0.250 | Plastic | 1.548 | 56.0 | −0.75 |
| 4 | | 0.688 (ASP) | 0.474 | | | | |
| 5 | Lens 2 | 0.809 (ASP) | 0.205 | Plastic | 1.548 | 56.0 | 2.54 |
| 6 | | 1.763 (ASP) | 0.062 | | | | |
| 7 | Ape. Stop | Plano | 0.114 | | | | |
| 8 | Lens 3 | 1.320 (ASP) | 0.422 | Plastic | 1.649 | 23.5 | 0.56 |
| 9 | | −0.437 (ASP) | 0.200 | | | | |
| 10 | Filter | Plano | 0.145 | Glass | 1.520 | 64.2 | — |
| 11 | | Plano | 0.356 | | | | |
| 12 | Image | Plano | — | | | | |

Note:
Reference wavelength is 525.0 nm.
The working distance is the axial distance (2.678 mm) between the imaged object O (Surface 0) and the object-side surface 911 (Surface 3).
An effective radius of the image-side surface 932 (Surface 9) is 0.430 mm.

TABLE 18

Aspheric Coefficients

| Surface # | 3 | 4 | 5 | 6 | 8 | 9 |
|---|---|---|---|---|---|---|
| k = | −1.0000E+00 | −1.0000E+00 | 0.0000E+00 | 0.0000E+00 | −1.0000E+00 | −1.0000E+00 |
| A4 = | 2.2773E+00 | 8.7355E−01 | −1.3384E+00 | 3.3542E−01 | −3.9839E+00 | −1.4680E+00 |
| A6 = | −6.3124E+00 | 1.1259E+01 | −1.1117E+01 | 5.3959E+01 | 1.0025E+02 | 4.9934E+01 |
| A8 = | 1.3309E+01 | 1.9459E+01 | 6.8865E+01 | −1.9647E+03 | −1.7893E+03 | −8.5421E+02 |
| A10 = | −1.9621E+01 | −6.1370E+02 | −3.8690E+03 | 5.7456E+03 | 2.0147E+04 | 9.7784E+03 |
| A12 = | 1.9051E+01 | 2.2748E+03 | 4.7985E+04 | 5.0573E+05 | −1.2756E+05 | −6.8173E+04 |
| A14 = | −1.1448E+01 | −3.3883E+03 | −2.0982E+05 | −5.3611E+06 | 4.1928E+05 | 2.5956E+05 |
| A16 = | 3.8234E+00 | 1.8700E+03 | 3.0651E+05 | 1.1613E+07 | −5.5523E+05 | −3.9842E+05 |
| A18 = | −5.3868E−01 | — | — | — | — | — |

In the 9th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.35 | TL/EPD | 8.93 |
| Fno(work) | 1.43 | TL/f | 6.45 |
| Fno(inf.) | 1.38 | TOB + TL [mm] | 4.91 |
| HFOV [deg.] | 62.3 | (TOB + TL)/EPD | 19.64 |
| Nmax | 1.649 | TOB/TL | 1.20 |
| V2 | 56.0 | |(R1 + R2)/(R1 − R2)| | 0.24 |
| V3 | 23.5 | R1/EPD | −4.53 |
| V2 + V3 | 79.5 | (R3 + R4)/(R3 − R4) | −2.70 |
| V1 + V2 + V3 | 135.5 | R5/R6 | −3.02 |
| V1/N1 | 36.17 | f/EPD | 1.38 |
| V2/N2 | 36.17 | f/EPD + cot(HFOV) | 1.91 |
| V3/N3 | 14.25 | |f/f1| | 0.46 |
| ΣCT/ΣAT | 1.35 | |f/f2| | 0.14 |
| (CT2 + CT3)/T23 | 3.56 | |f/f3| | 0.62 |
| CT2/CT1 | 0.82 | f2/f3 | 4.54 |
| CT2/T23 | 1.16 | FOV [deg.] | 124.5 |
| CTS [mm] | 1.02 | Y11/TD | 0.75 |
| SL/TL | 0.56 | Y11/Y12 | 1.75 |
| T12/T23 | 2.69 | Y11/Y32 | 2.65 |
| TD/CTS | 1.49 | Yc11/Y11 | 0.38 |
| TL [mm] | 2.23 | YOB/ImgH | 8.18 |

10th Embodiment

Figure 28:
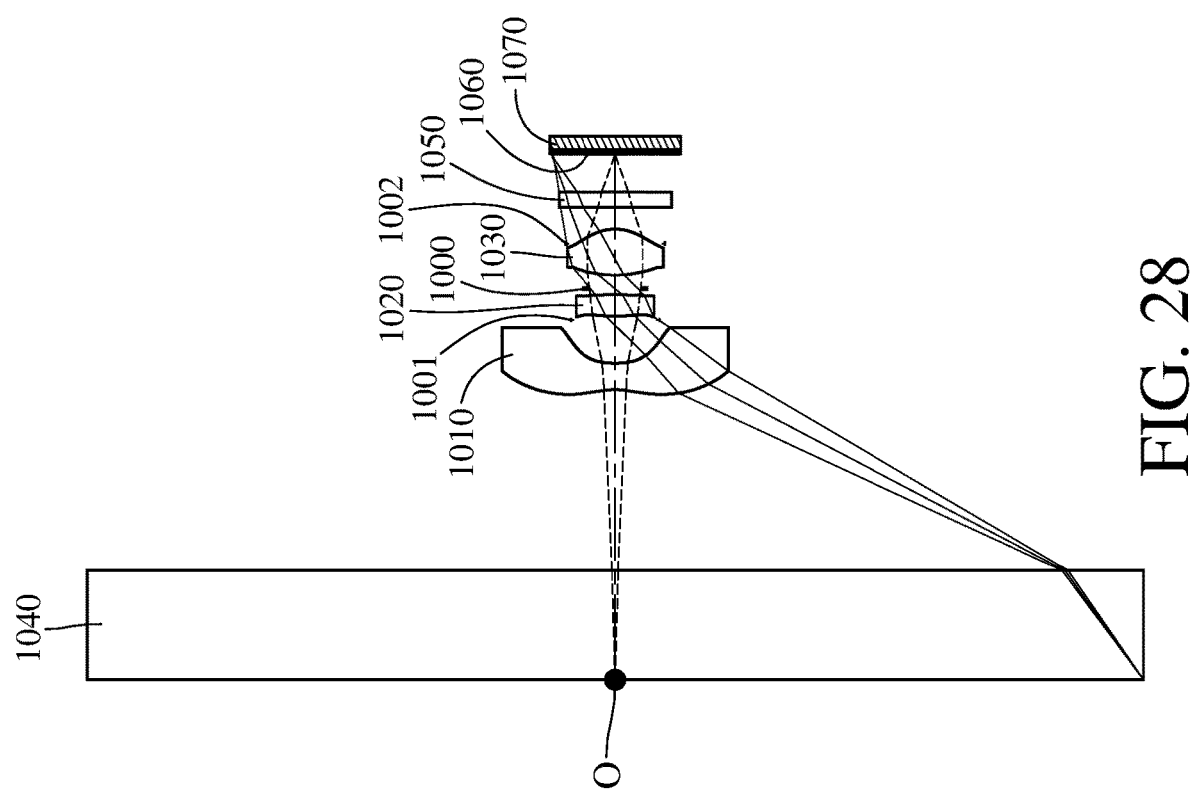
FIG. 28 is a schematic view of a fingerprint identification module and a light-permeable sheet according to the 10th embodiment of the present disclosure.
Figure 29:
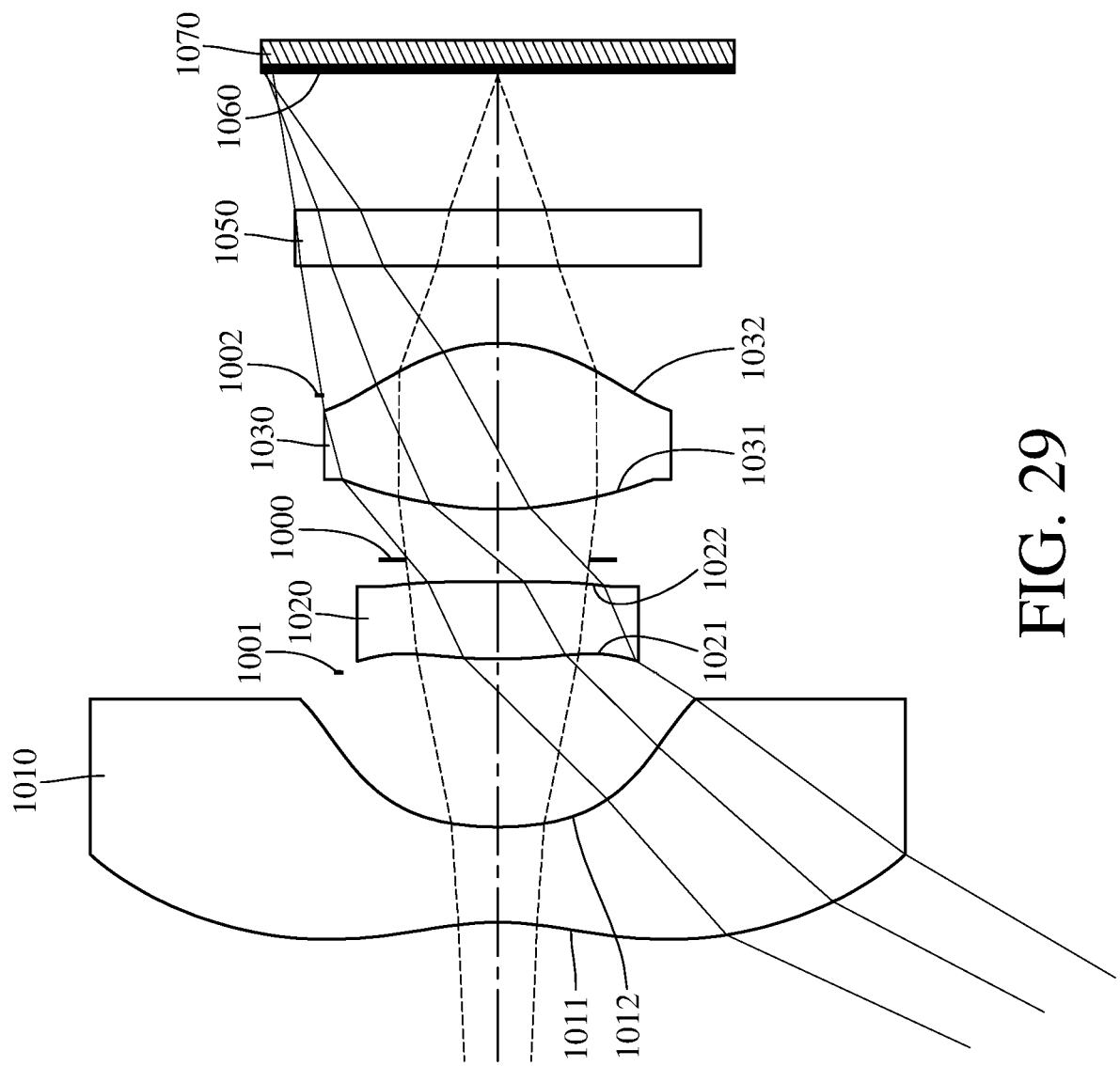
FIG. 29 is a schematic view of the fingerprint identification module in FIG. 28.
Figure 30:
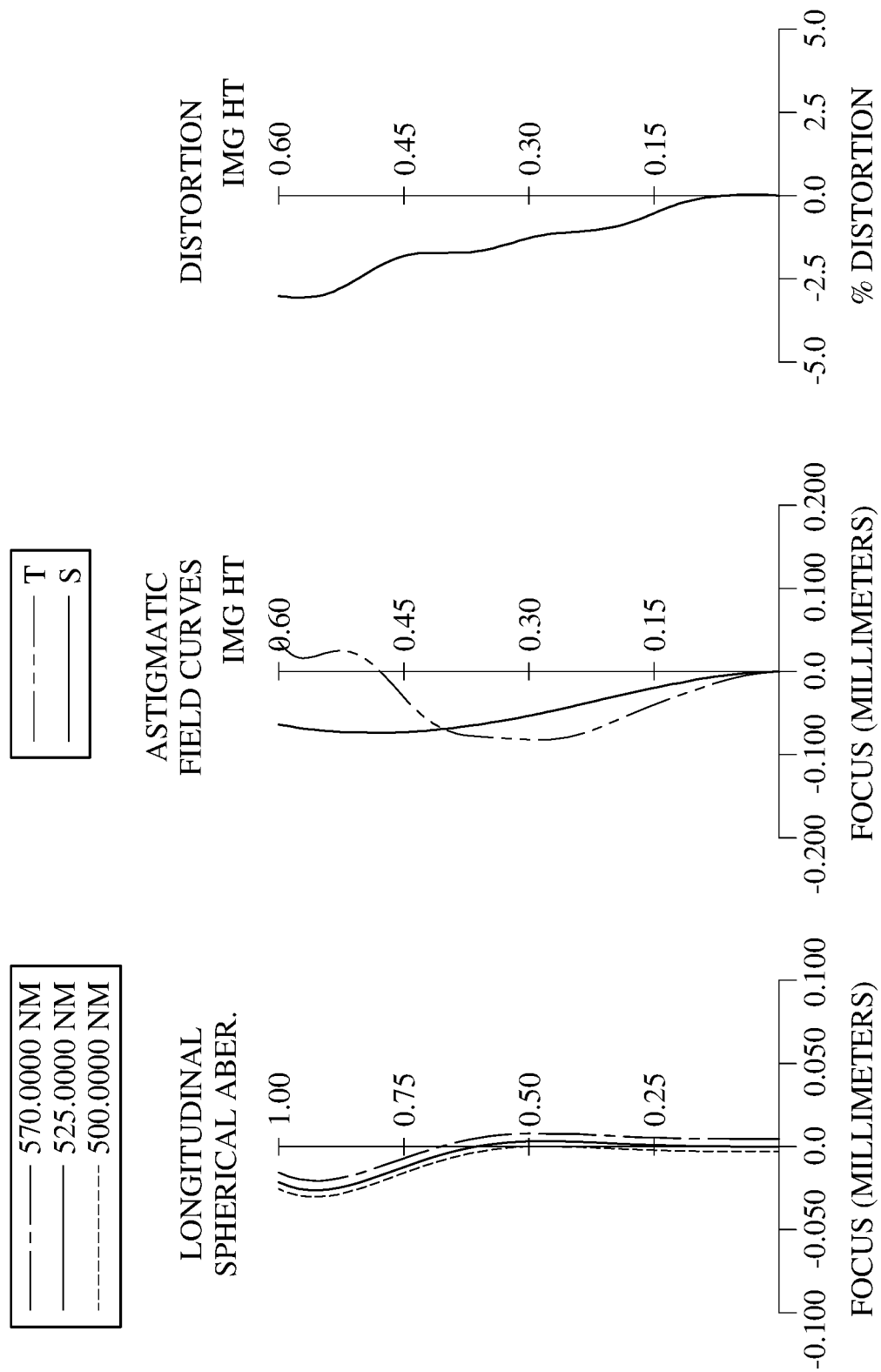
FIG. 30 shows spherical aberration curves, astigmatic field curves and a distortion curve of the fingerprint identification module according to the 10th embodiment.

FIG. 28 is a schematic view of a fingerprint identification module and a light-permeable sheet according to the 10th embodiment of the present disclosure. FIG. 29 is a schematic view of the fingerprint identification module in FIG. 28. FIG. 30 shows, in order from left to right, spherical aberration curves, astigmatic field curves and a distortion curve of the fingerprint identification module according to the 10th embodiment. In FIG. 28 and FIG. 29, the fingerprint identification module includes the optical photographing lens assembly (its reference numeral is omitted) of the present disclosure and an image sensor 1070. The optical photographing lens assembly includes, in order from an object side to an image side, a first lens element 1010, a stop 1001, a second lens element 1020, an aperture stop 1000, a third lens element 1030, a stop 1002, a filter 1050 and an image surface 1060. The optical photographing lens assembly includes three lens elements (1010, 1020 and 1030) with no additional lens element disposed between each of the adjacent three lens elements.

The first lens element 1010 with negative refractive power has an object-side surface 1011 being concave in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point. The object-side surface 1011 of the first lens element 1010 has one critical point in the off-axis region thereof.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric. The object-side surface 1021 of the second lens element 1020 has two inflection points. The image-side surface 1022 of the second lens element 1020 has one inflection point. The object-side surface 1021 of the second lens element 1020 has one critical point in an off-axis region thereof.

The third lens element 1030 with positive refractive power has an object-side surface 1031 being convex in a paraxial region thereof and an image-side surface 1032 being convex in a paraxial region thereof. The third lens element 1030 is made of plastic material and has the object-side surface 1031 and the image-side surface 1032 being both aspheric. The object-side surface 1031 of the third lens element 1030 has one inflection point. The image-side surface 1032 of the third lens element 1030 has two inflection points.

The light-permeable sheet 1040 is made of glass material and located between an imaged object O and the first lens element 1010, and will not affect the focal length of the optical photographing lens assembly. The filter 1050 is made of glass material and located between the third lens element 1030 and the image surface 1060, and will not affect the focal length of the optical photographing lens assembly. The image sensor 1070 is disposed on or near the image surface 1060 of the optical photographing lens assembly.

The detailed optical data of the 10th embodiment are shown in Table 19 and the aspheric surface data are shown in Table 20 below.

TABLE 19

10th Embodiment
f = 0.34 mm, Fno(work) = 1.47, Fno(inf.) = 1.43, HFOV = 62.4 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 1.022 | Glass | 1.520 | 64.2 | — |
| 2 | | Plano | 1.685 | | | | |
| 3 | Lens 1 | −0.743 (ASP) | 0.247 | Plastic | 1.548 | 56.0 | −0.68 |
| 4 | | 0.836 (ASP) | 0.400 | | | | |
| 5 | Stop | Plano | 0.035 | | | | |
| 6 | Lens 2 | 1.291 (ASP) | 0.200 | Plastic | 1.548 | 56.0 | 2.30 |
| 7 | | −47.733 (ASP) | 0.057 | | | | |
| 8 | Ape. Stop | Plano | 0.131 | | | | |
| 9 | Lens 3 | 0.827 (ASP) | 0.430 | Plastic | 1.548 | 56.0 | 0.59 |
| 10 | | −0.430 (ASP) | −0.135 | | | | |
| 11 | Stop | Plano | 0.335 | | | | |
| 12 | Filter | Plano | 0.145 | Glass | 1.520 | 64.2 | — |
| 13 | | Plano | 0.355 | | | | |
| 14 | Image | Plano | — | | | | |

Note:
Reference wavelength is 525.0 nm.
The working distance is the axial distance (2.707 mm) between the imaged object O (Surface 0) and the object-side surface 1011 (Surface 3).
An effective radius of the stop 1001 (Surface 5) is 0.405 mm.
An effective radius of the stop 1002 (Surface 11) is 0.455 mm.

TABLE 20

Aspheric Coefficients

| Surface # | 3 | 4 | 6 | 7 | 9 | 10 |
|---|---|---|---|---|---|---|
| k = | −1.0000E+00 | −1.0000E+00 | 0.0000E+00 | 0.0000E+00 | −1.0000E+00 | −1.0000E+00 |
| A4 = | 4.2349E+00 | 1.3386E+00 | −5.7913E−02 | −1.0423E+00 | −3.2877E+00 | 2.0997E−01 |
| A6 = | −1.6147E+01 | 8.6908E+01 | −9.1915E+01 | 6.5842E+01 | 2.5440E+01 | −1.0679E+01 |
| A8 = | 4.4442E+01 | −1.3536E+03 | 1.4157E+03 | −4.7895E+03 | 2.1953E+02 | 5.1673E+02 |
| A10 = | −8.1779E+01 | 1.1032E+04 | −1.5983E+04 | 1.1530E+05 | −6.7624E+03 | −6.2954E+03 |
| A12 = | 9.7382E+01 | −4.8174E+04 | 1.1012E+05 | −1.3390E+06 | 6.2772E+04 | 3.6498E+04 |
| A14 = | −7.1673E+01 | 1.0311E+05 | −3.7551E+05 | 7.5359E+06 | −2.6348E+05 | −9.6480E+04 |
| A16 = | 2.9552E+01 | −8.4566E+04 | 4.8579E+05 | −1.5484E+07 | 4.1618E+05 | 8.6295E+04 |
| A18 = | −5.2063E+00 | — | — | — | — | — |

In the 10th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 0.34 | TL/EPD | 9.17 |
| Fno(work) | 1.47 | TL/f | 6.42 |
| Fno(inf.) | 1.43 | TOB + TL [mm] | 4.91 |
| HFOV [deg.] | 62.4 | (TOB + TL)/EPD | 20.45 |
| Nmax | 1.548 | TOB/TL | 1.23 |
| V2 | 56.0 | |(R1 + R2)/(R1 − R2)| | 0.06 |
| V3 | 56.0 | R1/EPD | −3.09 |
| V2 + V3 | 112.0 | (R3 + R4)/(R3 − R4) | −0.95 |
| V1 + V2 + V3 | 167.9 | R5/R6 | −1.92 |
| V1/N1 | 36.17 | f/EPD | 1.43 |
| V2/N2 | 36.17 | f/EPD + cot(HFOV) | 1.95 |
| V3/N3 | 36.17 | |f/f1| | 0.50 |
| ΣCT/ΣAT | 1.41 | |f/f2| | 0.15 |
| (CT2 + CT3)/T23 | 3.35 | |f/f3| | 0.58 |
| CT2/CT1 | 0.81 | f2/f3 | 3.91 |
| CT2/T23 | 1.06 | FOV [deg.] | 124.7 |
| CTS [mm] | 1.02 | Y11/TD | 0.70 |
| SL/TL | 0.57 | Y11/Y12 | 2.06 |
| T12/T23 | 2.31 | Y11/Y32 | 2.35 |
| TD/CTS | 1.47 | Yc11/Y11 | 0.42 |
| TL [mm] | 2.20 | YOB/ImgH | 8.20 |

11th Embodiment

Figure 31:
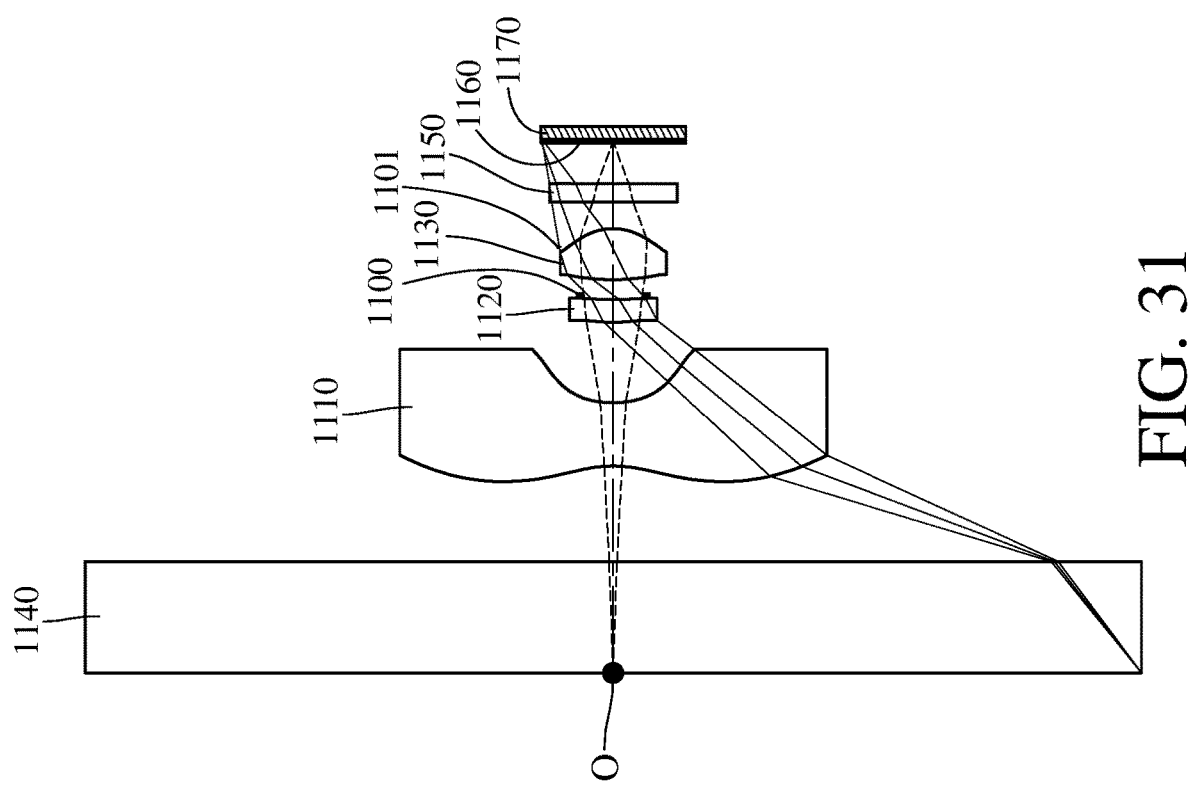
FIG. 31 is a schematic view of a fingerprint identification module and a light-permeable sheet according to the 11th embodiment of the present disclosure.
Figure 32:
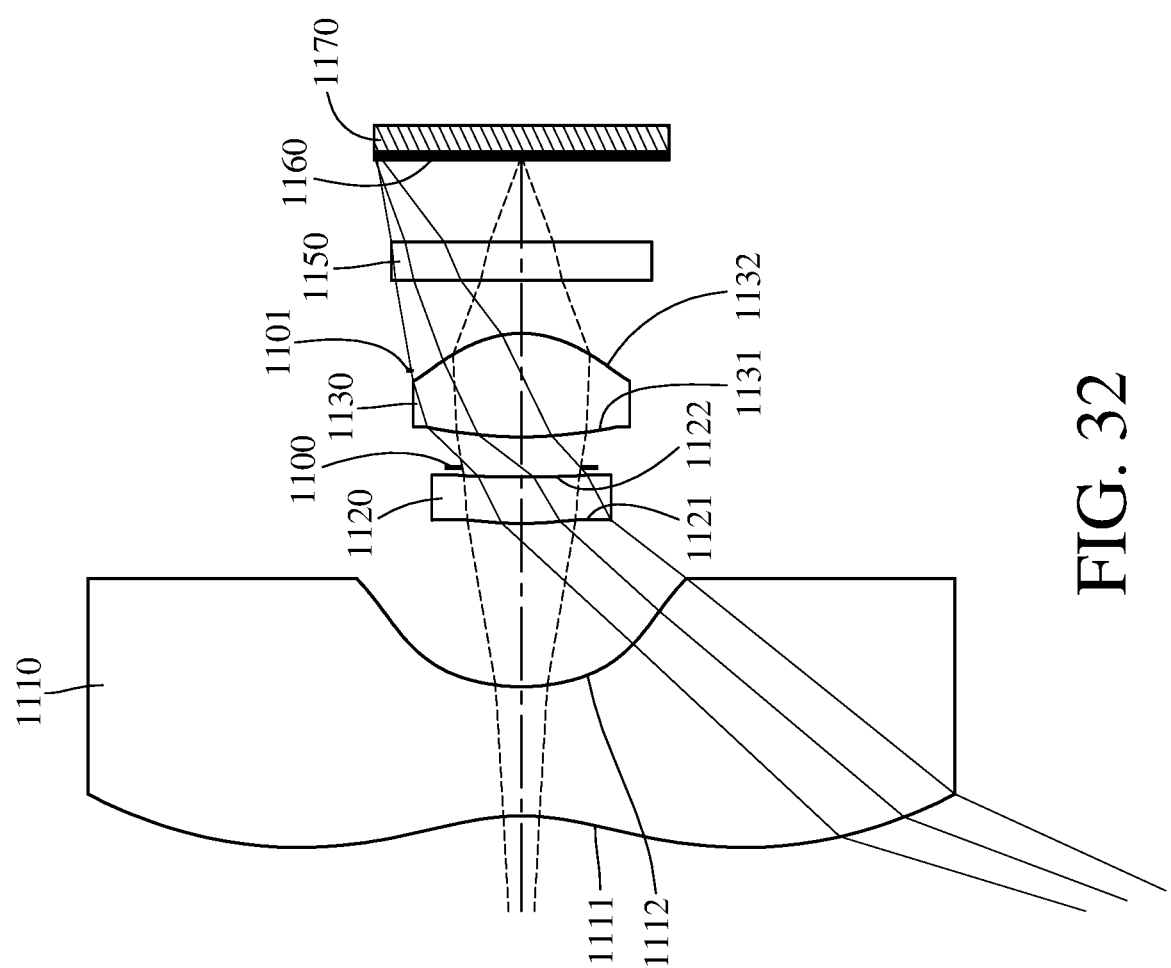
FIG. 32 is a schematic view of the fingerprint identification module in FIG. 31.
Figure 33:
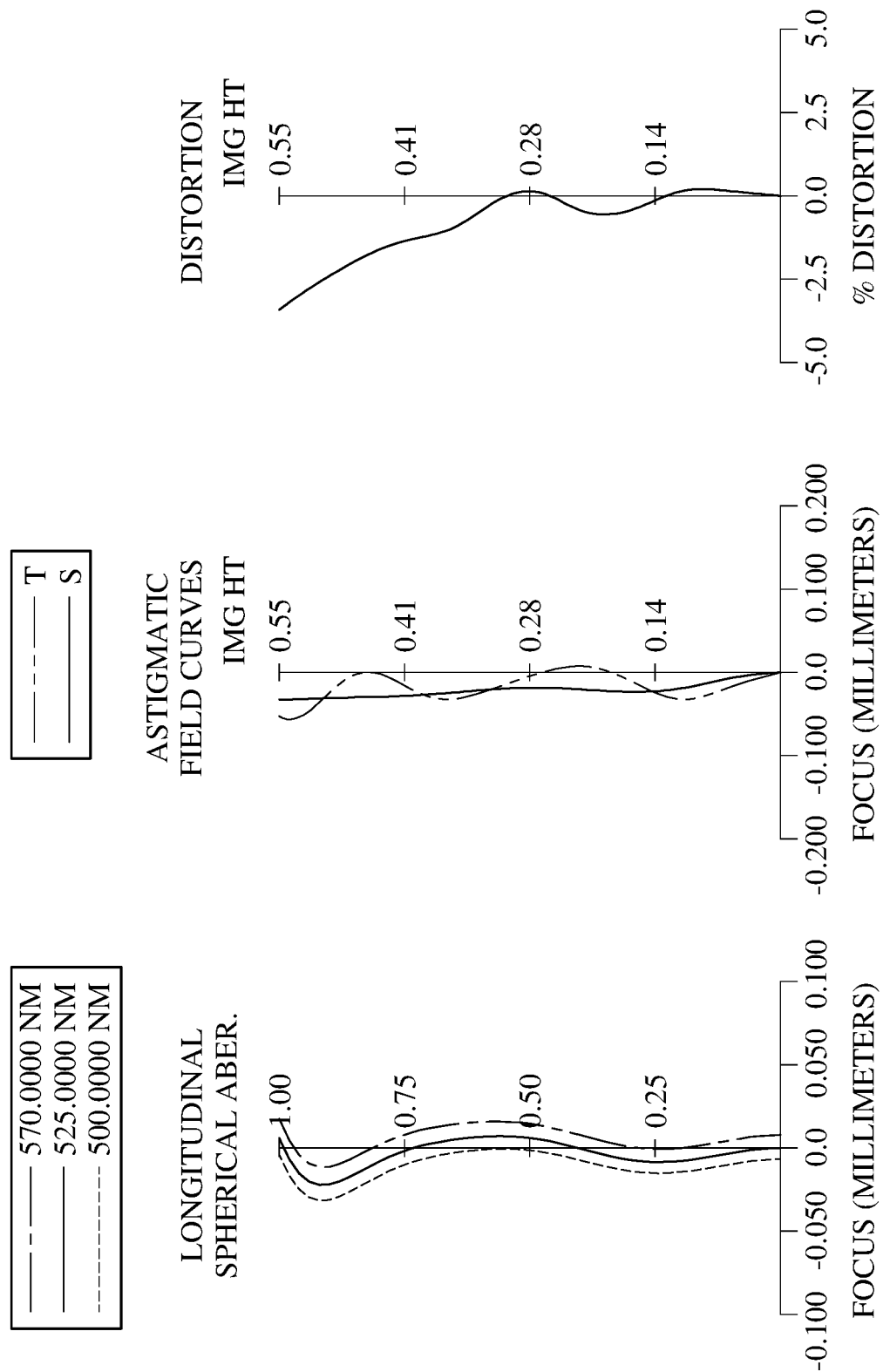
FIG. 33 shows spherical aberration curves, astigmatic field curves and a distortion curve of the fingerprint identification module according to the 11th embodiment.

FIG. 31 is a schematic view of a fingerprint identification module and a light-permeable sheet according to the 11th embodiment of the present disclosure. FIG. 32 is a schematic view of the fingerprint identification module in FIG. 31. FIG. 33 shows, in order from left to right, spherical aberration curves, astigmatic field curves and a distortion curve of the fingerprint identification module according to the 11th embodiment. In FIG. 31 and FIG. 32, the fingerprint identification module includes the optical photographing lens assembly (its reference numeral is omitted) of the present disclosure and an image sensor 1170. The optical photographing lens assembly includes, in order from an object side to an image side, a first lens element 1110, a second lens element 1120, an aperture stop 1100, a third lens element 1130, a stop 1101, a filter 1150 and an image surface 1160. The optical photographing lens assembly includes three lens elements (1110, 1120 and 1130) with no additional lens element disposed between each of the adjacent three lens elements.

The first lens element 1110 with negative refractive power has an object-side surface 1111 being concave in a paraxial region thereof and an image-side surface 1112 being concave in a paraxial region thereof. The first lens element 1110 is made of plastic material and has the object-side surface 1111 and the image-side surface 1112 being both aspheric. The object-side surface 1111 of the first lens element 1110 has one inflection point. The image-side surface 1112 of the first lens element 1110 has two inflection points. The object-side surface 1111 of the first lens element 1110 has one critical point in the off-axis region thereof.

The second lens element 1120 with positive refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric. The object-side surface 1121 of the second lens element 1120 has three inflection points. The image-side surface 1122 of the second lens element 1120 has three inflection points. The object-side surface 1121 of the second lens element 1120 has one critical point in an off-axis region thereof.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric. The image-side surface 1132 of the third lens element 1130 has one inflection point.

The light-permeable sheet 1140 is made of glass material and located between an imaged object O and the first lens element 1110, and will not affect the focal length of the optical photographing lens assembly. The filter 1150 is made of glass material and located between the third lens element 1130 and the image surface 1160, and will not affect the focal length of the optical photographing lens assembly. The image sensor 1170 is disposed on or near the image surface 1160 of the optical photographing lens assembly.

The detailed optical data of the 11th embodiment are shown in Table 21 and the aspheric surface data are shown in Table 22 below.

TABLE 21

11th Embodiment
f = 0.25 mm, Fno(work) = 1.35, Fno(inf.) = 1.31, HFOV = 69.4 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 0.852 | Glass | 1.520 | 64.2 | — |
| 2 | | Plano | 0.732 | | | | |
| 3 | Lens 1 | −0.901 (ASP) | 0.487 | Plastic | 1.548 | 56.0 | −0.64 |
| 4 | | 0.678 (ASP) | 0.616 | | | | |
| 5 | Lens 2 | 1.198 (ASP) | 0.175 | Plastic | 1.548 | 56.0 | 3.35 |
| 6 | | 3.266 (ASP) | 0.035 | | | | |
| 7 | Ape. Stop | Plano | 0.116 | | | | |
| 8 | Lens 3 | 1.157 (ASP) | 0.391 | Plastic | 1.649 | 23.5 | 0.52 |
| 9 | | −0.412 (ASP) | −0.140 | | | | |
| 10 | Stop | Plano | 0.340 | | | | |
| 11 | Filter | Plano | 0.145 | Glass | 1.520 | 64.2 | — |
| 12 | | Plano | 0.308 | | | | |
| 13 | Image | Plano | — | | | | |

Note:
Reference wavelength is 525.0 nm.
The working distance is the axial distance (1.584 mm) between the imaged object O (Surface 0) and the object-side surface 1111 (Surface 3).
An effective radius of the stop 1101 (Surface 10) is 0.415 mm.

TABLE 22

Aspheric Coefficients

| Surface # | 3 | 4 | 5 | 6 | 8 | 9 |
|---|---|---|---|---|---|---|
| k = | −1.0000E+00 | −1.0000E+00 | 0.0000E+00 | 0.0000E+00 | 0.0000E+00 | −1.0000E+00 |
| A4 = | 1.1637E+00 | −2.9683E+00 | −3.3823E+00 | −1.1955E+01 | −6.8061E+00 | −4.6712E+00 |
| A6 = | −1.5786E+00 | 6.7349E+01 | 1.4853E+02 | 2.0787E+03 | 2.3448E+02 | 4.3831E+02 |
| A8 = | 1.5205E+00 | −5.5342E+02 | −8.0382E+03 | −1.8684E+05 | −5.9947E+03 | −1.7364E+04 |
| A10 = | −9.8204E−01 | 2.7778E+03 | 2.0824E+05 | 9.4926E+06 | 9.6748E+04 | 3.8180E+05 |
| A12 = | 4.1347E−01 | −8.0557E+03 | −3.0672E+06 | −2.8699E+08 | −9.5947E+05 | −5.0362E+06 |
| A14 = | −1.0837E−01 | 1.1930E+04 | 2.5939E+07 | 5.2028E+09 | 5.7060E+06 | 4.0913E+07 |
| A16 = | 1.5983E−02 | −6.9191E+03 | −1.1581E+08 | −5.4818E+10 | −1.8587E+07 | −2.0087E+08 |
| A18 = | −1.0084E−03 | — | 2.0966E+08 | 3.0598E+11 | 2.5313E+07 | 5.4764E+08 |
| A20 = | — | — | — | −6.9217E+11 | — | −6.3728E+08 |

In the 11th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 0.25 | TL/EPD | 12.90 |
| Fno(work) | 1.35 | TL/f | 9.81 |
| Fno(inf.) | 1.31 | TOB + TL [mm] | 4.06 |
| HFOV [deg.] | 69.4 | (TOB + TL)/EPD | 21.15 |
| Nmax | 1.649 | TOB/TL | 0.64 |
| V2 | 56.0 | |(R1 + R2)/(R1 − R2)| | 0.14 |
| V3 | 23.5 | R1/EPD | −4.70 |
| V2 + V3 | 79.5 | (R3 + R4)/(R3 − R4) | −2.16 |
| V1 + V2 + V3 | 135.5 | R5/R6 | −2.81 |
| V1/N1 | 36.17 | f/EPD | 1.31 |
| V2/N2 | 36.17 | f/EPD + cot(HFOV) | 1.69 |
| V3/N3 | 14.25 | |f/f1| | 0.40 |
| ΣCT/ΣAT | 1.37 | |f/f2| | 0.08 |
| (CT2 + CT3)/T23 | 3.75 | |f/f3| | 0.49 |
| CT2/CT1 | 0.36 | f2/f3 | 6.46 |
| CT2/T23 | 1.16 | FOV [deg.] | 138.8 |
| CTS [mm] | 0.85 | Y11/TD | 0.90 |
| SL/TL | 0.47 | Y11/Y12 | 2.63 |
| T12/T23 | 4.08 | Y11/Y32 | 4.00 |
| TD/CTS | 2.14 | Yc11/Y11 | 0.51 |
| TL [mm] | 2.47 | YOB/ImgH | 7.35 |

12th Embodiment

Figure 34:
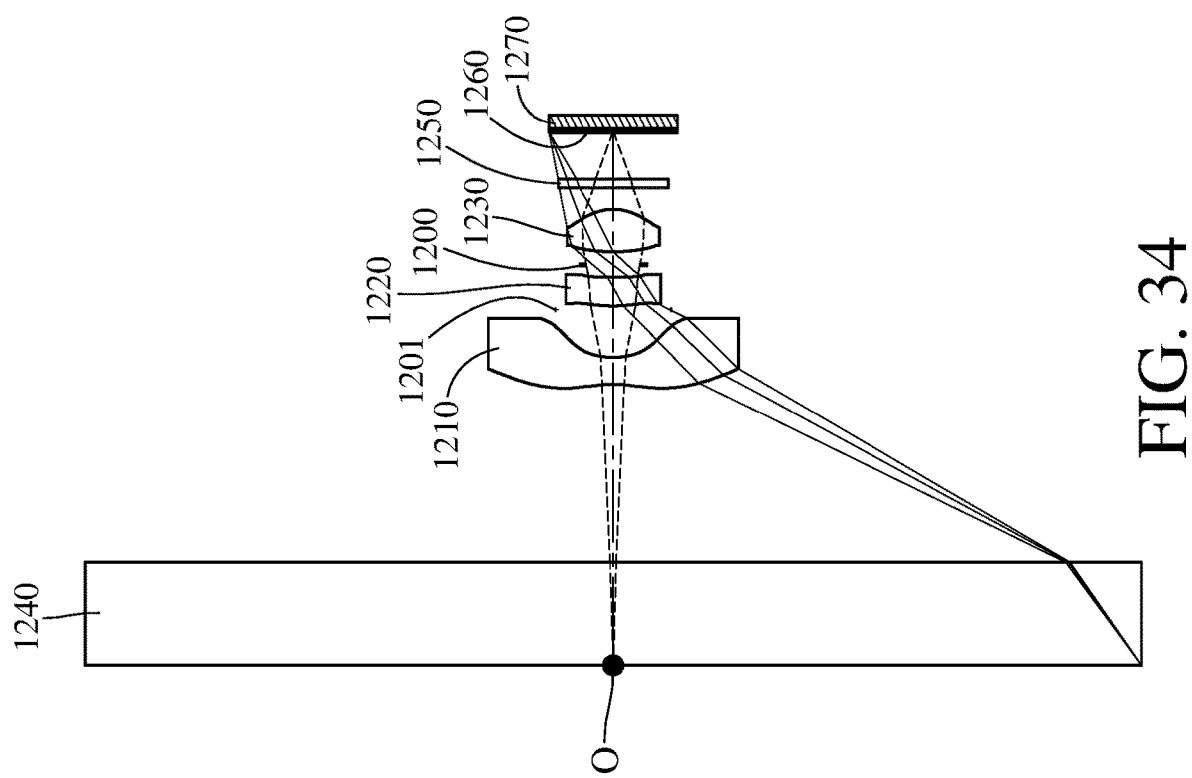
FIG. 34 is a schematic view of a fingerprint identification module and a light-permeable sheet according to the 12th embodiment of the present disclosure.
Figure 35:
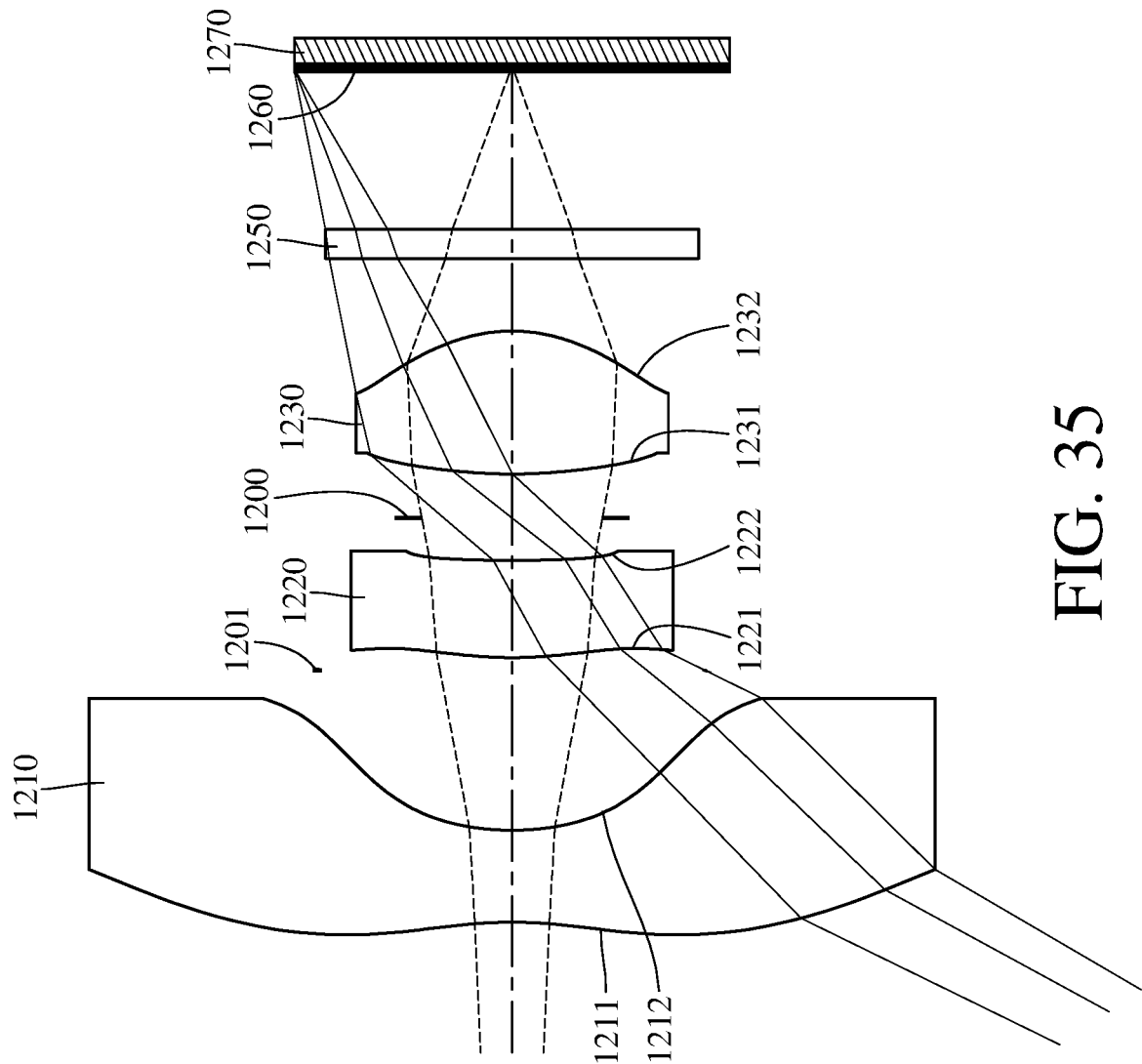
FIG. 35 is a schematic view of the fingerprint identification module in FIG. 34.
Figure 36:
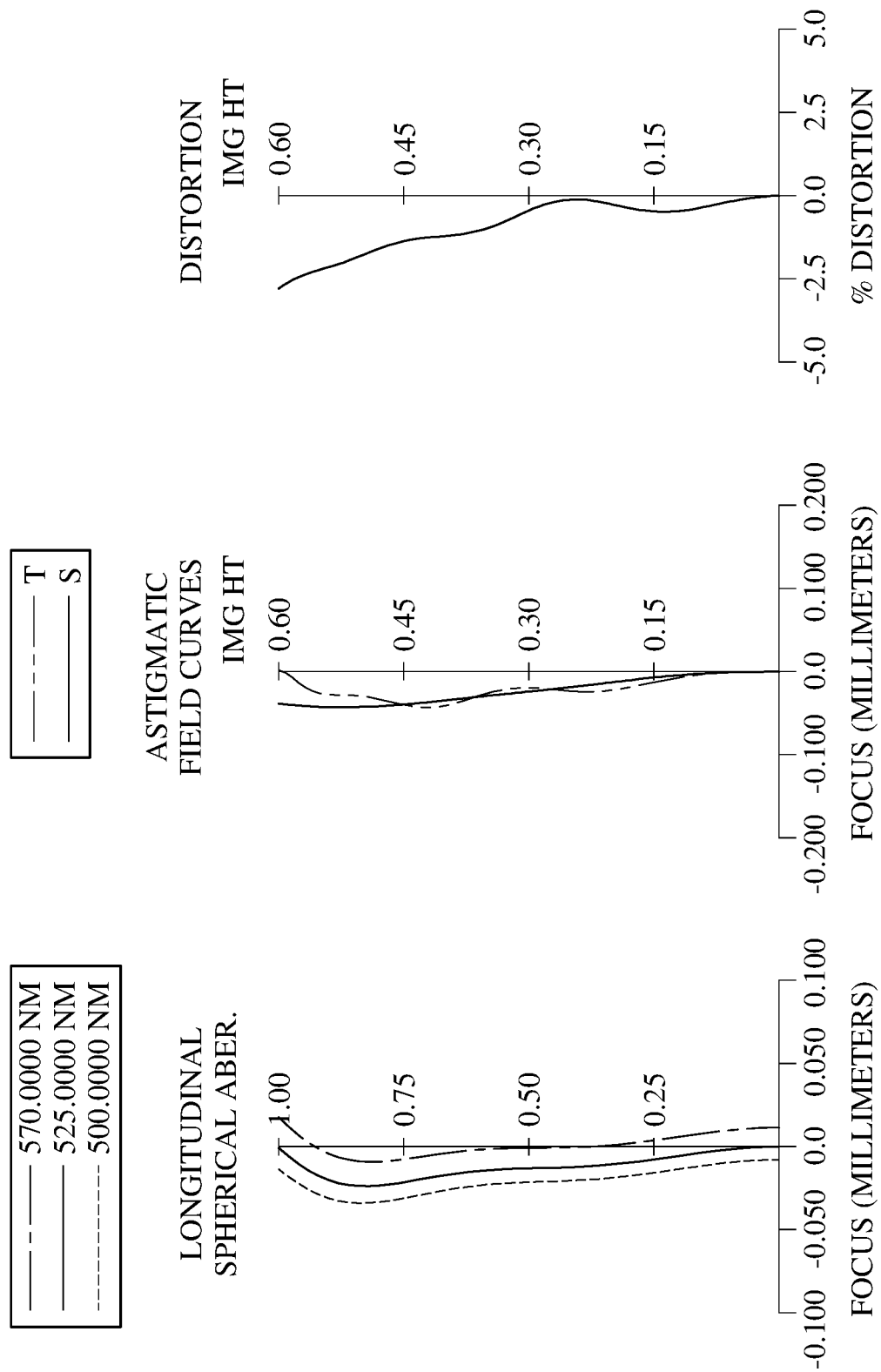
FIG. 36 shows spherical aberration curves, astigmatic field curves and a distortion curve of the fingerprint identification module according to the 12th embodiment.

FIG. 34 is a schematic view of a fingerprint identification module and a light-permeable sheet according to the 12th embodiment of the present disclosure. FIG. 35 is a schematic view of the fingerprint identification module in FIG. 34. FIG. 36 shows, in order from left to right, spherical aberration curves, astigmatic field curves and a distortion curve of the fingerprint identification module according to the 12th embodiment. In FIG. 34 and FIG. 35, the fingerprint identification module includes the optical photographing lens assembly (its reference numeral is omitted) of the present disclosure and an image sensor 1270. The optical photographing lens assembly includes, in order from an object side to an image side, a first lens element 1210, a stop 1201, a second lens element 1220, an aperture stop 1200, a third lens element 1230, a filter 1250 and an image surface 1260. The optical photographing lens assembly includes three lens elements (1210, 1220 and 1230) with no additional lens element disposed between each of the adjacent three lens elements.

The first lens element 1210 with negative refractive power has an object-side surface 1211 being concave in a paraxial region thereof and an image-side surface 1212 being concave in a paraxial region thereof. The first lens element 1210 is made of plastic material and has the object-side surface 1211 and the image-side surface 1212 being both aspheric. The object-side surface 1211 of the first lens element 1210 has three inflection points. The image-side surface 1212 of the first lens element 1210 has one inflection point. The object-side surface 1211 of the first lens element 1210 has one critical point in the off-axis region thereof.

The second lens element 1220 with positive refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric. The object-side surface 1221 of the second lens element 1220 has two inflection points. The object-side surface 1221 of the second lens element 1220 has one critical point in an off-axis region thereof.

The third lens element 1230 with positive refractive power has an object-side surface 1231 being convex in a paraxial region thereof and an image-side surface 1232 being convex in a paraxial region thereof. The third lens element 1230 is made of plastic material and has the object-side surface 1231 and the image-side surface 1232 being both aspheric. The image-side surface 1232 of the third lens element 1230 has one inflection point.

The light-permeable sheet 1240 is made of glass material and located between an imaged object O and the first lens element 1210, and will not affect the focal length of the optical photographing lens assembly. The filter 1250 is made of glass material and located between the third lens element 1230 and the image surface 1260, and will not affect the focal length of the optical photographing lens assembly. The image sensor 1270 is disposed on or near the image surface 1260 of the optical photographing lens assembly.

The detailed optical data of the 12th embodiment are shown in Table 23 and the aspheric surface data are shown in Table 24 below.

TABLE 23

12th Embodiment
f = 0.34 mm, Fno(work) = 1.41, Fno(inf.) = 1.37, HFOV = 61.4 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 0.960 | Glass | 1.520 | 64.2 | — |
| 2 | | Plano | 1.659 | | | | |
| 3 | Lens 1 | −1.108 (ASP) | 0.253 | Plastic | 1.548 | 56.0 | −1.0.78 |
| 4 | | 0.753 (ASP) | 0.441 | | | | |
| 5 | Stop | Plano | 0.035 | | | | |
| 6 | Lens 2 | 1.164 (ASP) | 0.268 | Plastic | 1.548 | 56.0 | 3.33 |
| 7 | | 2.954 (ASP) | 0.117 | | | | |
| 8 | Ape. Stop | Plano | 0.121 | | | | |
| 9 | Lens 3 | 1.321 (ASP) | 0.394 | Plastic | 1.649 | 23.5 | 0.57 |
| 10 | | −1.0.453 (ASP) | 0.200 | | | | |

TABLE 23-continued

12th Embodiment
f = 0.34 mm, Fno(work) = 1.41, Fno(inf.) = 1.37, HFOV = 61.4 deg.

| Surface # | | Curvature Radius | Thickness | Material | Index | Abbe # | Focal Length |
|---|---|---|---|---|---|---|---|
| 11 | Filter | Plano | 0.080 | Glass | 1.520 | 64.2 | — |
| 12 | | Plano | 0.434 | | | | |
| 13 | Image | Plano | — | | | | |

Note:
Reference wavelength is 525.0 nm.
The working distance is the axial distance (2.619 mm) between the imaged object O (Surface 0) and the object-side surface 1211 (Surface 3).
An effective radius of the stop 1201 (Surface 5) is 0.530 mm.
An effective radius of the image-side surface 1232 (Surface 10) is 0.430 mm.

TABLE 24

Aspheric Coefficients

| Surface # | 3 | 4 | 6 | 7 | 9 | 10 |
|---|---|---|---|---|---|---|
| k = | −1.0000E+00 | −1.0000E+00 | 0.0000E+00 | 0.0000E+00 | −1.0000E+00 | −1.0000E+00 |
| A4 = | 2.2071E+00 | 1.7067E+00 | −1.2550E+00 | −6.2379E+00 | −2.1340E+00 | 7.7292E−01 |
| A6 = | −5.9720E+00 | −2.3510E+00 | −2.4822E+01 | 4.3225E+02 | 3.4273E+01 | −1.7498E+01 |
| A8 = | 1.1998E+01 | 8.9508E+01 | 5.3887E+02 | −1.4710E+04 | −3.2322E+02 | 2.8600E+02 |
| A10 = | −1.6527E+01 | −7.1964E+02 | −6.5365E+03 | 2.7947E+05 | 7.1896E+02 | −1.6408E+03 |
| A12 = | 1.4852E+01 | 2.1213E+03 | 4.1365E+04 | −2.7620E+06 | 1.5895E+04 | −8.4201E+02 |
| A14 = | −8.2347E+00 | −2.7868E+03 | −1.2704E+05 | 1.2111E+07 | −1.2524E+05 | 4.1412E+04 |
| A16 = | 2.5358E+00 | 1.3890E+03 | 1.5143E+05 | −1.0420E+07 | 2.7327E+05 | −9.9269E+04 |
| A18 = | −3.2957E−01 | — | — | — | — | — |

In the 12th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 0.34 | TL/EPD | 9.37 |
| Fno(work) | 1.41 | TL/f | 6.84 |
| Fno(inf.) | 1.37 | TOB + TL [mm] | 4.96 |
| HFOV [deg.] | 61.4 | (TOB + TL)/EPD | 19.85 |
| Nmax | 1.649 | TOB/TL | 1.12 |
| V2 | 56.0 | |(R1 + R2)/(R1 − R2)| | 0.19 |
| V3 | 23.5 | R1/EPD | −4.43 |
| V2 + V3 | 79.5 | (R3 + R4)/(R3 − R4) | −2.30 |
| V1 + V2 + V3 | 135.5 | R5/R6 | −2.92 |
| V1/N1 | 36.17 | f/EPD | 1.37 |
| V2/N2 | 36.17 | f/EPD + cot(HFOV) | 1.91 |
| V3/N3 | 14.25 | |f/f1| | 0.44 |
| ΣCT/ΣAT | 1.28 | |f/f2| | 0.10 |
| (CT2 + CT3)/T23 | 2.78 | |f/f3| | 0.60 |
| CT2/CT1 | 1.06 | f2/f3 | 5.85 |
| CT2/T23 | 1.13 | FOV [deg.] | 122.8 |
| CTS [mm] | 0.96 | Y11/TD | 0.72 |
| SL/TL | 0.52 | Y11/Y12 | 1.69 |
| T12/T23 | 2.00 | Y11/Y32 | 2.71 |
| TD/CTS | 1.70 | Yc11/Y11 | 0.39 |
| TL [mm] | 2.34 | YOB/ImgH | 8.24 |

13th Embodiment

Figure 37:
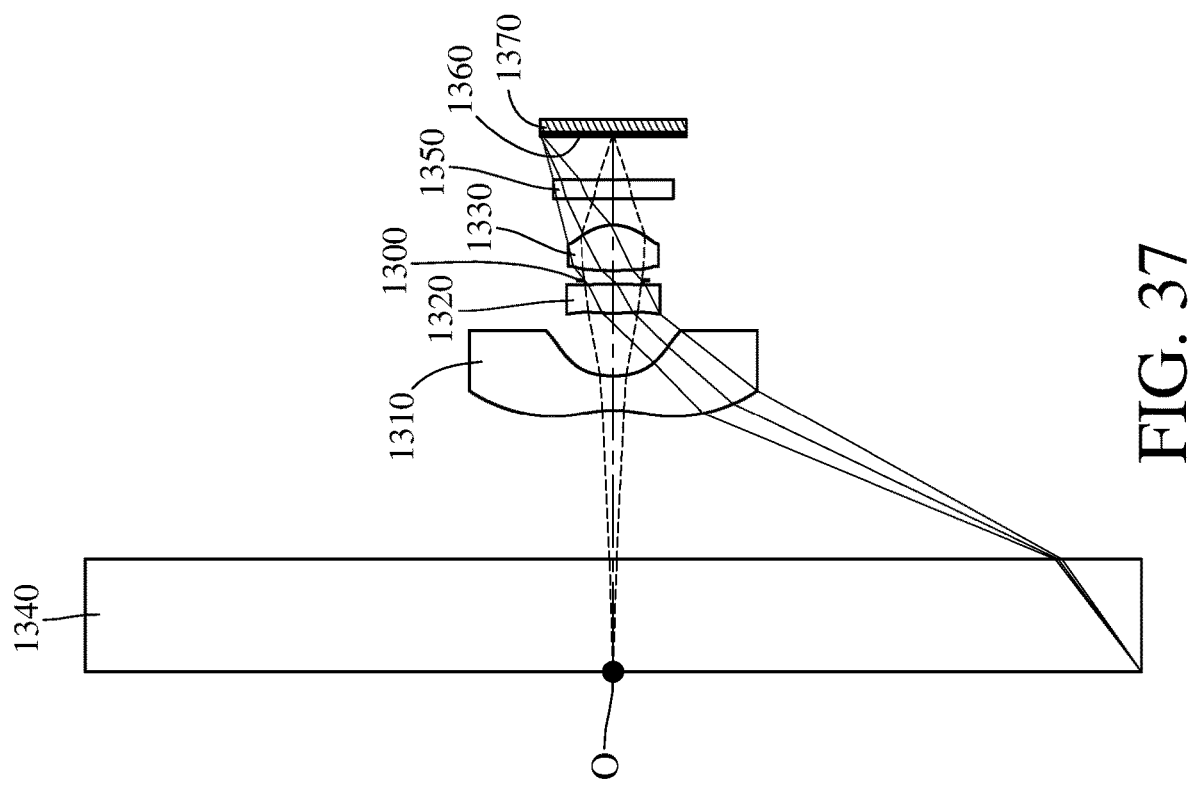
FIG. 37 is a schematic view of a fingerprint identification module and a light-permeable sheet according to the 13th embodiment of the present disclosure.
Figure 38:
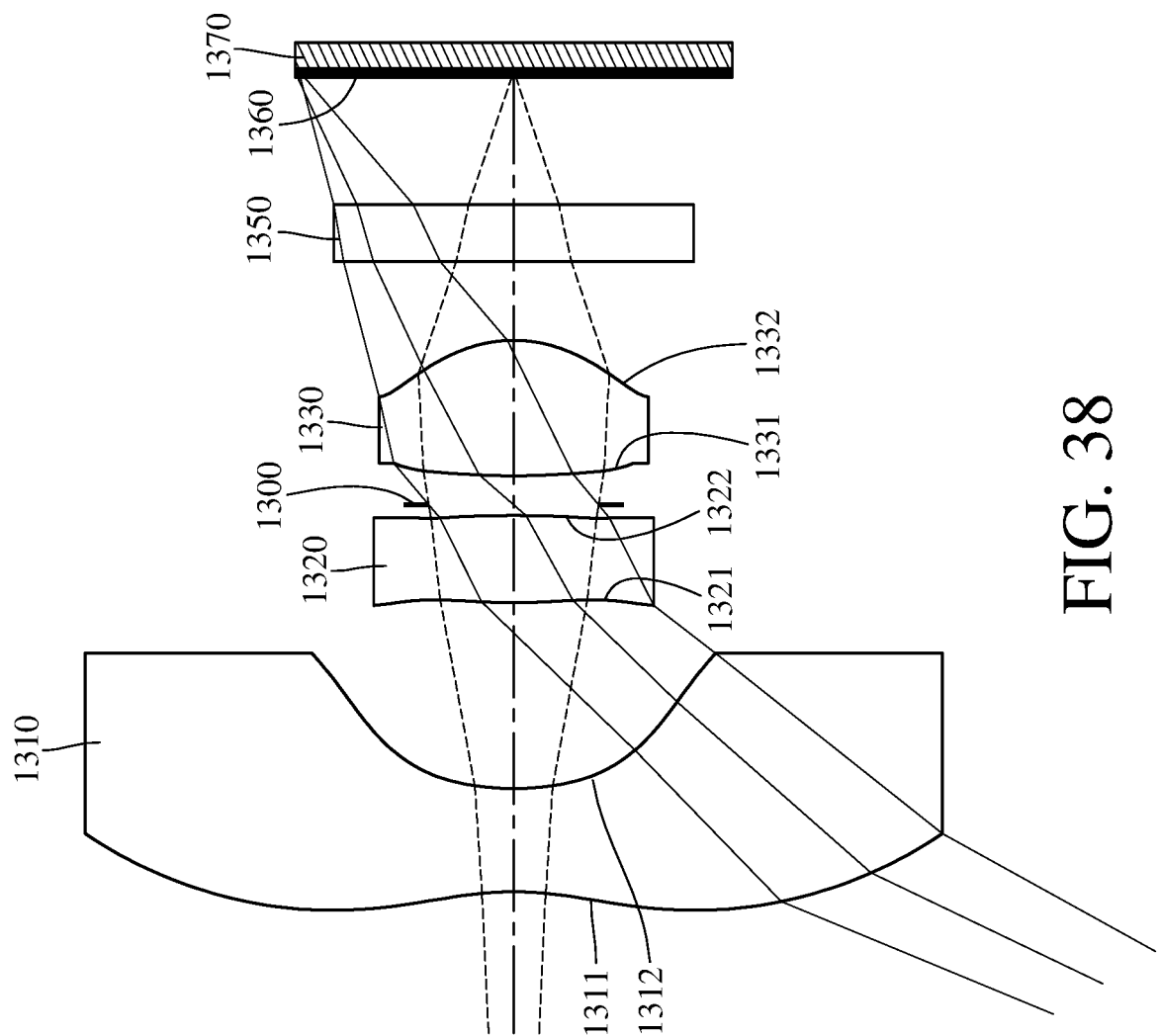
FIG. 38 is a schematic view of the fingerprint identification module in FIG. 37.
Figure 39:
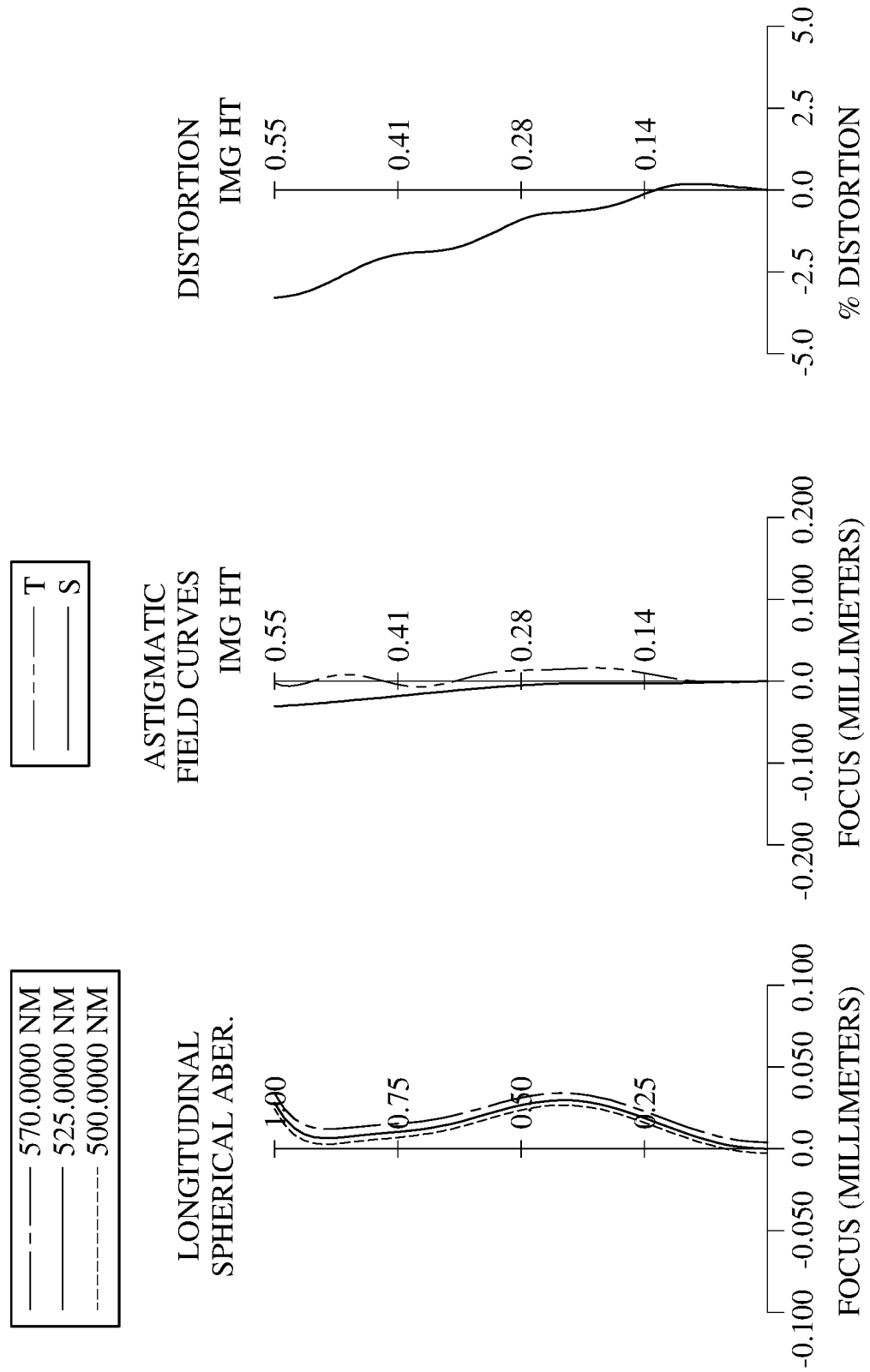
FIG. 39 shows spherical aberration curves, astigmatic field curves and a distortion curve of the fingerprint identification module according to the 13th embodiment.

FIG. 37 is a schematic view of a fingerprint identification module and a light-permeable sheet according to the 13th embodiment of the present disclosure. FIG. 38 is a schematic view of the fingerprint identification module in FIG. 37. FIG. 39 shows, in order from left to right, spherical aberration curves, astigmatic field curves and a distortion curve of the fingerprint identification module according to the 13th embodiment. In FIG. 37 and FIG. 38, the fingerprint identification module includes the optical photographing lens assembly (its reference numeral is omitted) of the present disclosure and an image sensor 1370. The optical photographing lens assembly includes, in order from an object side to an image side, a first lens element 1310, a second lens element 1320, an aperture stop 1300, a third lens element 1330, a filter 1350 and an image surface 1360. The optical photographing lens assembly includes three lens elements (1310, 1320 and 1330) with no additional lens element disposed between each of the adjacent three lens elements.

The first lens element 1310 with negative refractive power has an object-side surface 1311 being concave in a paraxial region thereof and an image-side surface 1312 being concave in a paraxial region thereof. The first lens element 1310 is made of plastic material and has the object-side surface 1311 and the image-side surface 1312 being both aspheric. The object-side surface 1311 of the first lens element 1310 has one inflection point. The image-side surface 1312 of the first lens element 1310 has two inflection points. The object-side surface 1311 of the first lens element 1310 has one critical point in the off-axis region thereof.

The second lens element 1320 with positive refractive power has an object-side surface 1321 being convex in a paraxial region thereof and an image-side surface 1322 being convex in a paraxial region thereof. The second lens element 1320 is made of plastic material and has the object-side surface 1321 and the image-side surface 1322 being both aspheric. The object-side surface 1321 of the second lens element 1320 has three inflection points. The image-side surface 1322 of the second lens element 1320 has two inflection points. The object-side surface 1321 of the second lens element 1320 has one critical point in an off-axis region thereof. The image-side surface 1322 of the second lens element 1320 has one critical point in an off-axis region thereof.

The third lens element 1330 with positive refractive power has an object-side surface 1331 being convex in a paraxial region thereof and an image-side surface 1332 being convex in a paraxial region thereof. The third lens element 1330 is made of plastic material and has the object-side surface 1331 and the image-side surface 1332 being both aspheric. The image-side surface 1332 of the third lens element 1330 has one inflection point.

The light-permeable sheet 1340 is made of glass material and located between an imaged object O and the first lens element 1310, and will not affect the focal length of the optical photographing lens assembly. The filter 1350 is made of glass material and located between the third lens element 1330 and the image surface 1360, and will not affect the focal length of the optical photographing lens assembly. The image sensor 1370 is disposed on or near the image surface 1360 of the optical photographing lens assembly.

The detailed optical data of the 13th embodiment are shown in Table 25 and the aspheric surface data are shown in Table 26 below.

In the 13th embodiment, the equation of the aspheric surface profiles of the aforementioned lens elements is the same as the equation of the 1st embodiment. Also, the definitions of these parameters shown in the following table are the same as those stated in the 1st embodiments with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 0.29 | TL/EPD | 10.20 |
| Fno(work) | 1.47 | TL/f | 7.21 |
| Fno(inf.) | 1.41 | TOB + TL [mm] | 4.06 |
| HFOV [deg.] | 64.4 | (TOB + TL)/EPD | 19.95 |
| Nmax | 1.548 | TOB/TL | 0.96 |
| V2 | 56.0 | |(R1 + R2)/(R1 − R2)| | 0.05 |
| V3 | 56.0 | R1/EPD | −3.81 |
| V2 + V3 | 112.0 | (R3 + R4)/(R3 − R4) | −0.41 |
| V1 + V2 + V3 | 167.9 | R5/R6 | −4.32 |
| V1/N1 | 36.17 | f/EPD | 1.41 |
| V2/N2 | 36.17 | f/EPD + cot(HFOV) | 1.89 |
| V3/N3 | 36.17 | |f/f1| | 0.45 |
| ΣCT/ΣAT | 1.45 | |f/f2| | 0.16 |
| (CT2 + CT3)/T23 | 5.61 | |f/f3| | 0.54 |

TABLE 25

13th Embodiment
f = 0.29 mm, Fno(work) = 1.47, Fno(inf.) = 1.41, HFOV = 64.4 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Sheet | Plano | 0.852 | Glass | 1.520 | 64.2 | — |
| 2 | | Plano | 1.131 | | | | |
| 3 | Lens 1 | −0.775 (ASP) | 0.263 | Plastic | 1.548 | 56.0 | −0.63 |
| 4 | | 0.706 (ASP) | 0.473 | | | | |
| 5 | Lens 2 | 1.358 (ASP) | 0.222 | Plastic | 1.548 | 56.0 | 1.78 |
| 6 | | −3.262 (ASP) | 0.027 | | | | |
| 7 | Ape. Stop | Plano | 0.074 | | | | |
| 8 | Lens 3 | 1.457 (ASP) | 0.345 | Plastic | 1.548 | 56.0 | 0.54 |
| 9 | | −0.337 (ASP) | 0.200 | | | | |
| 10 | Filter | Plano | 0.145 | Glass | 1.520 | 64.2 | — |
| 11 | | Plano | 0.325 | | | | |
| 12 | Image | Plano | — | | | | |

Note:
Reference wavelength is 525.0 nm.
The working distance is the axial distance (1.983 mm) between the imaged object O (Surface 0) and the object-side surface 1311 (Surface 3).

TABLE 26

Aspheric Coefficients

| Surface # | 3 | 4 | 5 | 6 | 8 | 9 |
|---|---|---|---|---|---|---|
| k = | −1.0000E+00 | −1.0000E+00 | 0.0000E+00 | 0.0000E+00 | 0.0000E+00 | −1.0000E+00 |
| A4 = | 3.5956E+00 | −9.9150E−02 | −9.3832E+00 | 1.3708E+00 | −7.8436E+00 | 8.0783E−01 |
| A6 = | −1.1837E+01 | 1.1373E+02 | 4.2783E+02 | −2.3325E+02 | 3.3418E+02 | 3.3890E+01 |
| A8 = | 2.7683E+01 | −1.6292E+03 | −1.6897E+04 | −3.3407E+03 | −1.0689E+04 | −5.6718E+03 |
| A10 = | −4.3084E+01 | 1.2967E+04 | 3.6144E+05 | 1.1602E+06 | 2.1030E+05 | 2.7205E+05 |
| A12 = | 4.3319E+01 | −5.7509E+04 | −4.4581E+06 | −5.4397E+07 | −2.2201E+06 | −6.5802E+06 |
| A14 = | −2.6899E+01 | 1.2785E+05 | 3.1864E+07 | 1.1464E+09 | 1.1687E+07 | 9.1648E+07 |
| A16 = | 9.3462E+00 | −1.1017E+05 | −1.2189E+08 | −1.1430E+10 | −2.2099E+07 | −7.4663E+08 |
| A18 = | −1.3849E+00 | — | 1.9196E+08 | 4.3506E+10 | −1.5359E+07 | 3.3258E+09 |
| A20 = | — | — | — | — | — | −6.2639E+09 |

-continued

13th Embodiment

| | | | |
|---|---|---|---|
| CT2/CT1 | 0.84 | f2/f3 | 3.32 |
| CT2/T23 | 2.20 | FOV [deg.] | 128.8 |
| CTS [mm] | 0.85 | Y11/TD | 0.78 |
| SL/TL | 0.53 | Y11/Y12 | 2.12 |
| T12/T23 | 4.68 | Y11/Y32 | 3.18 |
| TD/CTS | 1.65 | Yc11/Y11 | 0.42 |
| TL [mm] | 2.07 | YOB/ImgH | 7.27 |

14th Embodiment

Figure 40:
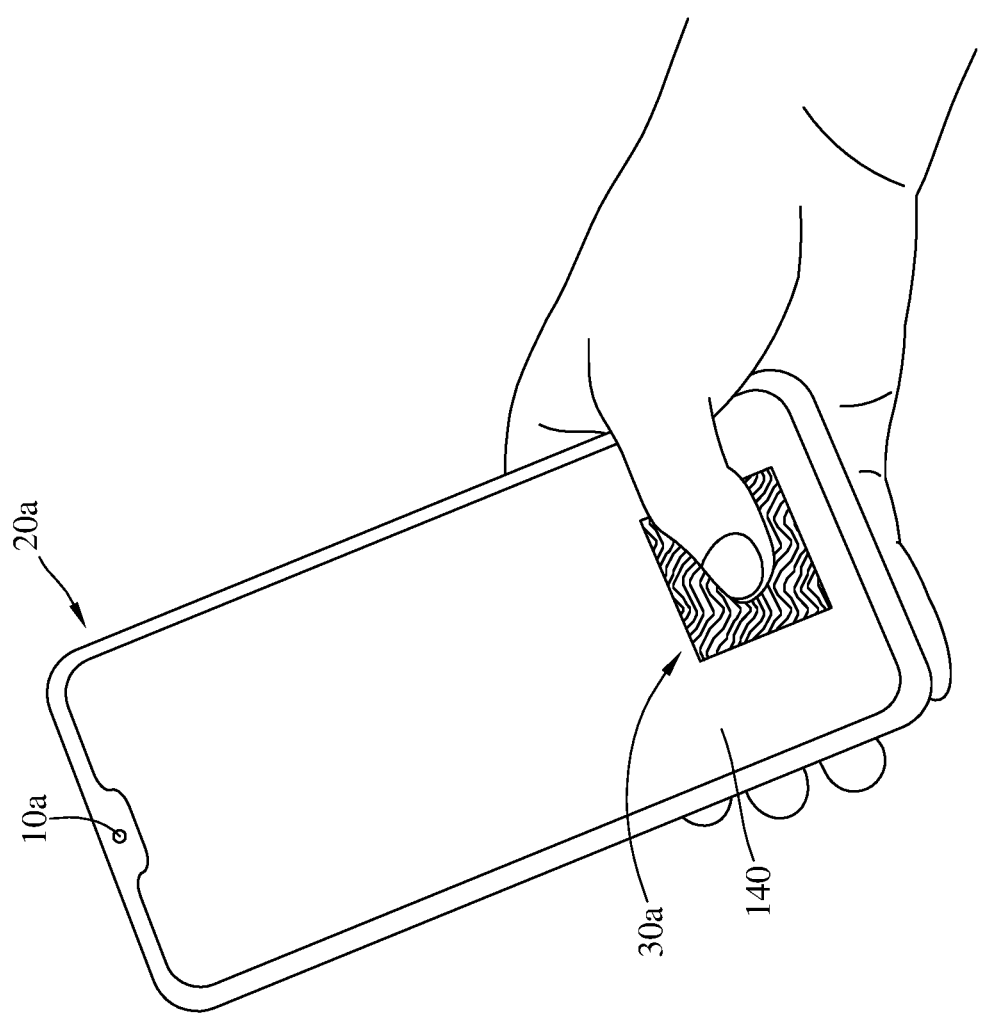
FIG. 40 is a schematic view of an electronic device according to the 14th embodiment of the present disclosure.
Figure 41:
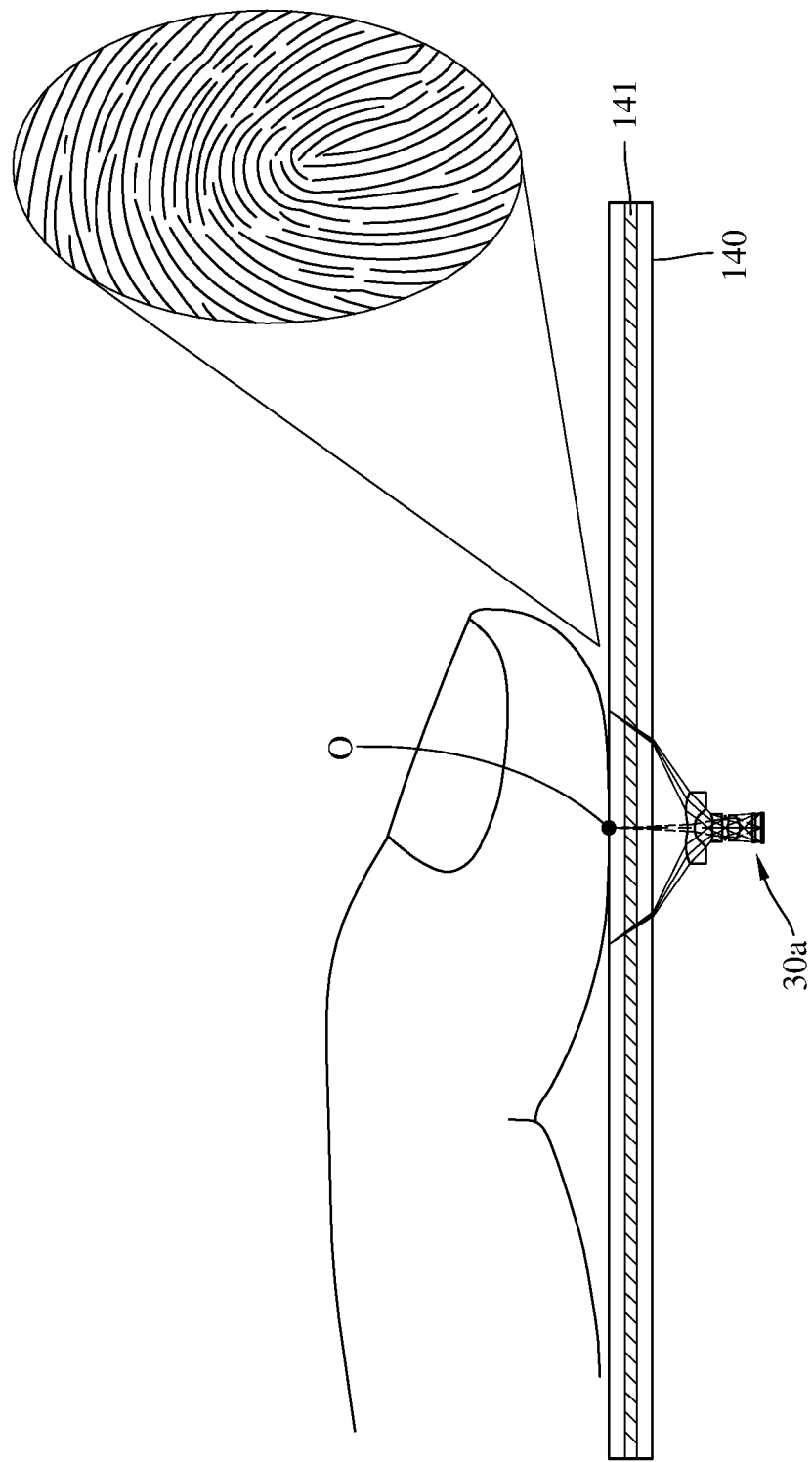
FIG. 41 is a schematic view of the electronic device in FIG. 40 identifying a fingerprint.

FIG. 40 is a schematic view of an electronic device according to the 14th embodiment of the present disclosure. FIG. 41 is a schematic view of the electronic device in FIG. 40 identifying a fingerprint.

In this embodiment, an electronic device 20a is a smartphone having a biometric identification function. The electronic device 20a includes an image capturing unit 10a, a fingerprint identification module 30a and the light-permeable sheet 140 disclosed in the 1st embodiment. The image capturing unit 10a is a front-facing camera of the electronic device 20a for taking selfies, and the image capturing unit 10a includes the optical photographing lens assembly of the present disclosure and an image sensor. The fingerprint identification module 30a has a fingerprint identification function, and the fingerprint identification module 30a includes the optical photographing lens assembly disclosed in the 1st embodiment and an image sensor. In this embodiment, each of the image capturing units 10a and the fingerprint identification module 30a includes the optical photographing lens assembly of the present disclosure, but the present disclosure is not limited thereto. For example, in some configurations, only one of the image capturing units 10a and the fingerprint identification module 30a includes the optical photographing lens assembly of the present disclosure.

The light-permeable sheet 140 includes a display layer 141 which can provide protection and minimize the use of additional components. Light rays can travel through the light-permeable sheet 140 and the display layer 141 into the optical photographing lens assembly of the fingerprint identification module 30a for wider applications. The display layer 141 has a touch-screen function, such that there is no need of additional input devices, and it's favorable for making the operation more intuitive. Furthermore, the display layer 141 may be an OLED display layer or an active-matrix organic light-emitting diode (AMOLED) display layer, such that the display layer 141 can be a light source for illuminating the imaged object O, thereby saving additional light sources.

15th Embodiment

Figure 42:
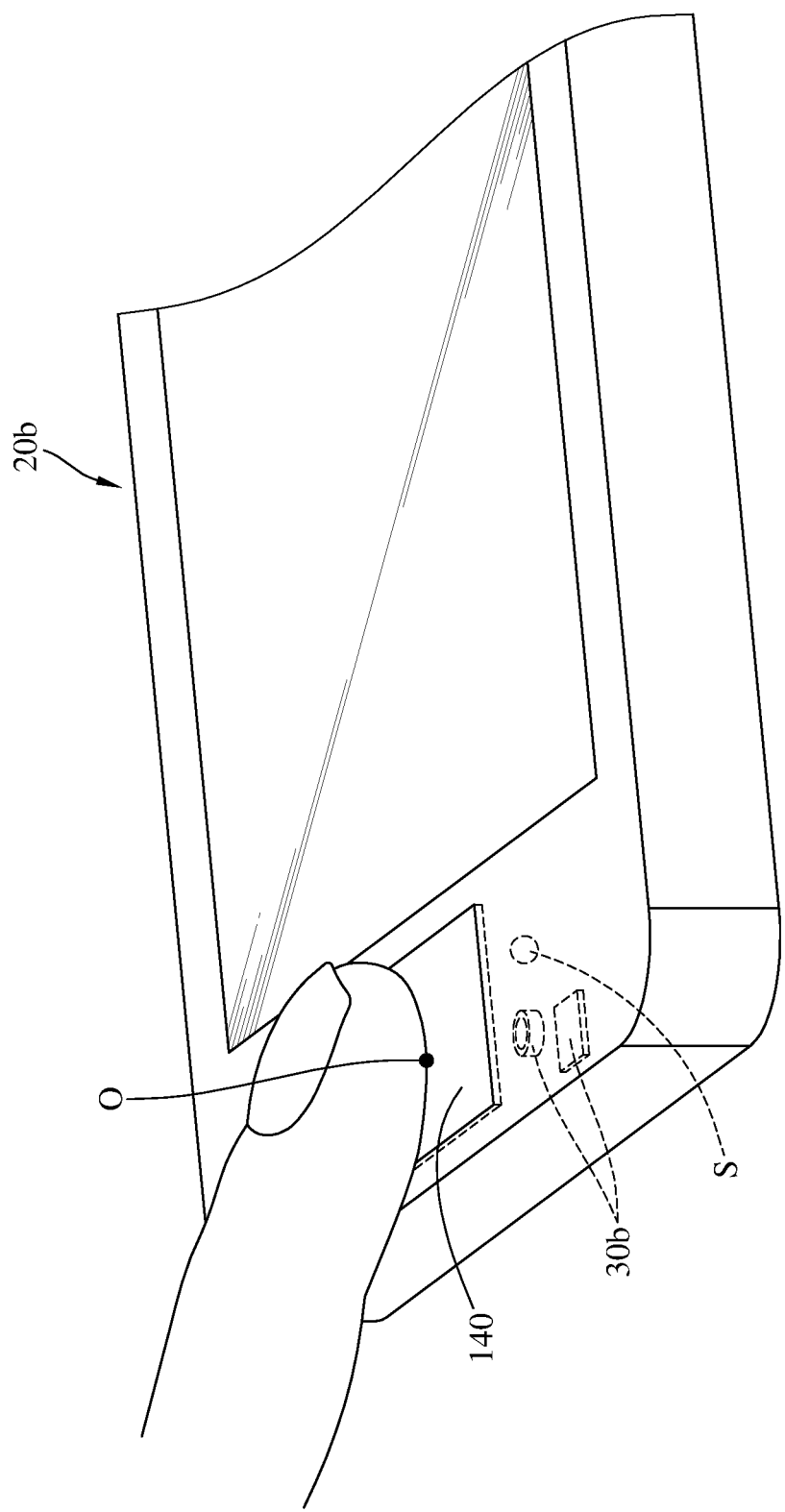
FIG. 42 is a schematic view of an electronic device according to the 15th embodiment of the present disclosure.
Figure 43:
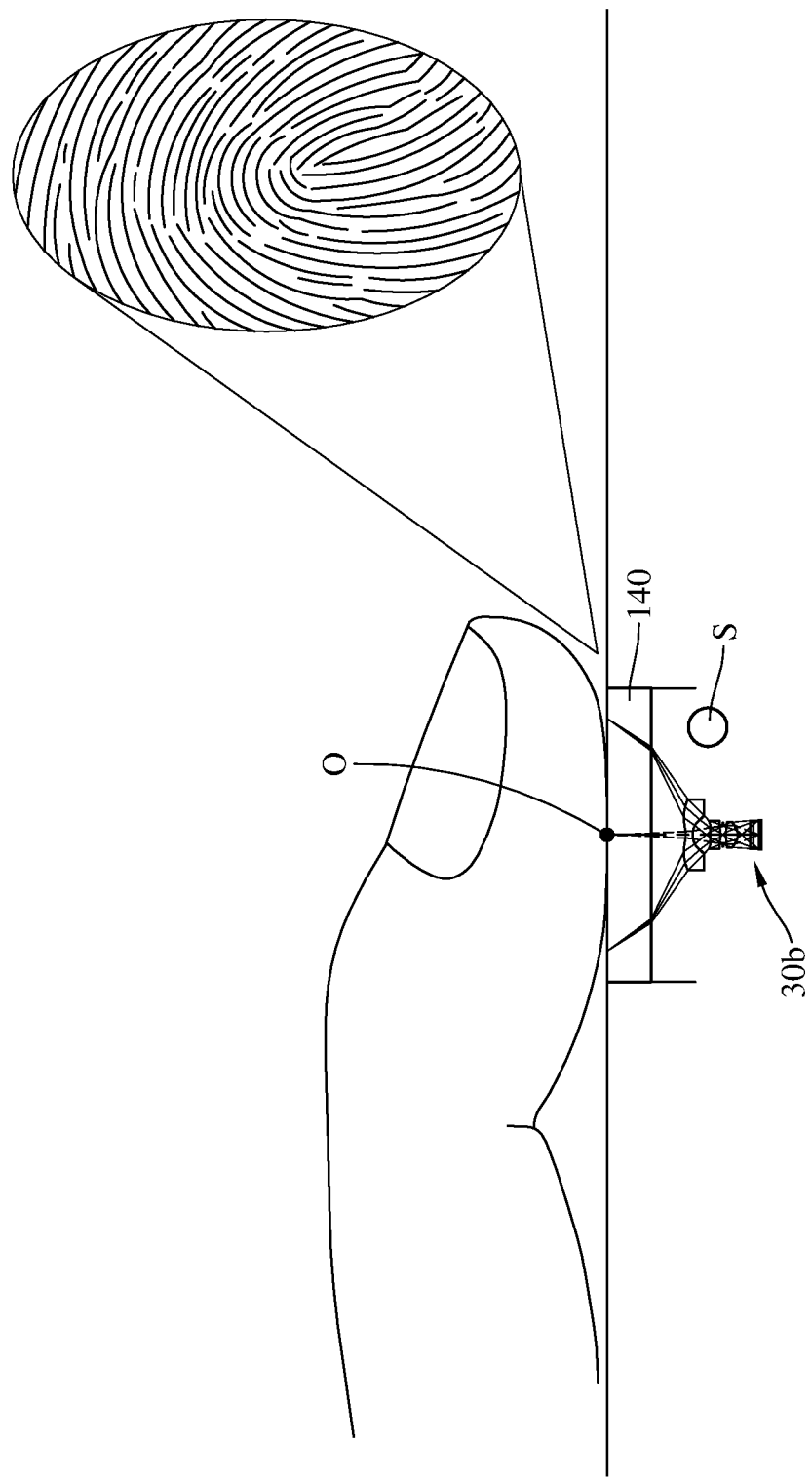
FIG. 43 is a schematic view of the electronic device in FIG. 42 identifying a fingerprint.

FIG. 42 is a schematic view of an electronic device according to the 15th embodiment of the present disclosure. FIG. 43 is a schematic view of the electronic device in FIG. 42 identifying a fingerprint.

In this embodiment, an electronic device 20b is a smartphone having a biometric identification function. The electronic device 20b includes a fingerprint identification module 30b, a light source S and the light-permeable sheet 140 disclosed in the 1st embodiment. The fingerprint identification module 30b has a fingerprint identification function, and the fingerprint identification module 30b includes the optical photographing lens assembly disclosed in the 1st embodiment and an image sensor. The light source S is disposed on one side of the optical photographing lens assembly for illuminating the imaged object O, such that light rays from the imaged object O can travel through the light-permeable sheet 140 into the optical photographing lens assembly of the fingerprint identification module 30b. In this embodiment, the fingerprint identification module 30b is the fingerprint identification module disclosed in the 1st embodiment, but the present disclosure is not limited thereto.

According to the present disclosure, the optical photographing lens assembly of the fingerprint identification module 30a and 30b features good capability in aberration corrections and high image quality, and the fingerprint identification module 30a and 30b can be applied to smartphones for under-display fingerprint identification, but the present disclosure is not limited thereto. For example, the fingerprint identification module 30a and 30b can be applied to electronic devices such as digital tablets, portable image-recording devices and multi-camera devices.

The optical photographing lens assembly of the present disclosure can be applied to biometric identification and 3D (three-dimensional) image capturing applications, in products such as digital cameras, mobile devices, digital tablets, smart televisions, network surveillance devices, dashboard cameras, vehicle backup cameras, multi-camera devices, motion sensing input devices, wearable devices and other electronic imaging devices.

The foregoing description, for the purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising three lens elements, the three lens elements being, in order from an object side to an image side, a first lens element, a second lens element and a third lens element; each of the three lens elements having an object-side surface facing toward the object side and an image-side surface facing toward the image side;

wherein the object-side surface of the first lens element is concave in a paraxial region thereof, the object-side surface of the first lens element is aspheric and has at least one inflection point, the object-side surface of the first lens element has at least one critical point in an off-axis region thereof, the object-side surface of the second lens element is convex in a paraxial region thereof, the optical photographing lens assembly has a total of three lens elements, and the optical photographing lens assembly further comprises an aperture stop disposed between the second lens element and the third lens element;

wherein a focal length of the optical photographing lens assembly is f, an entrance pupil diameter of the optical photographing lens assembly is EPD, an Abbe number of the first lens element is V1, an Abbe number of the second lens element is V2, an Abbe number of the third lens element is V3, and the following conditions are satisfied:

$0.50 < f/EPD < 1.9$; and $110.0 < V1+V2+V3 < 200.0$.

2. The optical photographing lens assembly of claim 1, wherein the focal length of the optical photographing lens assembly is f, the entrance pupil diameter of the optical photographing lens assembly is EPD, the Abbe number of the first lens element is V1, the Abbe number of the second lens element is V2, the Abbe number of the third lens element is V3, and the following conditions are satisfied:

$0.80 < f/EPD < 1.7$; and $120.0 < V1+V2+V3 < 180.0$.

3. The optical photographing lens assembly of claim 1, wherein a central thickness of the second lens element is CT2, a central thickness of the third lens element is CT3, an axial distance between the second lens element and the third lens element is T23, the focal length of the optical photographing lens assembly is f, a focal length of the first lens element is f1, a focal length of the second lens element is f2, a focal length of the third lens element is f3, and the following conditions are satisfied:

$0 < (CT2+CT3)/T23 < 7.2$;

$|f/f1| < 0.80$;

$|f/f2| < 0.80$; and $|f/f3| < 0.80$.

4. The optical photographing lens assembly of claim 1, wherein an axial distance between the object-side surface of the first lens element and an image surface is TL, the entrance pupil diameter of the optical photographing lens assembly is EPD, a maximum field of view of the optical photographing lens assembly is FOV, a maximum effective radius of the object-side surface of the first lens element is Y11, a maximum effective radius of the image-side surface of the first lens element is Y12, and the following conditions are satisfied:

$1.0 < TL/EPD < 16.5$;

$90.0[\text{deg.}] < FOV < 180.0[\text{deg.}]$; and $1.1 < Y11/Y12 < 4.0$.

5. The optical photographing lens assembly of claim 1, wherein the image-side surface of the first lens element is concave in a paraxial region thereof, a curvature radius of the object-side surface of the first lens element is R1, a curvature radius of the image-side surface of the first lens element is R2, and the following condition is satisfied:

$|(R1+R2)/(R1-R2)| < 0.45$;

wherein the Abbe number of the first lens element is V1, the Abbe number of the second lens element is V2, the Abbe number of the third lens element is V3, an Abbe number of the i-th lens element is Vi, a refractive index of the first lens element is N1, a refractive index of the second lens element is N2, a refractive index of the third lens element is N3, a refractive index of the i-th lens element is Ni, and at least one lens element of the optical photographing lens assembly satisfies the following condition:

$32.5 < Vi/Ni < 38.5$, wherein $i = 1, 2$, or $3$.

6. The optical photographing lens assembly of claim 1, wherein the second lens element has positive refractive power, the third lens element has positive refractive power, a focal length of the second lens element is f2, a focal length of the third lens element is f3, and the following condition is satisfied:

$2.60 < f2/f3 < 7.00$.

7. The optical photographing lens assembly of claim 1, wherein the object-side surface of the second lens element is aspheric and has at least one inflection point, the object-side surface of the second lens element has at least one critical point in an off-axis region thereof, the object-side surface of the third lens element is convex in a paraxial region thereof, an axial distance between the object-side surface of the first lens element and an image surface is TL, and the following condition is satisfied:

$TL < 3.0$ [mm].

8. An optical photographing lens assembly comprising three lens elements, the three lens elements being, in order from an object side to an image side, a first lens element, a second lens element and a third lens element; each of the three lens elements having an object-side surface facing toward the object side and an image-side surface facing toward the image side;

wherein the object-side surface of the first lens element is concave in a paraxial region thereof, the object-side surface of the first lens element is aspheric and has at least one inflection point, the object-side surface of the first lens element has at least one critical point in an off-axis region thereof, the object-side surface of the second lens element is convex in a paraxial region thereof, the image-side surface of the third lens element is convex in a paraxial region thereof, and the optical photographing lens assembly has a total of three lens elements;

wherein a focal length of the optical photographing lens assembly is f, a curvature radius of the object-side surface of the first lens element is R1, an entrance pupil diameter of the optical photographing lens assembly is EPD, a central thickness of the second lens element is CT2, an axial distance between the second lens element and the third lens element is T23, and the following conditions are satisfied:

$0.50 < f/EPD < 1.9$;

$-9.0 < R1/EPD < 0$; and $0 < CT2/T23 < 3.4$.

9. The optical photographing lens assembly of claim 8, wherein the focal length of the optical photographing lens assembly is f, the entrance pupil diameter of the optical photographing lens assembly is EPD, the central thickness of the second lens element is CT2, the axial distance between the second lens element and the third lens element is T23, and the following conditions are satisfied:

$0.80 < f/EPD < 1.7$; and $0.50 < CT2/T23 < 2.7$.

10. The optical photographing lens assembly of claim 8, wherein a central thickness of the first lens element is CT1, the central thickness of the second lens element is CT2, a curvature radius of the object-side surface of the second lens element is R3, a curvature radius of the image-side surface of the second lens element is R4, and the following conditions are satisfied:

$0<CT2/CT1<1.49$; and $-9.0<(R3+R4)/(R3-R4)<0$.

11. The optical photographing lens assembly of claim 8, wherein an axial distance between the object-side surface of the first lens element and an image surface is TL, the focal length of the optical photographing lens assembly is f, and the following condition is satisfied:

$5.00<TL/f<13.0$.

12. The optical photographing lens assembly of claim 8, wherein a maximum effective radius of the object-side surface of the first lens element is Y11, a maximum effective radius of the image-side surface of the third lens element is Y32, an Abbe number of the third lens element is V3, a refractive index of the third lens element is N3, and the following conditions are satisfied:

$1.5<Y11/Y32<5.0$; and $11.0<V3/N3<21.0$.

13. The optical photographing lens assembly of claim 8, wherein each of at least two lens elements of the optical photographing lens assembly has at least one aspheric surface having at least one inflection point, the three lens elements are made of plastic material, a sum of central thicknesses of all lens elements of the optical photographing lens assembly is ΣCT, a sum of axial distances between each of all adjacent lens elements of the optical photographing lens assembly is ΣAT, and the following condition is satisfied:

$1.0<\Sigma CT/\Sigma AT<2.8$.

14. The optical photographing lens assembly of claim 8, wherein each of at least two lens elements of the optical photographing lens assembly has at least one lens surface having at least one critical point in an off-axis region thereof, an Abbe number of the second lens element is V2, an Abbe number of the third lens element is V3, and the following condition is satisfied:

$57.0<V2+V3<140$.

15. An optical photographing lens assembly comprising three lens elements, the three lens elements being, in order from an object side to an image side, a first lens element, a second lens element and a third lens element; each of the three lens elements having an object-side surface facing toward the object side and an image-side surface facing toward the image side;
wherein the object-side surface of the first lens element is concave in a paraxial region thereof, the object-side surface of the first lens element is aspheric and has at least one inflection point, the object-side surface of the first lens element has at least one critical point in an off-axis region thereof, the object-side surface of the second lens element is convex in a paraxial region thereof, the third lens element has positive refractive power, the object-side surface of the third lens element is convex in a paraxial region thereof, the image-side surface of the third lens element is convex in a paraxial region thereof, and the optical photographing lens assembly has a total of three lens elements;

wherein a focal length of the optical photographing lens assembly is f, a curvature radius of the object-side surface of the first lens element is R1, an entrance pupil diameter of the optical photographing lens assembly is EPD, an axial distance between the first lens element and the second lens element is T12, an axial distance between the second lens element and the third lens element is T23, and the following condition are satisfied:

$0.50<f/EPD<1.9$;

$-6.0<R1/EPD<0$;

$0<T12/T23\leq 4.69$.

16. The optical photographing lens assembly of claim 15, wherein the curvature radius of the object-side surface of the first lens element is R1, the entrance pupil diameter of the optical photographing lens assembly is EPD, the axial distance between the first lens element and the second lens element is T12, the axial distance between the second lens element and the third lens element is T23, and the following conditions are satisfied:

$-5.4<R1/EPD<-1.0$; and $1.0<T12/T23\leq 4.69$.

17. The optical photographing lens assembly of claim 15, wherein the focal length of the optical photographing lens assembly is f, the entrance pupil diameter of the optical photographing lens assembly is EPD, half of a maximum field of view of the optical photographing lens assembly is HFOV, and the following condition is satisfied:

$1.00<f/EPD+cot(HFOV)<2.50$.

18. The optical photographing lens assembly of claim 15, wherein a maximum effective radius of the object-side surface of the first lens element is Y11, an axial distance between the object-side surface of the first lens element and the image-side surface of the third lens element is TD, a maximum value among refractive indexes of all lens elements of the optical photographing lens assembly is Nmax, and the following conditions are satisfied:

$0.61<Y11/TD<1.0$; and $1.50<Nmax<1.70$.

19. The optical photographing lens assembly of claim 15, wherein a vertical distance between the critical point on the object-side surface of the first lens element and an optical axis is Yc11, a maximum effective radius of the object-side surface of the first lens element is Y11, and the following condition is satisfied:

$0.15<Yc11/Y11<0.75$.

20. The optical photographing lens assembly of claim 15, wherein the first lens element has negative refractive power, and the image-side surface of the first lens element is concave in a paraxial region thereof.

21. The optical photographing lens assembly of claim 15, wherein the second lens element has positive refractive power, an Abbe number of the second lens element is V2, an Abbe number of the third lens element is V3, and the following conditions are satisfied:

$34.0<V2<70.0$; and $15.0<V3<60.0$.

22. The optical photographing lens assembly of claim 15, wherein a curvature radius of the object-side surface of the third lens element is R5, a curvature radius of the image-side surface of the third lens element is R6, and the following condition is satisfied:

$-8.5 < R5/R6 < -1.2$.

23. The optical photographing lens assembly of claim 15, further comprising an aperture stop, wherein the optical photographing lens assembly is operated within a wavelength of 480 nm to 600 nm, the aperture stop is disposed between the second lens element and the third lens element, an axial distance between the aperture stop and an image surface is SL, an axial distance between the object-side surface of the first lens element and the image surface is TL, and the following condition is satisfied:

$0.20 < SL/TL < 0.65$.

24. A fingerprint identification module, comprising:
the optical photographing lens assembly of claim 15; and
an image sensor disposed on an image surface of the optical photographing lens assembly.

25. An electronic device, comprising:
the fingerprint identification module of claim 24; and
an light-permeable sheet disposed between the optical photographing lens assembly and an imaged object.

26. The electronic device of claim 25, wherein an axial distance between the imaged object and the object-side surface of the first lens element is TOB, an axial distance between the object-side surface of the first lens element and the image surface is TL, the entrance pupil diameter of the optical photographing lens assembly is EPD, and the following conditions are satisfied:

$0.50 \text{ [mm]} < TOB+TL < 8.0 \text{ [mm]}$; and $(TOB+TL)/EPD < 28.0$.

27. The electronic device of claim 25, wherein an axial distance between the imaged object and the object-side surface of the first lens element is TOB, an axial distance between the object-side surface of the first lens element and the image surface is TL, a maximum image height of the optical photographing lens assembly is ImgH, an object height corresponding to the maximum image height of the optical photographing lens assembly is YOB, and the following conditions are satisfied:

$0 < TOB/TL < 2.0$; and $1.5 < YOB/ImgH < 9.5$.

28. The electronic device of claim 25, wherein the light-permeable sheet comprises a display layer with tough-screen function, the display layer is light-permeable, a central thickness of the light-permeable sheet is CTS, an axial distance between the object-side surface of the first lens element and the image-side surface of the third lens element is TD, and the following conditions are satisfied:

$0.2 \text{ [mm]} < CTS < 3.0 \text{ [mm]}$; and $0.50 < TD/CTS < 7.5$.

* * * * *